US006397966B1

(12) United States Patent
Irikura et al.

(10) Patent No.: US 6,397,966 B1
(45) Date of Patent: Jun. 4, 2002

(54) VEHICLE IMPROVED IN STEERING

(75) Inventors: Koji Irikura; Norihiro Ishii; Ryota Ohashi; Kenichi Takada; Hirohiko Kawada, all of Amagasaki (JP); Robert Abend, Morristown, TN (US); Keith J. Andrews, Morristown, TN (US); Toshiyuki Hasegawa, Morristown, TN (US); Hiroaki Shimizu, Morristown, TN (US)

(73) Assignees: Kanzaki Kokyukoki, Mfg. Co., Ltd. (JP); Tuff Torq Corporation, Morristown, TN (US)

( * ) Notice: Subject to any disclaimer, the term of this patent is extended or adjusted under 35 U.S.C. 154(b) by 0 days.

(21) Appl. No.: 09/489,680

(22) Filed: Jan. 24, 2000

(30) Foreign Application Priority Data

| Jan. 22, 1999 | (JP) | ............................................ | 11-014919 |
| Jan. 22, 1999 | (JP) | ............................................ | 11-014920 |
| Jun. 21, 1999 | (JP) | ............................................ | 11-174647 |

(51) Int. Cl.$^7$ ............................................. B62D 11/00
(52) U.S. Cl. ........................................ 180/307; 180/6.2
(58) Field of Search ................................. 180/6.2, 6.24, 180/6.26, 6.32, 6.3, 6.48, 305, 307, 308

(56) References Cited

U.S. PATENT DOCUMENTS 2,191,961 A    2/1940 Howell (List continued on next page.)

FOREIGN PATENT DOCUMENTS

CH          249274    *  6/1947    ................ 180/6.24

(List continued on next page.)

OTHER PUBLICATIONS

Brochure regarding differential steering, Date of Publication unknown, pp. 4–15.
Article regarding differential steering Jul. 1985 p. 61.

(List continued on next page.)

Primary Examiner—Frank Vanaman
(74) Attorney, Agent, or Firm—Sterne, Kessler, Goldstein & Fox P.L.L.C.

(57) ABSTRACT

A vehicle is installed with an integral transaxle apparatus constructed so that a single housing contains left and right axles, a driving hydrostatic transmission (HST) having a variable displacement first hydraulic pump and a first hydraulic motor fluidly connected with each other, a steering HST having a variable displacement second hydraulic pump and a variable displacement second hydraulic motor fluidly connected with each other, and a differential unit differentially connecting the axles with each other so as to be driven regularly or reversely by the output of the driving HST and to differentially drive the axles while receiving the output of the steering HST, wherein the first hydraulic pump receives power of a prime mover and has a first movable swash plate, and the second hydraulic pump receives power of the prime mover independently of the first hydraulic pump and has a second movable swash plate. The vehicle is also provided with driving operating means for slanting operation of the first movable swash plate for switching the travelling direction between forward and backward and for changing the travelling speed, and steering operating means for slanting operation of the second movable swash plate so as to determine the leftward and rightward cornering angle. The second hydraulic motor has a third movable swash plate interlocking with the driving operating means so that the slanting direction of the third movable swash plate is changed oppositely with respect to its neutral position according to the travelling direction switching operation of the driving operating means, whereby the vehicle turns laterally in the same direction of leftward and rightward steering operation of the steering operating means whether the vehicle travels forward or backward.

5 Claims, 50 Drawing Sheets

U.S. PATENT DOCUMENTS

| | | | | |
|---|---|---|---|---|
| 2,255,348 | A | 9/1941 | Brown | |
| 2,311,922 | A | 2/1943 | Allin | |
| 2,332,838 | A | 10/1943 | Borgward | |
| 2,336,911 | A | 12/1943 | Zimmermann | |
| 2,336,912 | A | 12/1943 | Zimmermann | |
| 2,391,735 | A | 12/1945 | Orshansky, Jr. | |
| 2,530,720 | A * | 11/1950 | Paulson | 180/308 |
| 2,745,506 | A * | 5/1956 | McCallum | 180/308 |
| 2,763,164 | A | 9/1956 | Neklutin | |
| 2,936,033 | A | 5/1960 | Gates | 180/6.2 |
| 3,059,416 | A * | 10/1962 | Campbell | 180/308 |
| 3,371,734 | A | 3/1968 | Zaunberger et al. | |
| 3,376,760 | A | 4/1968 | Gordanier | |
| 3,395,671 | A | 8/1968 | Zimmermann, Jr. | |
| 3,450,218 | A | 6/1969 | Looker | |
| 3,492,891 | A | 2/1970 | Livezey | 74/720.5 |
| 3,530,741 | A | 9/1970 | Charest | |
| 3,590,658 | A | 7/1971 | Tuck | |
| 3,596,535 | A | 8/1971 | Polak | |
| 3,603,176 | A | 9/1971 | Tipping et al. | |
| 3,612,199 | A * | 10/1971 | Vissers | 180/6.32 |
| 3,717,212 | A | 2/1973 | Potter | |
| 3,901,339 | A | 8/1975 | Williamson | |
| 3,903,977 | A * | 9/1975 | Gillette et al. | 180/6.2 |
| 3,907,051 | A | 9/1975 | Weant et al. | 180/6.2 |
| 3,978,937 | A | 9/1976 | Chichester et al. | |
| 4,133,404 | A * | 1/1979 | Griffin | 180/6.2 |
| 4,174,762 | A | 11/1979 | Hopkins et al. | 180/6.44 |
| 4,245,524 | A | 1/1981 | Dammon | |
| 4,281,737 | A | 8/1981 | Molzahn | |
| 4,320,810 | A * | 3/1982 | Hillmann et al. | 180/6.3 |
| 4,399,882 | A | 8/1983 | O'Neill et al. | 180/6.48 |
| 4,471,669 | A | 9/1984 | Seaberg | 74/687 |
| 4,577,711 | A | 3/1986 | Butler | |
| 4,718,508 | A | 1/1988 | Tervola | 180/6.44 |
| 4,729,257 | A | 3/1988 | Nelson | 74/675 |
| 4,732,053 | A | 3/1988 | Gleasman et al. | 74/665 L |
| 4,738,328 | A | 4/1988 | Hayden | |
| 4,776,235 | A | 10/1988 | Gleasman et al. | 74/720.5 |
| 4,776,236 | A | 10/1988 | Gleasman et al. | 74/720.5 |
| 4,782,650 | A | 11/1988 | Walker | 56/16.6 |
| 4,790,399 | A | 12/1988 | Middlesworth | 180/6.2 |
| 4,809,796 | A | 3/1989 | Yamaoka et al. | |
| 4,813,506 | A | 3/1989 | Smith | |
| 4,875,536 | A | 10/1989 | Saur et al. | 180/6.32 |
| 4,882,947 | A | 11/1989 | Barnard | |
| 4,895,052 | A | 1/1990 | Gleasman et al. | 74/720.5 |
| 4,917,200 | A | 4/1990 | Lucius | 180/6.2 |
| 4,949,823 | A | 8/1990 | Coutant et al. | |
| 5,004,060 | A | 4/1991 | Barbagli et al. | |
| 5,015,221 | A | 5/1991 | Smith | 475/19 |
| 5,052,511 | A | 10/1991 | Hunt | 180/305 |
| 5,094,326 | A | 3/1992 | Schemelin et al. | |
| 5,131,483 | A | 7/1992 | Parkes | 180/6.48 |
| RE34,057 | E | 9/1992 | Middlesworth | 180/6.2 |
| 5,195,600 | A | 3/1993 | Dorgan | |
| 5,279,376 | A | 1/1994 | Yang et al. | 180/6.48 |
| 5,307,612 | A | 5/1994 | Tomiyama et al. | |
| 5,335,739 | A * | 8/1994 | Pieterse et al. | 180/6.3 |
| 5,339,631 | A | 8/1994 | Ohashi | |
| 5,383,528 | A * | 1/1995 | Nicol | 180/6.2 |
| 5,387,161 | A | 2/1995 | Shibahata | |
| 5,505,279 | A | 4/1996 | Louis et al. | 180/305 |
| 5,507,138 | A | 4/1996 | Wright et al. | |
| 5,517,809 | A | 5/1996 | Rich | |
| 5,535,840 | A | 7/1996 | Ishino et al. | |
| 5,553,453 | A | 9/1996 | Coutant et al. | 60/327 |
| 5,560,447 | A | 10/1996 | Ishii et al. | |
| 5,564,518 | A | 10/1996 | Ishii et al. | |
| 5,644,903 | A | 7/1997 | Davis, Jr. | 56/10.8 |
| 5,649,606 | A | 7/1997 | Bebernes et al. | |
| 5,667,032 | A | 9/1997 | Kamlukin | |
| 5,706,907 | A | 1/1998 | Unruh | |
| 5,722,501 | A | 3/1998 | Finch et al. | |
| 5,842,378 | A | 12/1998 | Zellmer | |
| 5,850,886 | A | 12/1998 | Kouno et al. | |
| 5,894,907 | A | 4/1999 | Peter | |
| 5,913,802 | A | 6/1999 | Mullet et al. | |
| 5,946,894 | A | 9/1999 | Eavenson et al. | |
| 5,947,219 | A | 9/1999 | Peter et al. | |
| 5,975,224 | A | 11/1999 | Satzler | |
| 5,997,425 | A | 12/1999 | Coutant et al. | |
| 6,026,634 | A | 2/2000 | Peter et al. | |
| 6,035,959 | A | 3/2000 | Schaeder | |
| 6,038,840 | A | 3/2000 | Ishimori et al. | |
| 6,098,737 | A | 8/2000 | Aoki | |
| 6,126,564 | A | 10/2000 | Irikura et al. | |
| 6,129,164 | A | 10/2000 | Teal et al. | |
| 6,141,947 | A | 11/2000 | Borling | |

FOREIGN PATENT DOCUMENTS

| | | | | |
|---|---|---|---|---|
| DE | 4224887 | | 9/1993 | |
| EP | 0 806 337 | A1 | 12/1997 | |
| GB | 2 303 829 | A | 3/1997 | |
| JP | 57-140277 | * | 8/1982 | 180/6.32 |
| JP | 63-227476 | | 9/1988 | |
| JP | 2-261952 | | 10/1990 | |
| JP | 8-142906 | | 6/1996 | |
| JP | 9-202255 | | 8/1997 | |
| JP | 9-202258 | | 8/1997 | |
| JP | 9-202259 | | 8/1997 | |
| JP | 9-216522 | | 8/1997 | |
| WO | 92/12889 | * | 8/1992 | 180/6.48 |
| WO | WO 98/32645 | | 7/1998 | |
| WO | 99/40499 | | 8/1999 | |
| WO | WO 00/01569 | | 1/2000 | |

OTHER PUBLICATIONS

Popular Science, Tanks and dozers turn on a dime with new all gear steering, pp. 60–62, Jul. 1985.

The Engineer, Tank Steering Mechanisms, pp. 337–340, Mar. 3, 1967.

Excel Industries Inc., U–T–R The Ultimate Turning Radius, pp. 1–6, 1992.

Electric Tractor Corporation, An Idea Whose Time Has Come, 5 pages, date of publication unknown, published in Ontario, Canada.

Electric Tractor Corporation, Model #9620, The Ultimate Lawn and Garden Tractor, 6 pages, date of publication, Jul. 27, 1998.

Farm Show Magazine, Battery Powered Riding Mower, 1 page, date of publication, Mar.–Apr. 1996.

Deere & Company, 240, 245, 260, 265, 285, and 320 Lawn and Garden Tractors Technical Manual, front cover and pp. 10–2 to 10–4 and 10–6, date of publication, Dec. 1996.

Excel Industries, Inc., Hustler 4000 Series, Dec. 1995, pp. 1–8.

Woods Equipment Company, Woods Mow'n Machine, Dec. 1997, pp. 1–12.

Ex–Mark, ExMark Nobody Does It Better Professional Turf Care Equipment, Dec. 1997, pp. 1–20.

Dixon Industries, Inc. Dixon ZTR Riding Mowers, Dec. 1997, pp. 1–4.

Shivers Mfg., Zero Turn Radius Mower The Commercial Clipper, Dec. 1997, pp. 1–4.

Ferris Industries, Inc., The ProCut Z Zero–Turn Rider, Dec. 1997, pp. 1–2.
Zipper–TS Mower, The Zipper–TS Mowers, 1997, pp. 1–2.
Westwood, The Westwood Clipper Owner's Instruction Manual, date of publication unknown, pp. 1–19.
U.S. application Ser. No. 09/372,747, USPTO Applications, filed Aug. 11, 1999.
U.S. application Ser. No. 09/489,678, USPTO Applications, filed Jan. 24, 2000.
U.S. application Ser. No. 09/622,414, USPTO Applications, filed Aug. 16, 2000.

U.S. application Ser. No. 09/642,147, USPTO Applications, filed Aug. 21, 2000.

U.S. application Ser. No. 09/700,147, USPTO Applications, filed Nov. 13, 2000.

U.S. application Ser. No. 09/700,923, USPTO Applications, filed Nov. 21, 2000.

* cited by examiner

VEHICLE IMPROVED IN STEERING

BACKGROUND OF THE INVENTION

1. Field of the Invention

The present invention relates to a vehicle, especially a working vehicle like a tractor, improved in its steering. Firstly, the improvement is provided for the vehicle installed with an integral transaxle apparatus comprising a hydrostatic and mechanical axle driving and steering system including two hydrostatic transmissions (hereinafter, each hydrostatic transmission is called an "HST"); one for driving left and right axles, and the other for steering the axles, wherein the input of the HST for steering is independent of the output of the HST for driving. Secondly, the improvement is for the vehicle having a caster in addition to its driving wheels.

2. Related Art

A well-known conventional system for driving and steering left and right axles for wheels or sprockets of tracks, which employs a pair of HSTs provided for the respective axles, is disclosed in U.S. Pat. No. 4,782,650 or Japanese Laid Open Gazette No. Hei 2-261,952, for example. Output rotary speeds of the two HSTs are equalized for straight driving of a vehicle and made different from each other for steering of it.

The conventional system has the problem that the equalization of output rotary speeds between the two HSTs must be precise and if there is difference of capacity between the two HSTs, a vehicle was steered differently whether leftward or rightward.

The present axle driving and steering system includes two HSTs and two differentials, wherein one (a driving HST) of the HSTs interlocks with a speed changing operation means like a lever or a pedal and transmits power from a prime mover like an engine into one differential connecting left and right axles for driving them. The other HST (a steering HST) interlocks with a steering operation means like a steering wheel and transmits its output rotational force corresponding to the direction and degree of the steering operation means into the other differential, and a pair of differential output shafts of the latter differential are drivingly connected to the respective axles through two drive trains which are opposite in their output rotational directions.

Furthermore, two types of such an axle driving and steering system have been provided. One is a dependent steering type, wherein the steering HST receives the driving power for its hydraulic pump from the output of the hydraulic motor of the driving HST. The other is an independent steering type, wherein the steering HST receives the driving power for its hydraulic pump from the prime mover independently of the output of the driving HST.

In comparison with the dependent steering type system, the independent type system has some advantages as follows:

Firstly, the steering HST can be driven while the speed changing operating means is in neutral so as not to drive the driving HST, so that both the left and right axles are rotated oppositely to each other at an equal speed, whereby a vehicle installed with the system can swivel in place.

Secondly, the volume of the driving HST can be reduced because it does not have to drive the steering HST.

Thirdly, while the steering HST of the dependent steering type must have so large volume as to compensate the low efficiency of rotation of its input shaft (a pump shaft), the volume of the independent steering type one, which has a pump shaft independently driven by a prime mover, does not have to be so large. However, a vehicle installed with the independent steering type system has the following disadvantage:

If a vehicle employing the independent steering type system is instituted so that the lateral direction of the steered vehicle coincides with that of an operated steering operating means (like a steering wheel) during forward travelling, the vehicle comes to be steered oppositely to the operational direction of the steering operating means during backward travelling. For example, when a steering wheel is rotated leftward during backward travelling, the vehicle turns rightward. Such a situation confuses an operator accustomed to driving a normal car.

Also, there has never been disclosed a compact integral construction employing the above mentioned system comprising two axles, two HSTs; one for driving a vehicle and the other for steering; and a differential receiving the output of both HSTs, whether the system is of the dependent steering type or of the independent steering type.

Otherwise, it is well-known that the vehicle installed with the above mentioned system is provided with a caster or casters in addition to the above mentioned driving axles for improvement of its capacity of steering, that is, so as to enable the vehicle to turn left or right easily and swiftly.

Conventionally, the caster attached to the vehicle has been able to swivel in all horizontal directions in relation to the vehicle body independently of operation of the steering operating means. The steering operating means merely applies difference in rotary speed between left and right driving axles. The caster is laterally swivelled by its following-up the differential rotation of the both axles and is rotated in the direction where it is oriented after the swivelling.

The axis of the caster's own rotation is longitudinally off set from the axis of its lateral swivelling in relation to the vehicle. The caster rotates around its own rotational axis for travelling in such a situation that the swivelling axis and the rotational axis are disposed front and rear. In this regard, the longitudinal direction of the caster is oriented to the travelling direction of the vehicle after the caster has been laterally swivelled. Since the caster is independent of the steering operating means, the lateral swivelling of caster is not performed while the vehicle is stationary but must be performed while the vehicle travels.

Such a construction of caster causes the problem that, while the travelling direction of the vehicle is reversed between forward and backward, the portion of the vehicle to which the caster is attached meanders laterally because the caster is swivelled approximately to an angle of 180° in relation to the vehicle body so as to be longitudinally reversed. Furthermore, the vehicle which has stopped while turning leftward stays in the situation that its caster is oriented leftward to some degree. If the vehicle which has stayed in such a situation starts travelling while turning rightward, the vehicle also meanders laterally because the caster oriented for leftward cornering is laterally swivelled to the direction for rightward cornering for a little while.

Such meandering of the vehicle confuses an operator. Also, while laterally swivelling, the caster is oriented perpendicularly to the travelling direction of the vehicle in a moment so that the resistance of the ground surface against rotation of the caster is maximized, thereby making the volume of the steering HST insufficient to effect its output. Also, in this moment, the caster is dragged without rotation thereby being damaged by the ground surface.

Moreover, since the caster, which is conventionally disposed under the vehicle body, even if it is attached as a front wheel, is invisible to an operator sitting on the seat, the operator feels uneasy especially in such a case supposing the above mentioned meandering of the vehicle.

SUMMARY OF THE INVENTION

An object of the present invention is to provide a vehicle installed with a compact integral transaxle apparatus employing the above described axle driving and steering system of the independent steering type, so as to save its manufacturing cost and to ease its maintenance, wherein the vehicle can be steered in the same direction with that of operated steering operating means whether the vehicle travels forward or backward.

To achieve the object, the vehicle according to the present invention is installed with an integral transaxle apparatus for driving and steering a vehicle so constructed that a driving HST including a variable displacement first hydraulic pump and a first hydraulic motor fluidly connected with each other, a steering HST including a variable displacement second hydraulic pump and a variable displacement second hydraulic motor fluidly connected with each other, a pair of axles disposed co-axially with each other, and a differential unit differentially connecting the axles with each other are disposed together in a housing, wherein the first hydraulic pump receives power of a prime mover and has a first movable swash plate, the second hydraulic pump receives power of the prime mover independently of the first hydraulic pump and has a second movable swash plate, and the differential unit is driven regularly or reversely by the output of the driving HST and differentially drives the axles while receiving the output of the steering HST.

On a portion of the vehicle apart from the integral transaxle apparatus are provided driving operating means for slanting operation of the first movable swash plate so as to switching the travelling direction between forward and backward and to change the travelling speed, and steering operating means for slanting operation of the second movable swash plate so as to determine the leftward and rightward cornering angle.

For the purpose of enabling the vehicle to turn laterally in the same direction of leftward and rightward steering operation of the steering operating means whether the vehicle travels forward or backward, the second hydraulic motor is of a variable displacement type and has a third movable swash plate. The third movable swash plate interlocks with the driving operating means so that the slanting direction of the third movable swash plate is changed oppositely with respect to its neutral position according to the travelling direction switching operation of the driving operating means.

Additionally, the second hydraulic motor is of a variable displacement type and has a third movable swash plate, the first hydraulic motor is of a variable displacement type and has a fourth movable swash plate, and the driving operating means comprises forward/backward travelling direction switching means and speed changing means. The forward/backward travelling direction switching means interlocks with both the third movable swash plate and the fourth movable swash plate so as to change the slanting directions of the third and fourth movable swash plates oppositely with respect to their neutral positions. The speed changing means interlocks with the first movable swash plate so as to vary the slanting angle of the first movable swash plate according to the operational degree of the speed changing means.

For providing a play to the driving operating means or the speed changing means, the first movable swash plate is kept in its own neutral position while the means is operated to some degree from its own neutral position whether forward travelling or backward travelling.

Also, for enabling the vehicle employing the apparatus to swivel in place, the third movable swash plate is slanted to a certain degree in a direction corresponding to forward travelling when the driving operating means or the speed changing means is located in its own neutral position.

In this construction, for avoiding the problem that the vehicle is steered oppositely to the expected direction, the third movable swash plate is changed in its slanting direction from that for forward travelling to that for backward travelling according to the operation of the driving operating means from its own neutral position into its range for backward travelling (or according to the switching of the forward/backward travelling direction switching means to its backward travelling position and the operation of the speed changing means from the neutral position) while the first movable swash plate is kept in its own neutral position.

Also, for making the steering response to the operation of the steering operating means gentle during slow travelling, the third movable swash plate is kept at the certain degree while the driving operating means is operated for forward travelling (or while the forward/backward travelling direction switching means is switched to its forward travelling position and the speed changing means is operated from the neutral position) within the range to keep the first movable swash plate in its own neutral position.

Another object of the present invention is to provide a vehicle having a caster in addition to its driving wheels, wherein the caster can nicely follow the driving wheels so as to ensure expected cornering.

To achieve the object, the caster interlocks with the steering operating means so as to be swivelled in relation to the vehicle by operation of the steering operating means, wherein the caster is restricted in its range where it can be freely swivelled.

Additionally, a caster guide is interposed between the caster and the vehicle so as to interlock with the steering operating means thereby being swivelled in relation to the vehicle by operation of the steering operating means, and to laterally rotatably support the caster while restricting the caster in its range of free swivelling in relation to the caster guide.

Other and further objects, features and advantages of the invention will appear more fully from the following description.

DETAILED DESCRIPTION OF THE PREFERRED EMBODIMENTS

Figure 1:
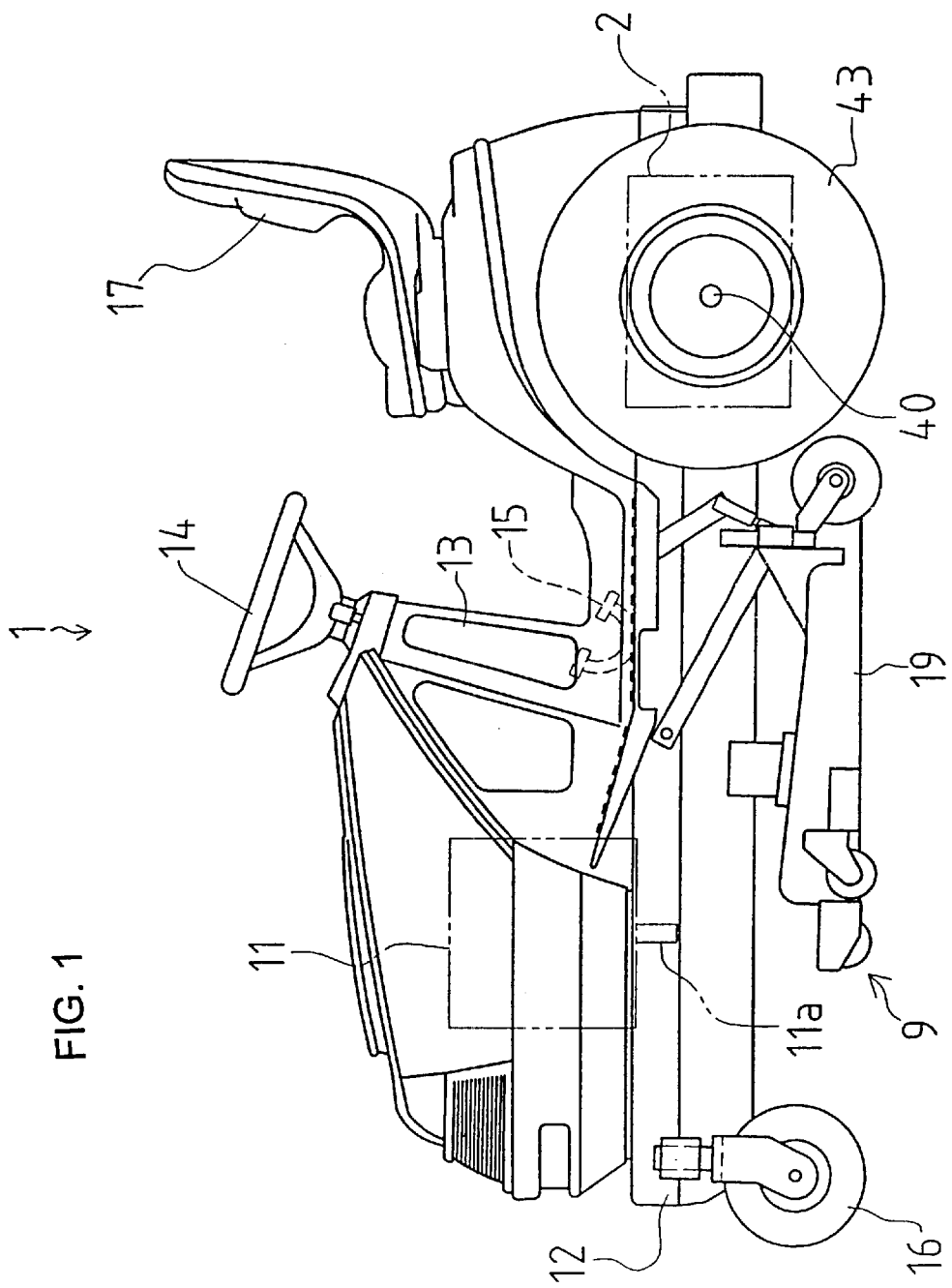
FIG. 1 is an entire side view of a mid-mount type lawn tractor 1 employing an integral transaxle apparatus 2 according to the present invention.

At first, description will be given on some embodiments of a lawn tractor serving as a vehicle employing the present invention. Referring to a lawn tractor 1 shown in FIG. 1, a front column 13 erected on the forward portion of chassis 12 is provided thereabove with a steering wheel 14 serving as a steering operation tool, and beside the foot thereof with a speed change pedal 15 serving as a speed changing operation tool and a brake pedal (not shown).

Speed change pedal 15 shaped like a seesaw is pivoted at its intermediate portion and is provided at its front and rear ends with pedal surfaces. The front pedal surface is trod down so as to drive the vehicle forwardly, and the rear pedal surface is to drive it backwardly. The travelling speed of the vehicle, corresponds to the degree of downward movement of each pedal surface. Pedal 15 is biased toward its neutral position by a spring (not shown).

A pair of casters 16 serving as front wheels are provided on respective left and right sides of the forward bottom portion of chassis 12. Alternatively, only one caster 16 may be provided on the lateral middle thereof, or more than two casters 16 may be provided.

An engine 11 is mounted on the forward portion of chassis 12 and is covered with a bonnet. A seat 17 is disposed above the rearward portion of chassis 12. A mower 9 is suspended downwardly from the longitudinally intermediate portion of chassis 12, thereby defining lawn tractor 1 as a mid-mount type. Mower 9 comprises a casing 19 containing at least one rotary blade which is driven by power from engine 11 transmitted through means like a shaft, pulleys and a belt (not shown). A linkage is provided so as to enable mower 9 to move vertically.

An integral transaxle apparatus 2 of the invention is disposed at the rearward portion of chassis 12. Apparatus 2 receives rotational power of a vertically downward output shaft 11a of engine 11 through pulleys and a belt (not shown), and drives left and right axles 40 supported by the rearward portion of chassis 12. Left and right driving wheels 43 serving as rear wheels are fixedly mounted onto utmost ends of axles 40.

Figure 2:
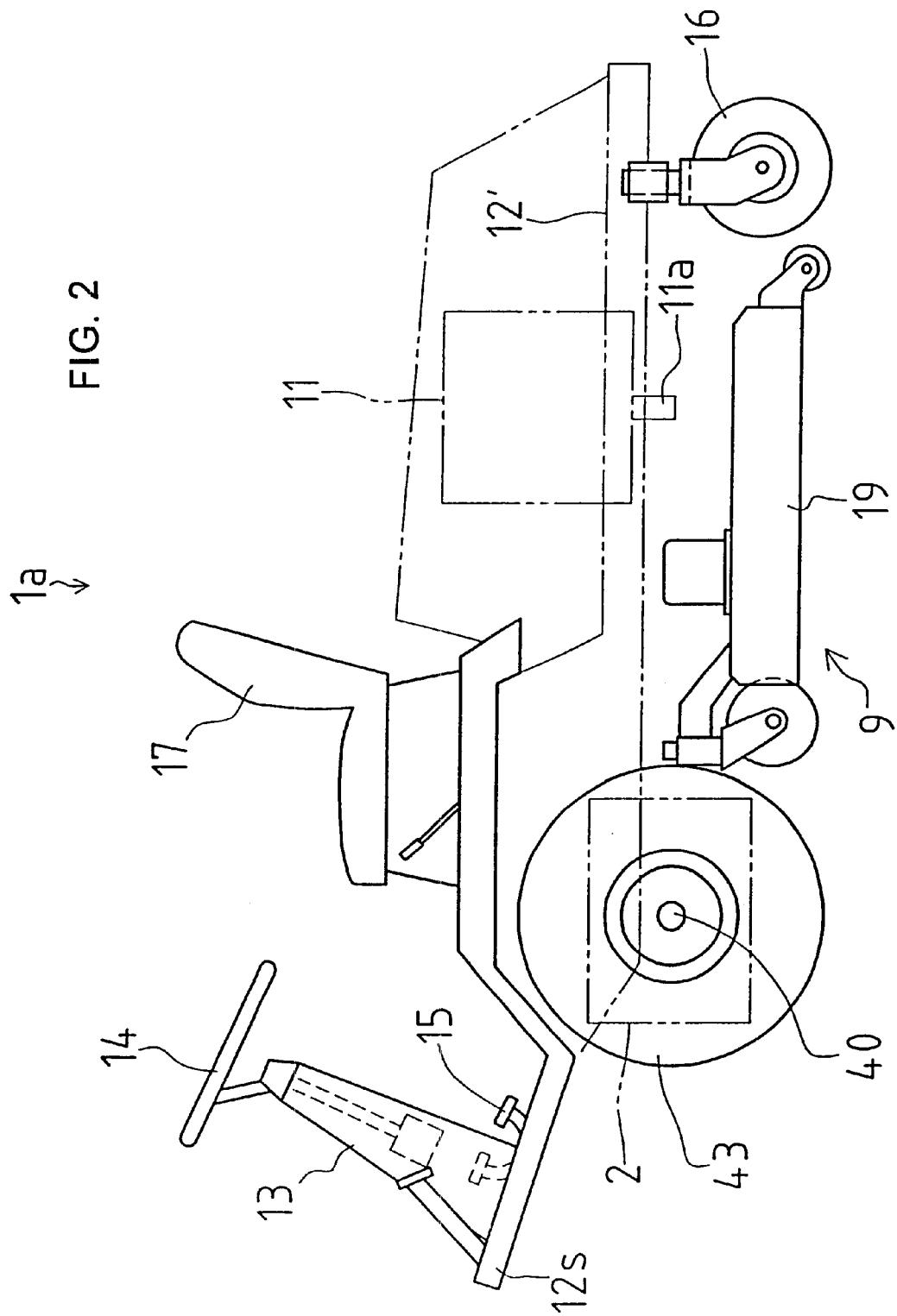
FIG. 2 is an entire side view of an alternative mid-mount type lawn tractor 1a employing the same.

Referring to FIG. 2, an alternative lawn tractor 1a has a chassis 12' forming a platform 12s at the top of forward portion thereof, on which front column 13 provided there above with steering wheel 14 is erected and speed change pedal 15 and the brake pedal are provided. Chassis 12' is provided on the bottom of rearward portion thereof with left and right casters 16 serving as rear wheels.

Engine 11 having vertically downward output shaft 11a is mounted on the rearward portion of chassis 12' and is covered with abonnet. Mower 9 which is similar to that of FIG. 1 is suspended downwardly from the longitudinally intermediate portion of chassis 12' (behind driving wheels 43), thereby defining lawn tractor 1a as a mid-mount type. Transaxle apparatus 2 disposed at the forward portion of chassis 12' receives rotational power of output shaft 11a through pulleys and a belt (not shown) and drives left and right axles 40 supported by the forward portion of chassis 12'. Left and right driving wheels 43 serving as front wheels are fixedly mounted onto utmost ends of axles 40.

Figure 3:
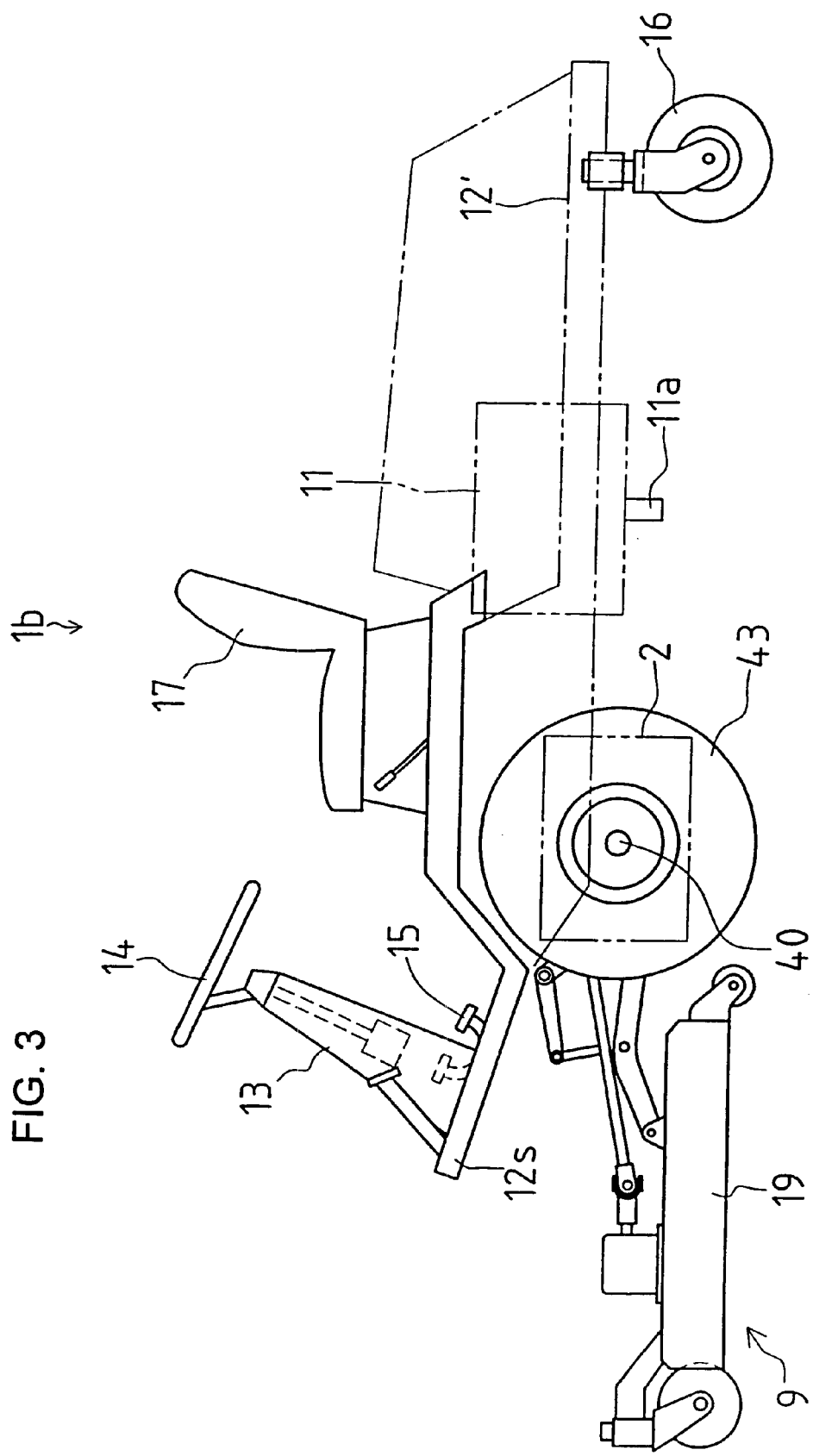
FIG. 3 is an entire side view of a front-mount type lawn tractor 1b employing the same.

Referring to FIG. 3, a further alternative lawn tractor 1b is similar to lawn tractor 1a with the exception that mower 9 is disposed below the forward portion of chassis 12' (before driving wheels 43), thereby defining lawn tractor 1b as a front-mount type.

Next, description will be given on the internal system of internal transaxle apparatus 2 for driving and steering a vehicle such as lawn tractor 1, 1a or 1b in accordance with FIGS. 4–20, with some references to the external configuration thereof shown in FIGS. 21–26.

Figure 4:
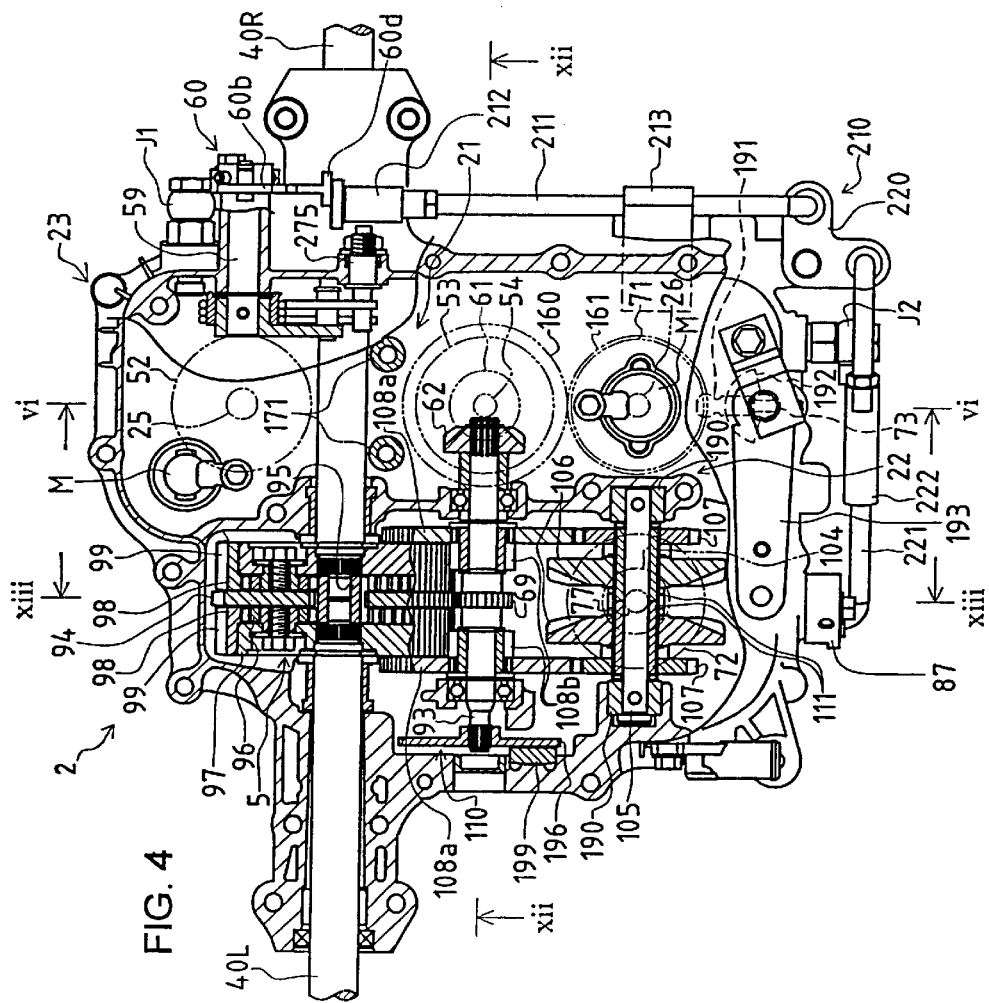
FIG. 4 is a plan view partly in section of the interior of an integral transaxle apparatus 2 which is of an independent steering type.

As shown in FIG. 4, apparatus 2 comprises a driving HST 21 for driving a vehicle forwardly and rearwardly, a steering HST 22 for steering the vehicle, left and right axles 40L and 40R, a differential gear unit 5 including planetary gears for differentially connecting axles 40L and 40R, and some drive trains (gear trains) interlocking component elements 21, 22 and 5 with one another.

Figure 6:
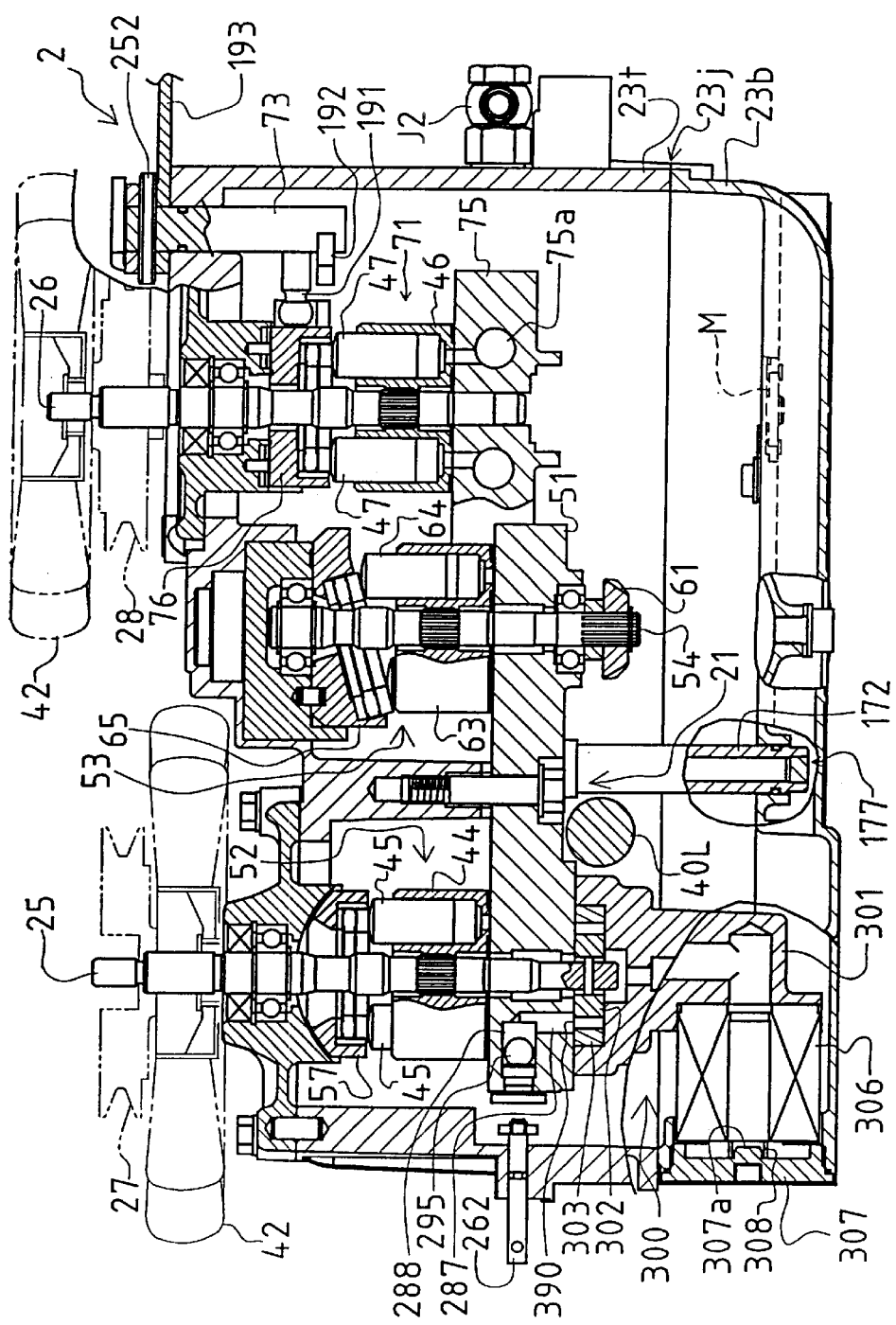
FIG. 6 is a cross-sectional view taken on line vi—vi of FIG. 4.
Figure 12:
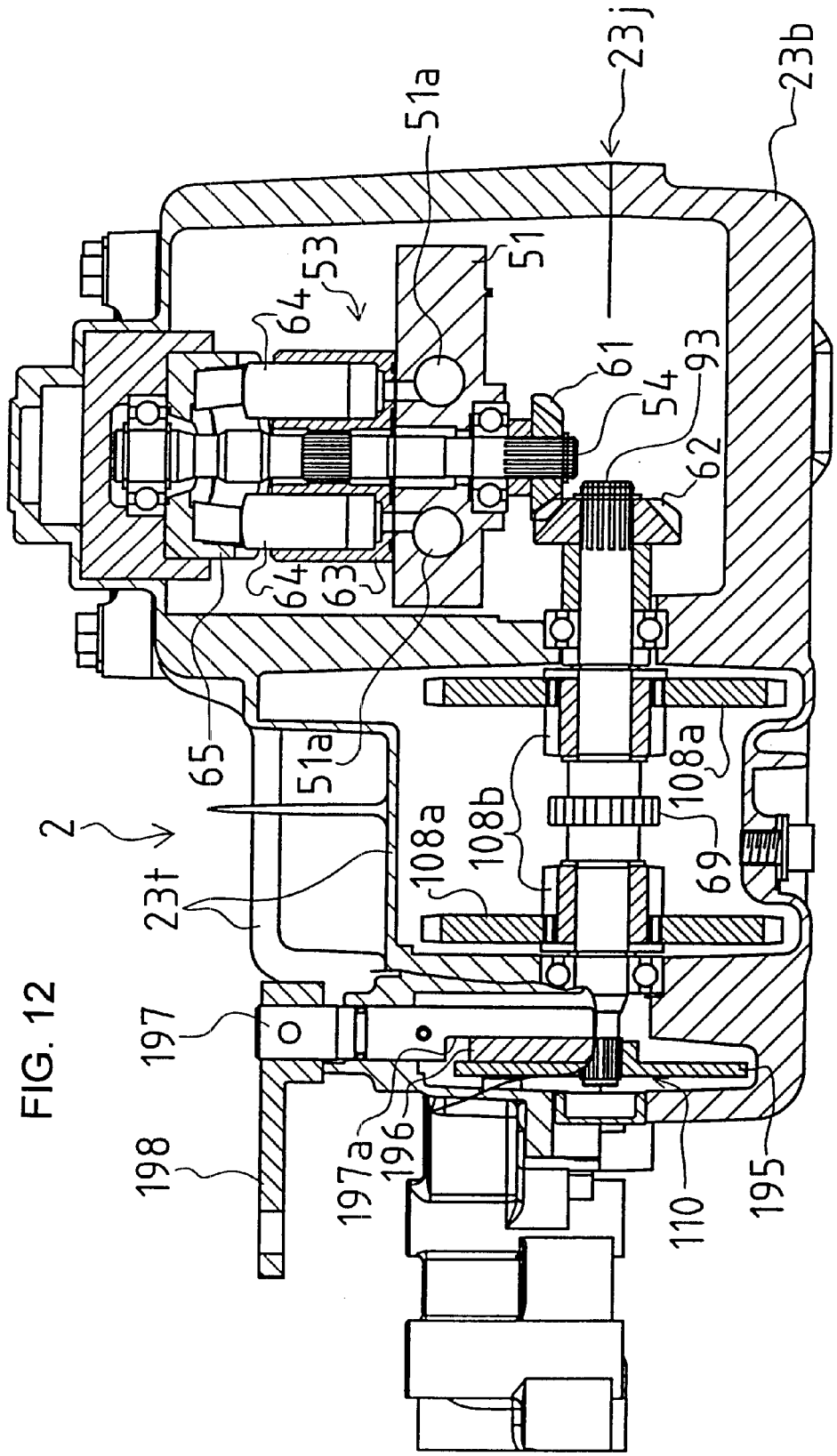
FIG. 12 is a cross sectional view taken on line xii—xii of FIG. 4.
Figure 13:
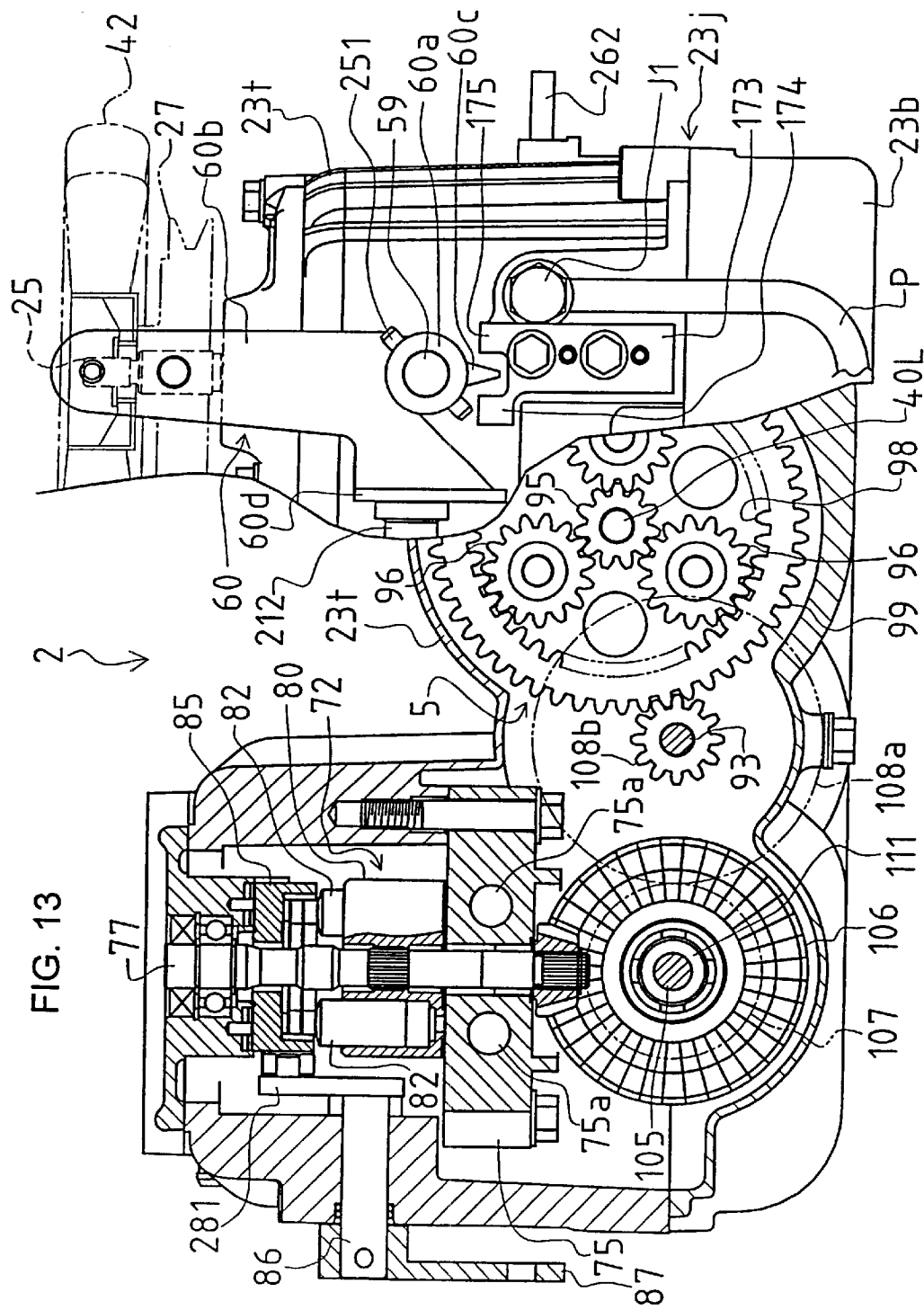
FIG. 13 is a cross sectional view taken on line xiii—xiii of FIG. 4.

A housing 23 contains all of elements 21, 22 and 5, axles 40L and 40R and the above said driving trains. As best shown in FIG. 6, housing 23 consists of an upper half 23t and a lower half 23b joined with each other along a horizontal surrounding joint surface 23j. Bearing portions for a support shaft 105 and a transmission shaft 93 as discussed below are formed by halves 23t and 23b, whereby resulting shafts 105 and 93 journalled therethrough are horizontally disposed with their axes on surface 23j, as shown in FIGS. 12 and 13. Bearing portions for axles 40L and 40R are formed by upper half 23t above surface 23j, as shown in FIGS. 6 and 13.

Housing 23 is full of a predetermined amount of oil. A magnet M as a filter is properly disposed in housing 23, as shown in FIG. 4 and 6. Metallic dust which has floated in the oil sump within housing 23 sticks to magnet M, thereby cleaning the oil in housing 23.

Figure 5:
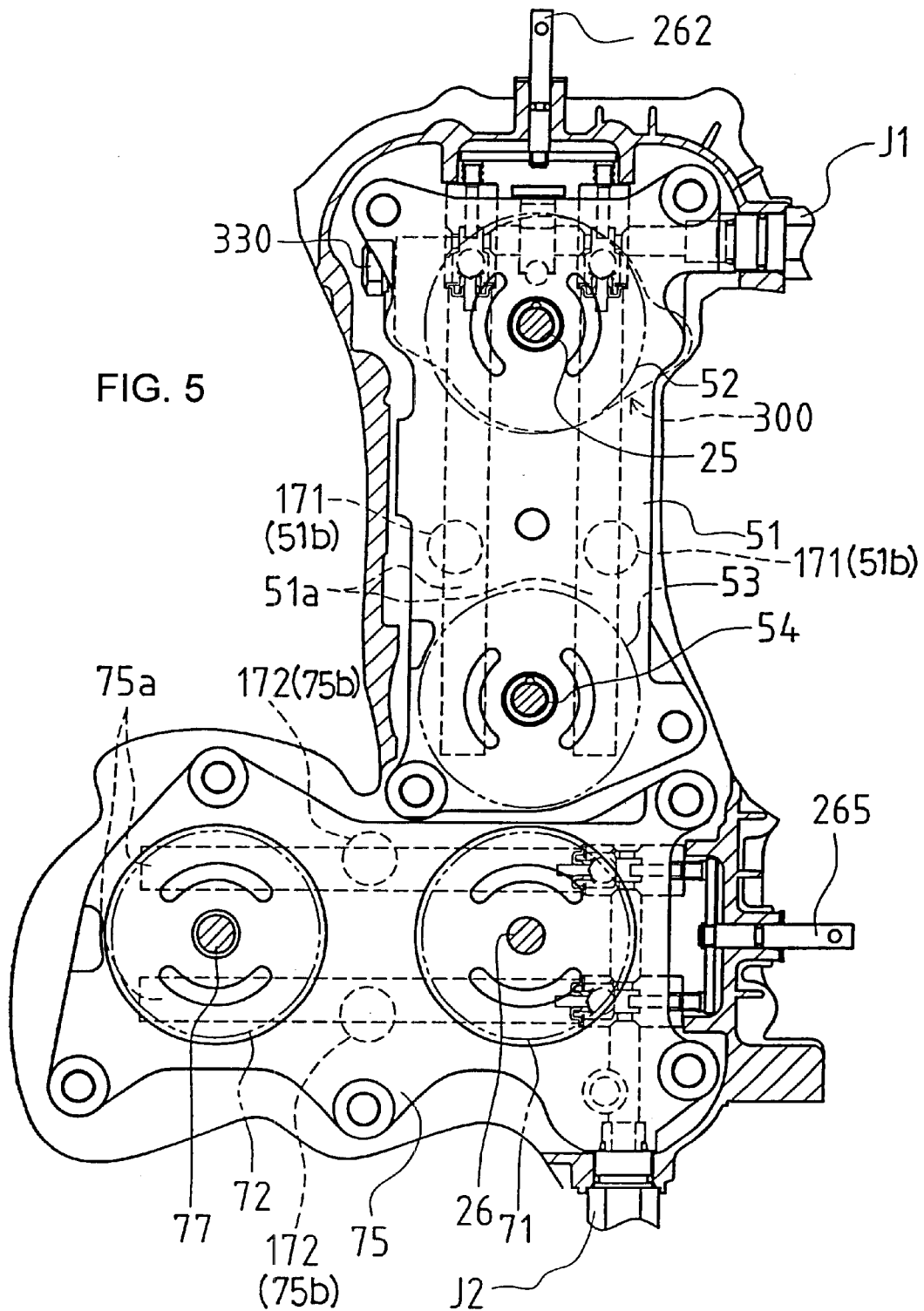
FIG. 5 is a perspective plan view of the same from which a housing 23 is removed.

Referring to the interior of housing 23 as shown in FIGS. 4 and 5, a center section 51 is disposed along the inner right side wall of housing 23, and a center section 75 is disposed along the inner rear wall thereof perpendicular to center section 51.

Center sections 51 and 75 shaped like flat plates may be identical with each other, so as to save manufacturing costs. They are both oriented horizontally. A hydraulic pump 52 and a hydraulic motor 53 are mounted onto the top surface of center section 51, thereby constituting driving HST 21. Hydraulic pump 52 and motor 53 of driving HST 21 are aligned in a row along the inner right side wall of housing 23. A hydraulic pump 71 and a hydraulic motor 72 are mounted onto the top surface of center section 75, thereby constituting steering HST 22. Hydraulic pump 71 and motor 72 are aligned in a row along the inner rear side wall of housing 23. Pumps 52, 71 and motors 53, 72 all have vertical rotary axes.

Axles 40L and 40R are differentially connected to each other through differential gear unit 5 including planetary gears. Utmost ends of axles 40L and 40R project laterally outwardly from housing 23, as shown in FIG. 4. In plan view as shown in FIG. 4, differential gear unit 5 is laterally opposed to center section 51, and is disposed before center section 75.

The positional relationship among HSTs 21 and 22 and differential gear unit 5 best shown in FIG. 4 is an example. Alternatively, HST 21 and differential gear unit 5 may be exchanged and HST 22 laterally reversed (pump 71 and motor 72 are exchanged). Further alternative configurations may be utilized without departing from the spirit of the invention.

Figure 11:
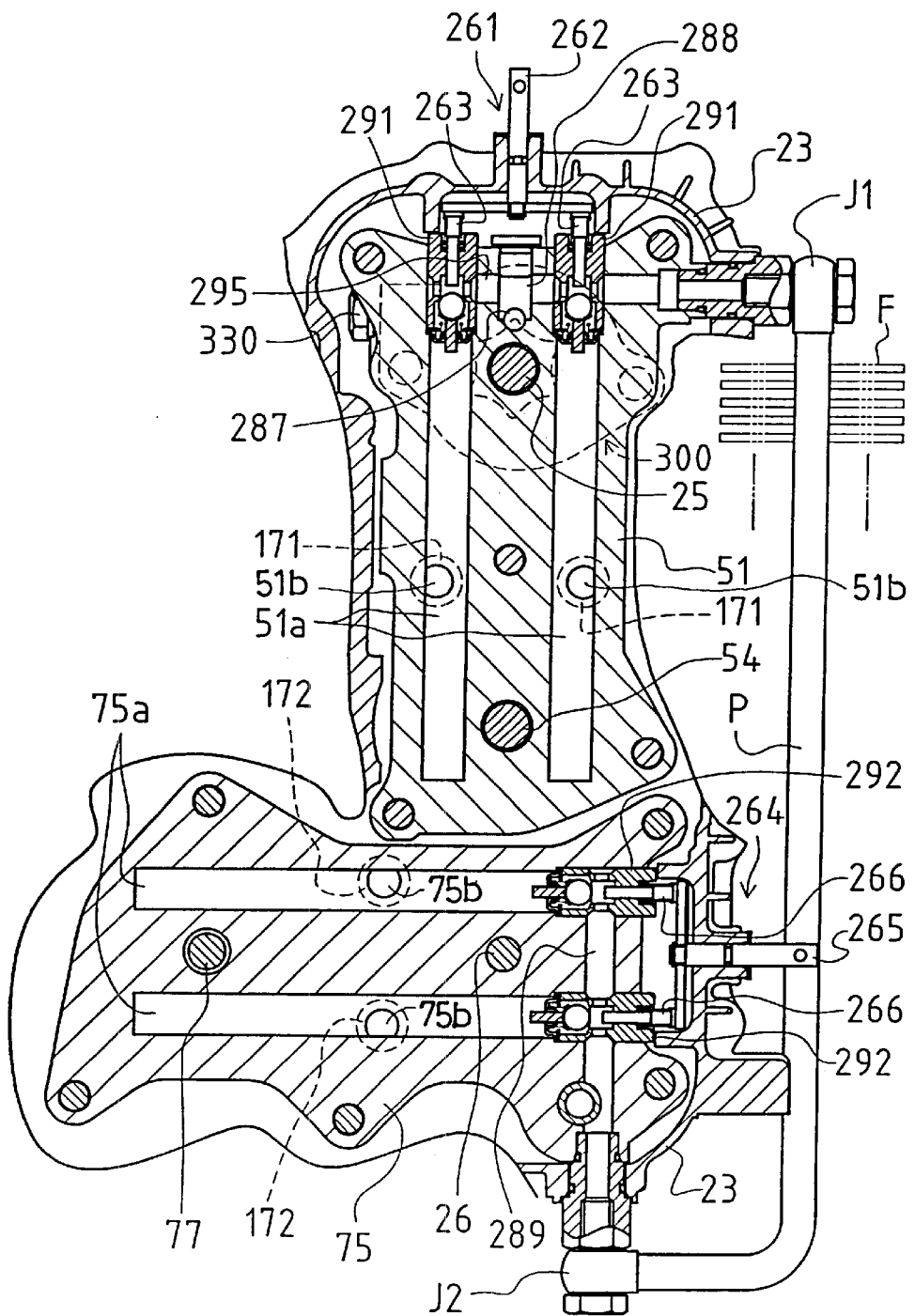
FIG. 11 is a sectional plan view of center sections 51 and 75 of twin HSTs 21 and 22.
Figure 26:
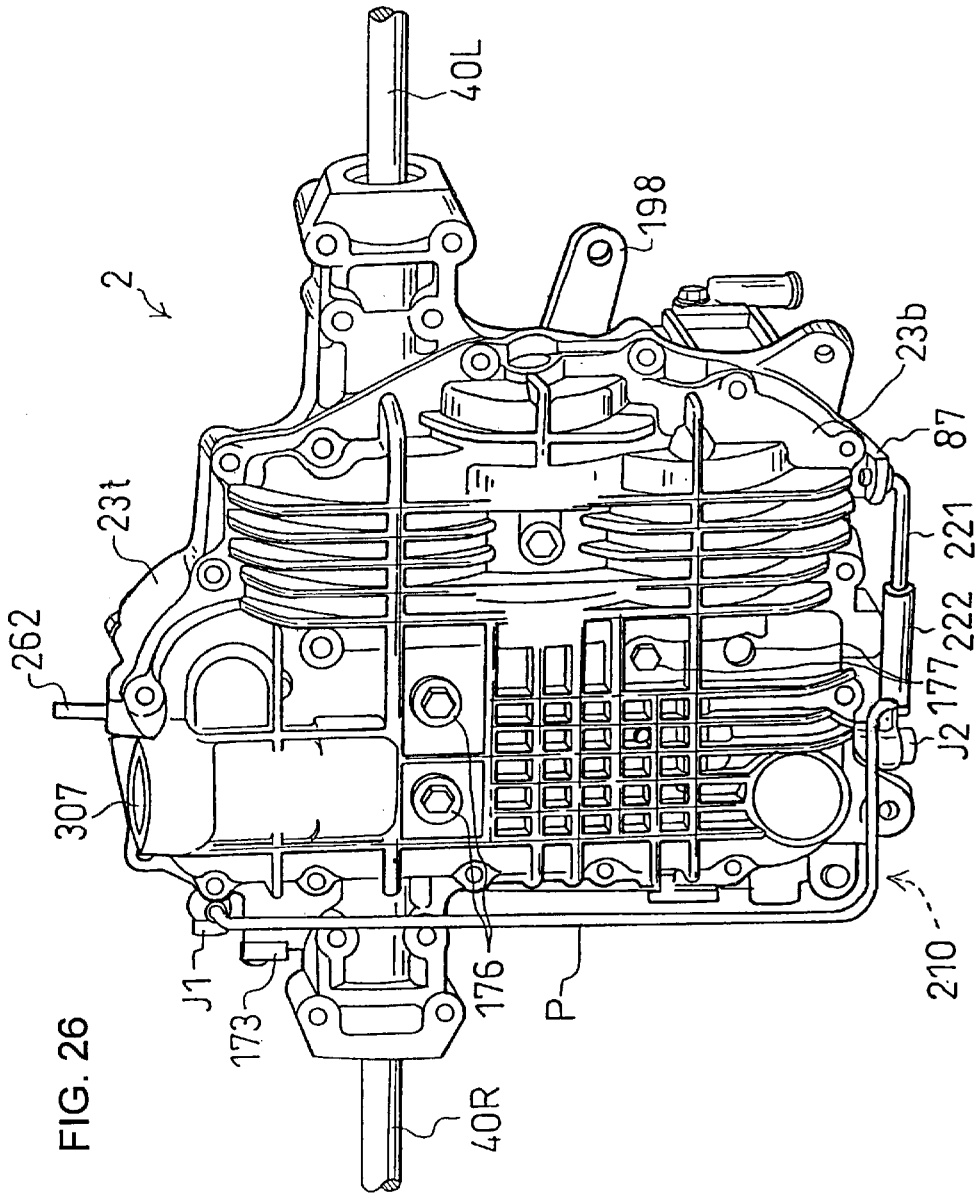
FIG. 26 is a perspective bottom view of the same.

Referring to FIGS. 5 and 11, each of center sections 51 and 75 is provided therein with two horizontally parallel oil passages 51a or 75a for fluidly connecting corresponding hydraulic pump and motor to each other. Vertical oil passages 51b are downwardly extended from respective oil passages 51a so as to be open at the bottom of center section 51. Similarly, vertical oil passages 75b which are extended from respective oil passages 75a are open at the bottom of center section 75. Corresponding to respective oil passages 51b and 75b, two draining holes 176 and two draining holes 177 are bored through the bottom of housing 23, as shown in FIG. 26. As shown in FIGS. 5, 6 and 11, each of two vertical draining pipes 171 is interposed between the bottom opening of each passage 51b and each hole 176, and each of two vertical draining pipes 172 between the bottom opening of each passage 75b and each hole 177, thereby enabling the oil in center sections 51 and 75 to be drained downwardly from housing 23. The bottom opening of each of pipes 171 and 172 is regularly plugged.

In vertically opposite to the hydraulic pumps and motors for two HSTs 21 and 22, gear trains, which interlock motor shafts 54 and 77 of hydraulic motors 53 and 72 to differential gear unit 5, are disposed below center sections 51 and 75.

Figure 20:
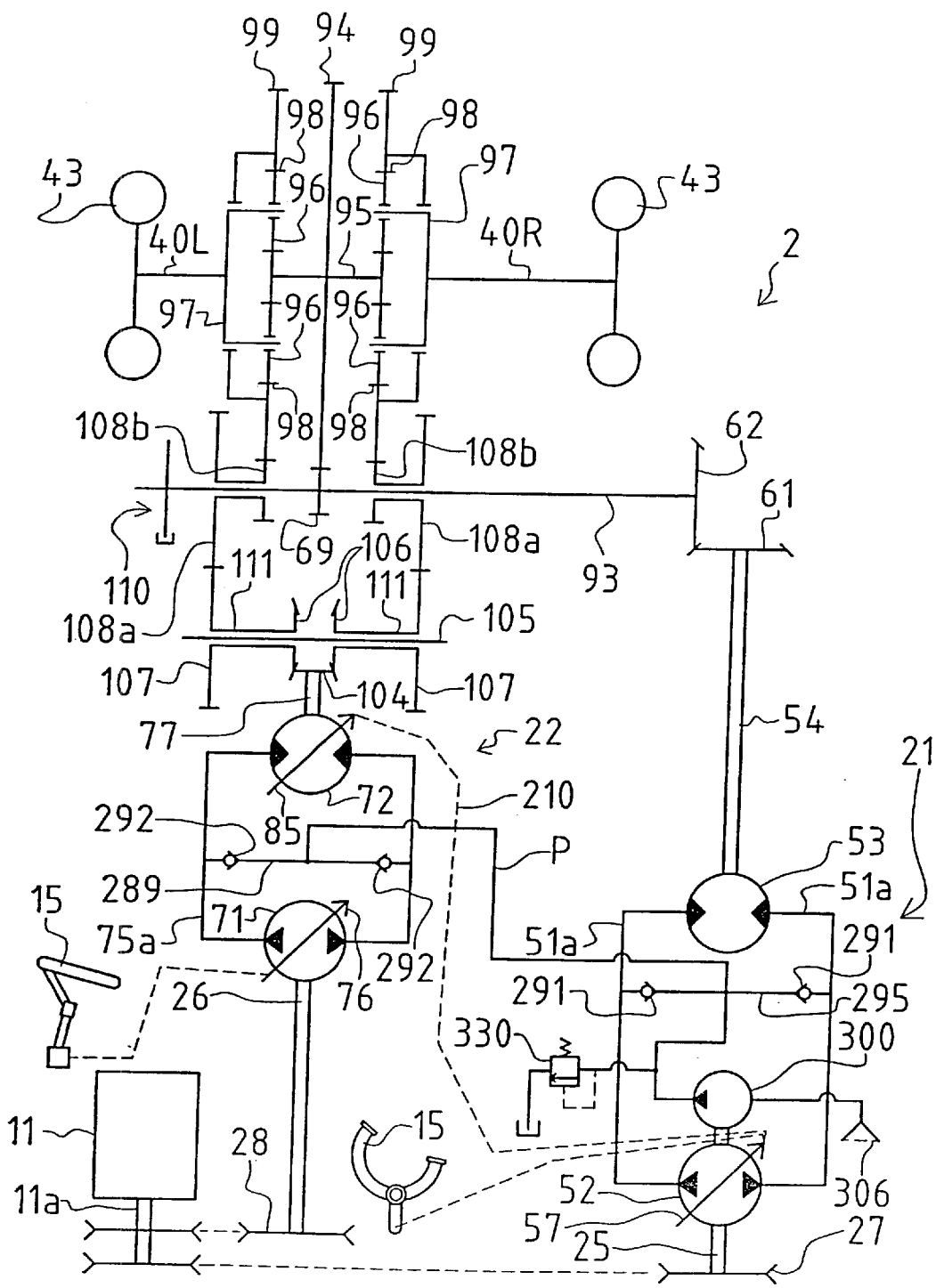
FIG. 20 is a diagram illustrating hydraulic circuits and gear mechanisms of independent-steering type apparatus 2, wherein hydraulic motor 72 of steering HST 22 is of a variable displacement type whose swash plate 85 interlocks with swash plate 76 through linkage 210.
Figure 21:
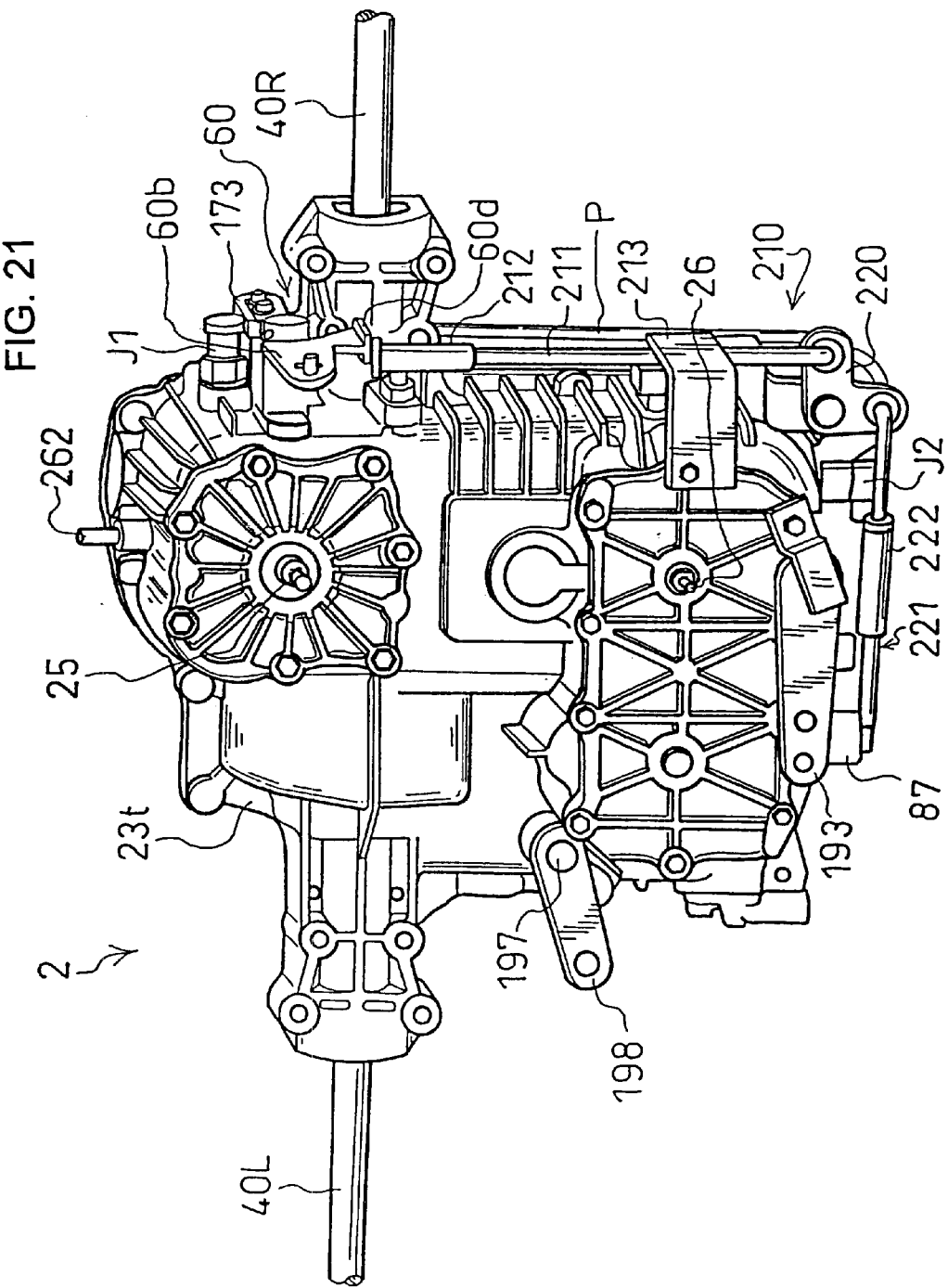
FIG. 21 is a perspective plan view of apparatus 2.

As shown in FIGS. 6, 17 and 21–25, a pump shaft 25 of hydraulic pump 52 projects upwardly from the top of housing 23 (upper half 23t) so as to serve as a first input shaft, which is provided thereon with a first input pulley 27 and a cooling fan 42 (omitted in FIGS. 21–25). As shown in FIG. 20, a belt is interposed between first input pulley 27 and an output pulley fixed on output shaft 11a of engine 11.

Similarly, as shown in FIGS. 6 and 21–25, a pump shaft 26 of hydraulic pump 71 projects upwardly from the top of housing 23 so as to be provided thereon with a second input pulley 28 and another cooling fan 42 (omitted in FIGS. 21–25), thereby serving as a second input shaft. As shown in FIG. 20, a belt is interposed between second input pulley 28 and another output pulley fixed on output shaft 11a.

Pump shaft 26 of hydraulic pump 71 in steering HST 22 may be alternatively driven by the output of motor shaft 54 of hydraulic motor 53 in driving HST 21 through mechanical means, such as gears. In other words, there can be provided two types for integral transaxle apparatus 2 including driving HST 21 and steering HST 22. One is named an independent steering type, wherein pump shaft 26 is driven by a prime mover (in this embodiment, engine 11) independently of the output of motor shaft 54. The other is named a dependent steering type, wherein pump shaft 26 is driven by motor shaft 54. However, the present invention is provided for solving the problem involved in the independent steering type, so that the shown embodiments and the above and below descriptions thereof refer to only the independent steering type.

As shown in FIG. 6, pump (input) shaft 25 projects downwardly through center section 51 so as to transmit power into a charge pump 300 attached onto the bottom surface of center section 51. Charge pump 300 driven by pump shaft 25 absorbs oil in housing 23 through a strainer 306, so as to compensate for leak of operating oil in two HSTs 21 and 22.

Figure 7:
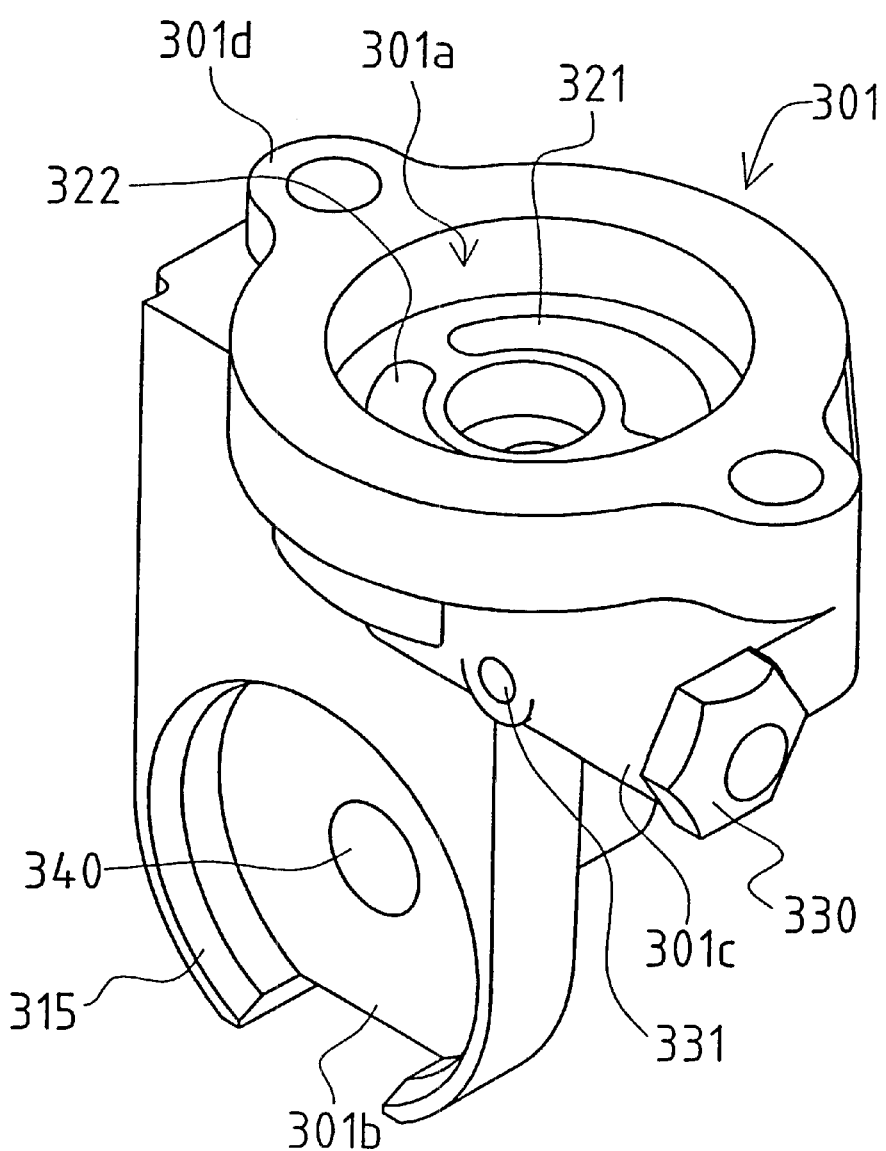
FIG. 7 is a perspective view of a charge pump casing 301.

Detailed description will now be given on charge pump 300. Center section 51 is provided on the bottom surface thereof with a charge pump mounting surface onto which a pump casing 301 is attached. As shown in FIG. 7, casing 301 is provided at the top portion thereof with a seat 301d having a horizontal surface to be stuck to the bottom surface of center section 51, and also with a downwardly recessed rotor chamber 301a for containing rotors, an inner rotor 302 and an outer rotor 303. Casing 301 is extended downwardly and bent laterally so as to integrally form retainers 301b and 301c for strainer 306 and a charge relief valve 330, respectively.

Figure 8:
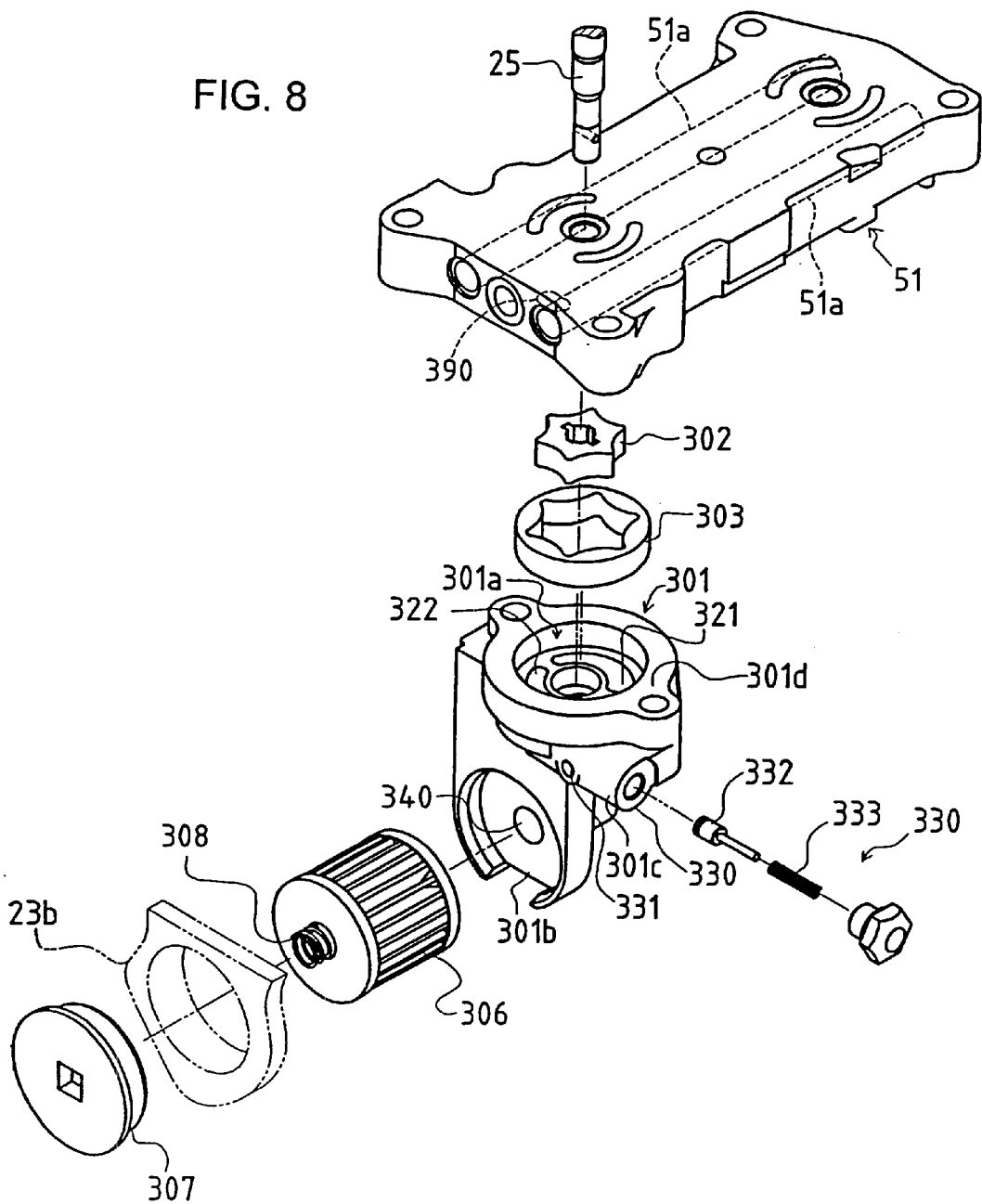
FIG. 8 is an exploded view in perspective of a strainer 306 and a charge relief valve 330 being attached to charge pump casing 301 and parts of charge pump 300 including casing 301 being attached to center section 51 as they appear during assembly thereof.

As shown in FIGS. 6 and 8, inner rotor 302 and outer rotor 303 are disposed within rotor chamber 301a. The lower end of pump shaft 25 is also disposed vertically in rotor chamber 301a so as to pass through an axial through-out hole of inner rotor 302 as shown in FIGS. 6 and 8, and fixed to inner rotor 302 as shown in FIG. 6, thereby transmitting its rotational force to inner rotor 302. Inner rotor 302 is torochoidal at its surrounding outer side surface. The outer rotor 303 has a torochoidally shaped internal gear which is diametrically larger than the torochoid outer surface of inner rotor 302. Outer rotor 303 is rotatably retained by casing 301 so as to be disposed off center of inner rotor 302, so that the internal gear of outer rotor 303 engages with the external gear of inner rotor 302. As a result, outer rotor 303 is rotated according to rotation of inner rotor 302 driven by pump shaft 25.

Figure 9:
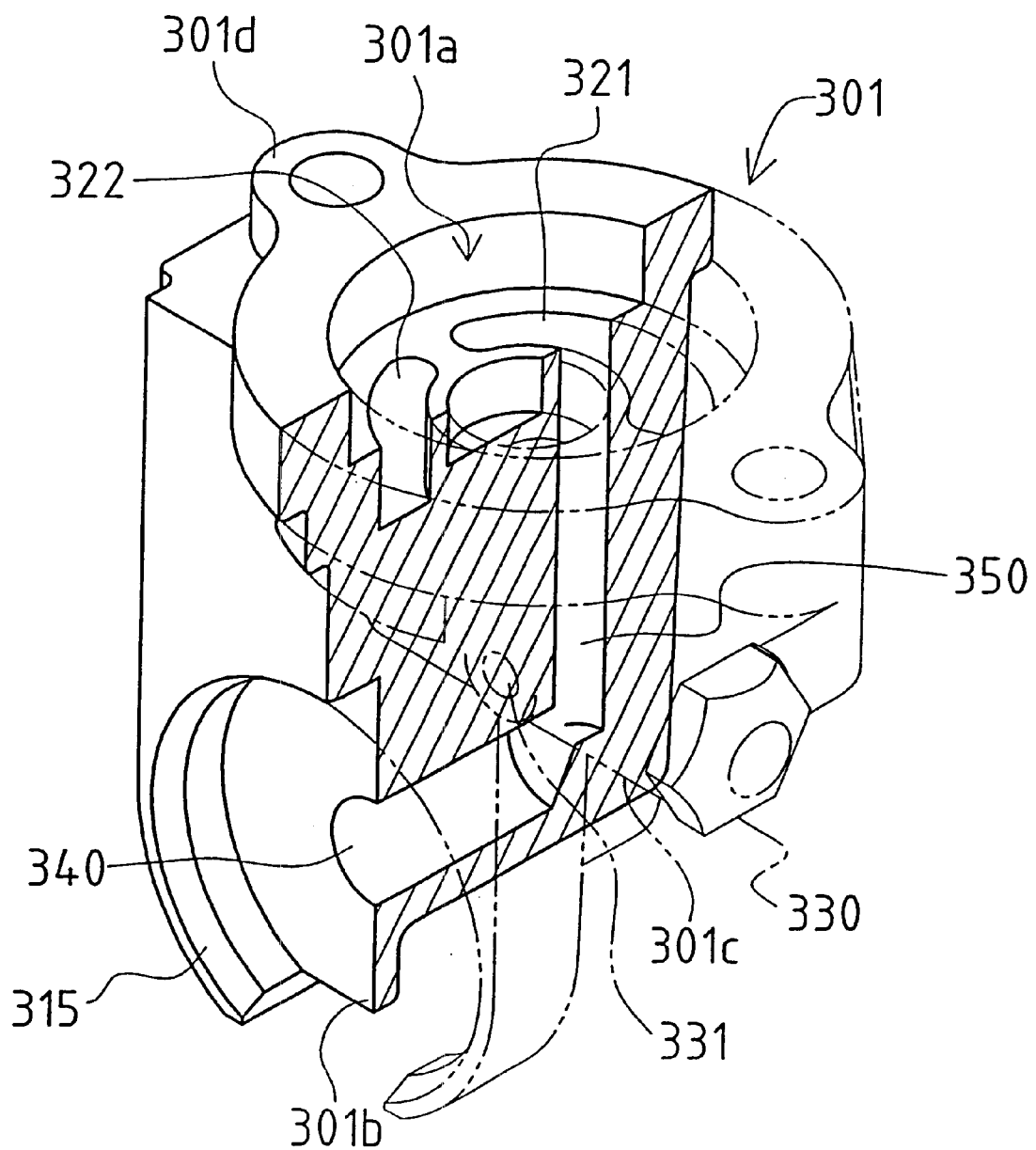
FIG. 9 is a perspective view partly in section of casing 301 illustrating its inner oil passages.
Figure 10:
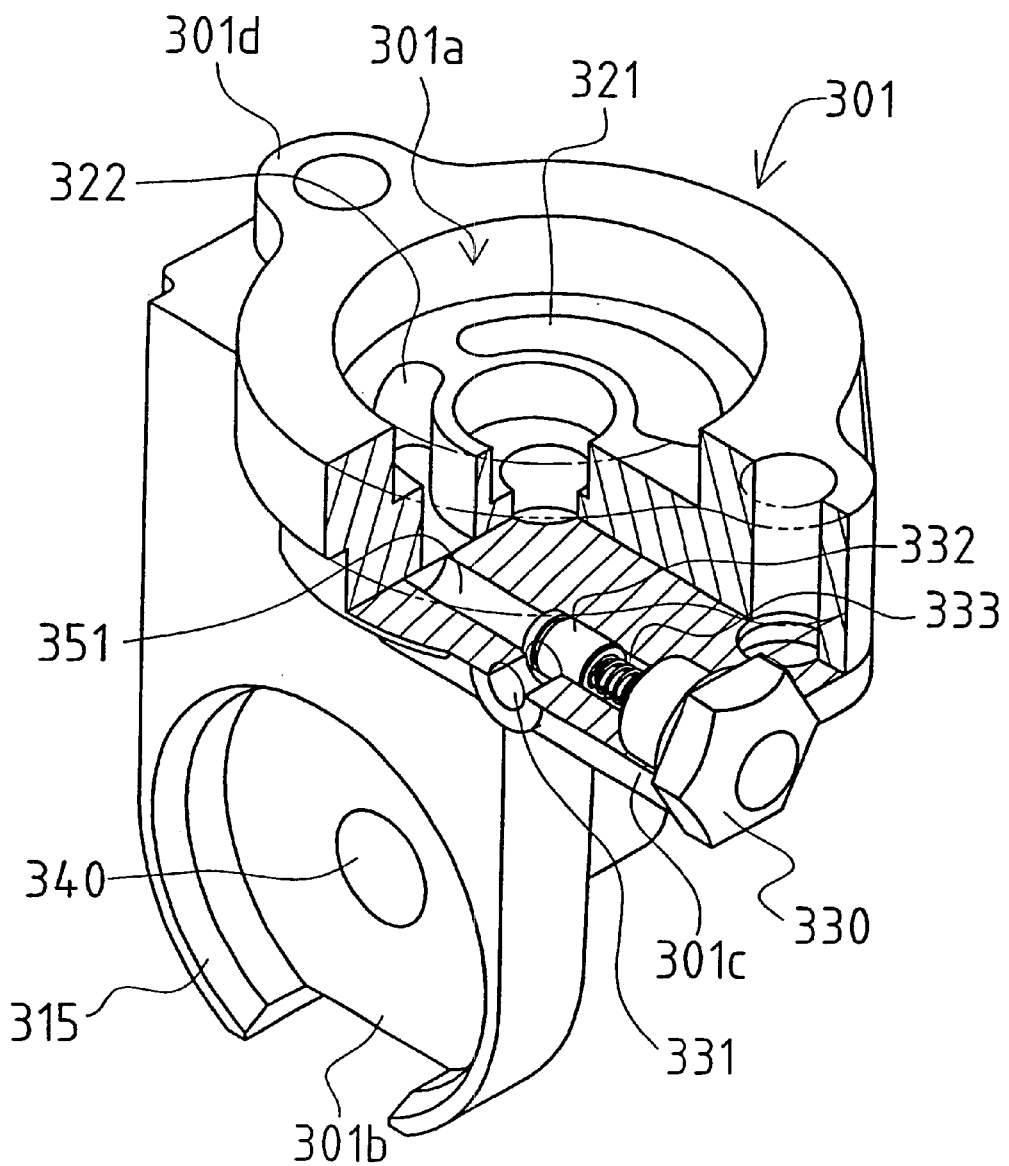
FIG. 10 is a perspective view partly in section of the same illustrating charge relief valve 330 disposed therein.

During the rotation of rotors 302 and 303, there appear an expanding space and a reducing space between rotors 302 and 303. In casing 301 is bored a suction port 321 which is open toward the reducing space in rotor chamber 301a. As shown in FIG. 9, in casing 301 is bored an oil passage 350 vertically extending from suction port 321 and an oil passage 340 horizontally extending between oil passage 350 and tile interior of retainer 301b.

As shown in FIG. 7, retainer 301b is formed in a circular shape at the lower side portion of casing 301 and is slantingly cut away at its inner peripheral edge so as to form a guide surface 315. As shown in FIG. 8, retainer 301b is disposed co-axially with an opening of the side wall of lower half 23b. Cylindrical strainer 306 is inserted at the inward end thereof along guide surface 315 into retainer 301b. As shown in FIGS. 6, 9, 25 and 26, a discoid lid 307 is removably plugged into the opening of lower half 23b. A projection 307a inwardly extending from the inner surface of lid 307, as shown in FIG. 6, is inserted into a spring 308 provided on the outward end of strainer 306. As a result, strainer 306 is fixedly interposed between lid 307 and retainer 301b, as shown in FIG. 6.

A discharge port 322 is bored in casing 301 so as to be open toward the expanding space in rotor chamber 301a. A charge relief valve 330 is provided into retainer 301c. In casing 301 is bored an oil passage 351 extending between discharge port 322 and the interior of retainer 301c, and a drain port 331 outwardly extending from the interior of retainer 301c.

Charge relief valve 330 comprises a spool 332 and a spring 333. Charge relief valve 330 limits the charge pressure of charge pump 300. If the pressure in discharge port 322 is increased beyond the predetermined degree, spool 332 pushed against spring 333 by the oil discharged from charge pump 300 makes drain port 331 communicate with the interior of retainer 301c, so that the excessively discharged oil is drained through drain port 331, thereby keeping the charge pressure equal to or lower than the predetermined.

In center section 51, an oil supplying passage 295 is interposed between two oil passages 51a, as shown in FIG. 11, and oil passages 287 and 288 are extended from the intermediate portion of passage 295, so as to be connected to a charge port 390 which is open at the bottom surface of center section 51, as shown in FIGS. 6 and 8.

Charge port 290 is open toward the expanding space between two rotors 302 and 303 in rotor chamber 301a. Oil passages 51a are charged therein with the operating oil pressurized by the pumping action of rotors 302 and 303 through charge port 290 and oil passages 287, 288 and 295 within center section 51. Each passage 51a is provided therein with ball check valve 291, as shown in FIG. 11, which is made open during the oil charging and checks the oil from passage 51a to passage 295. Passages 51a are thereby prevented from lack of hydraulic pressure.

A neutral returning member 261, as shown in FIG. 11, is slidably disposed in the side wall of housing 23 for making a short path between two valves 291 through passage 295. Member 261 projects outwardly from housing 23 so as to provide an operating portion 262, as shown in FIGS. 6, 11, 22, 23, 25 and 26, and is provided at the inward end thereof with two spools 263, as shown in FIG. 11, which are inserted into respective passages 51a so as to be disposed adjacently to balls of valves 291.

In such a case that a vehicle which has apparatus 2 is drawn by another vehicle, operating portion 262 is pushed so as to make neutral returning member 261 slide inwardly so that both spools 263 push balls of valves 291 against springs, whereby oil is drained from one passage 51a which is pressurized higher than the other. Thus, motor shaft 54 of driving HST 21 is made freely rotatable, so that wheels 43 fixed on axles 40L and 40R drivingly connected with motor shaft 54 are freely rotated without resistance during the traction.

Oil in passage 295 can be extracted from housing 23 through a joint J1. Similarly to center section 51 having passage 295 and check valves 291, center section 75 involves oil supplying passage 289 interposed between two check valves 291 disposed in respective passages 75a. Passage 289 is fluidly connected with a joint J2 projecting from housing 23. As shown in FIGS. 11, 21, 23–26, an external conduit P is interposed between joints J1 and J2 surrounding the bottom portion of housing 23, so as to make the oil in passage 295 flow into corresponding passage 75a through passage 289 and valve 292, thereby compensating for lack of oil in steering HST 22. While flowing through conduit P, the oil is cooled by the atmosphere. Additionally, conduit P may be provided therearound with fins F for enhancing the cooling effect as drawn in phantom lines in FIG. 11.

Also, similarly to neutral returning member 261 for driving HST 21, two oil passages 75a of steering HST 22 can be equal to each other in hydraulic pressure by neutral returning member 264, whose external portion projecting outwardly from housing 23 is provided thereon with all operation portion 265.

Due to the above mentioned construction, both HSTs 21 and 22 are compensated for lack of oil by the pumping action of charge pump 300.

Detailed description will now be given on driving HST 21 which is so constructed that hydraulic pump 52 and hydraulic motor 53 are mounted on the top of center section 51 as mentioned above. Referring to variable displacement hydraulic pump 52 as shown in FIG. 6, a cylinder block 44 is rotatably and slidably mounted on the pump mounting surface at the top of center section 51. Vertical pump shaft 25 is axially and is not relatively rotatably disposed in cylinder block 44. A plurality of pistons 45 are reciprocally slidably inserted with respective biasing springs (not shown) into cylinder block 44. The heads of pistons 45 abut against a movable swash plate 57 which is operated slantwise so as to control the amount and direction of oil discharged from hydraulic pump 52.

A control shaft 59 is supported by the wall of housing 23 in parallel to axles 40 so as to operate swash plate 57 slantwise, as shown in FIGS. 4, 13–15 and 17. An arm member 271 is fixed onto the inward end of control shaft 59 in housing 23.

Figure 14:
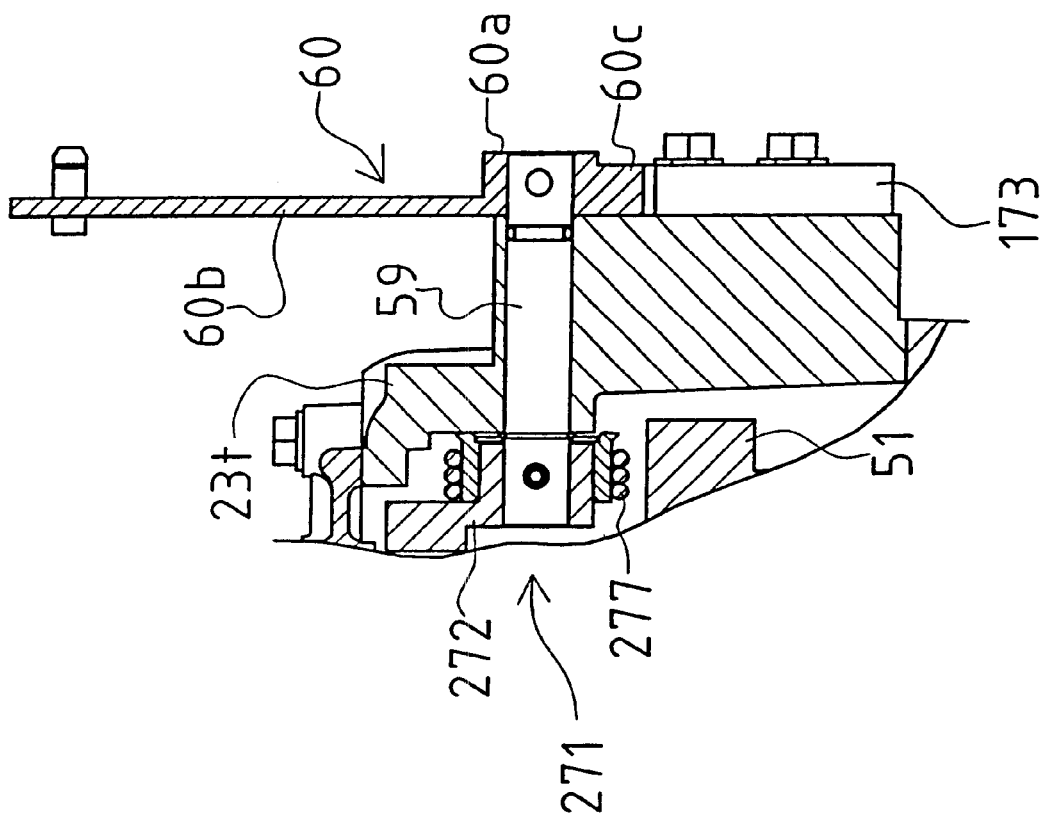
FIG. 14 is a sectional fragmentary side view, on an enlarged scale, of a control shaft 59 for rotating a movable swash plate 76 of a hydraulic pump 52 of driving HST 21 and its surroundings.

Referring to FIG. 14, a swash plate arm 272 as an integral part of arm member 271 is extended from a boss 280 of arm member 271 fixed around control shaft 59 so as to engage at the utmost end thereof with swash plate 57.

Figure 15:
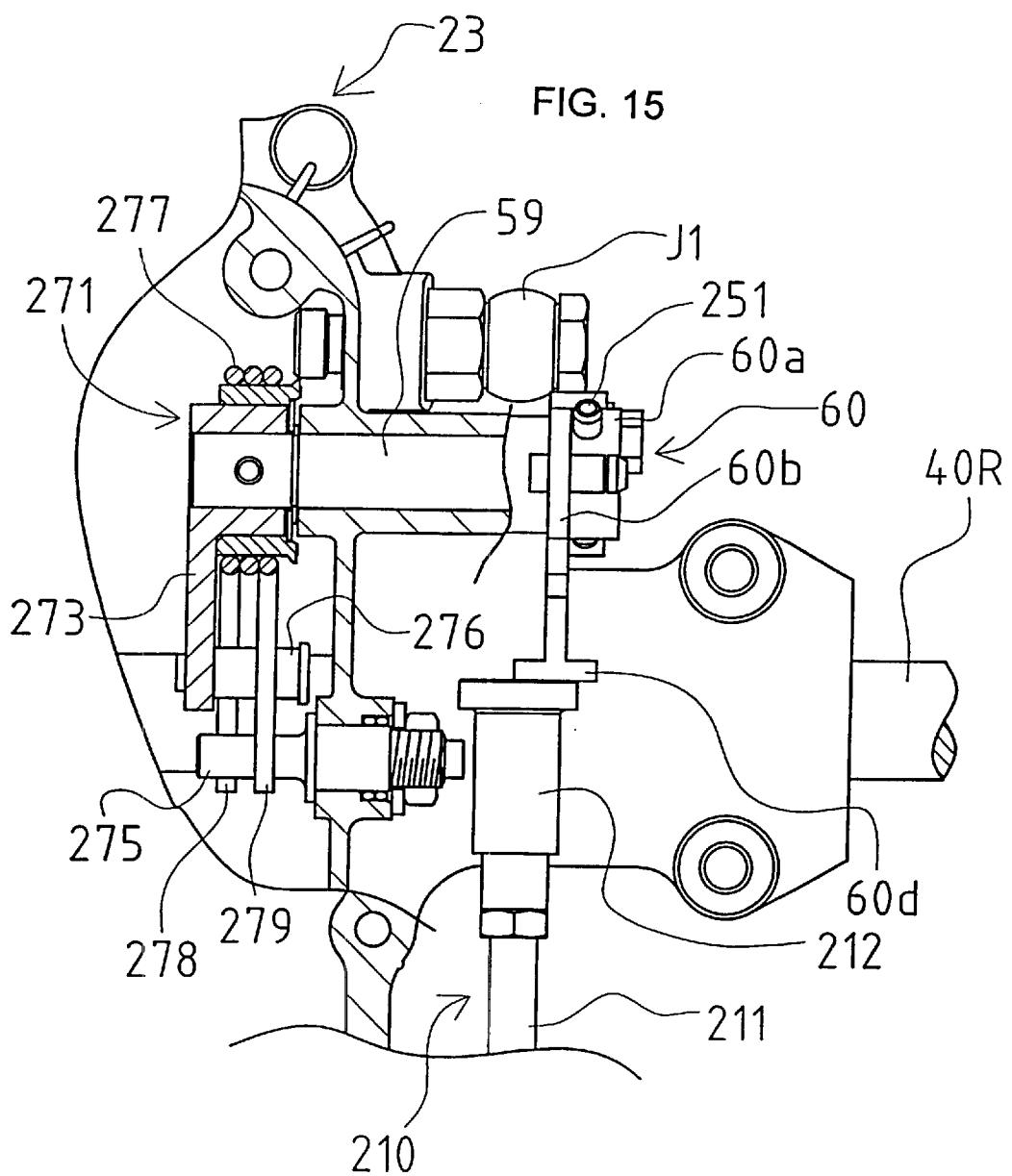
FIG. 15 is a sectional fragmentary plan view, on an enlarged scale, of the same.

Referring to FIG. 15, a neutral holding arm 273 as another integral part of arm 271 is extended backwardly from boss 280. An inward projection 275 is provided on the inner side wall of housing 23 behind control shaft 59. A neutral biasing spring 277 is provided around boss 280. Both end portions 278 and 279 of spring 277 are extended backwardly so as to sandwich projection 275 up and down. A projection 276 is integrally provided on the utmost end of arm 273. The utmost end of projection 276 is disposed between end portions 278 and 279 of spring 277.

Figure 24:
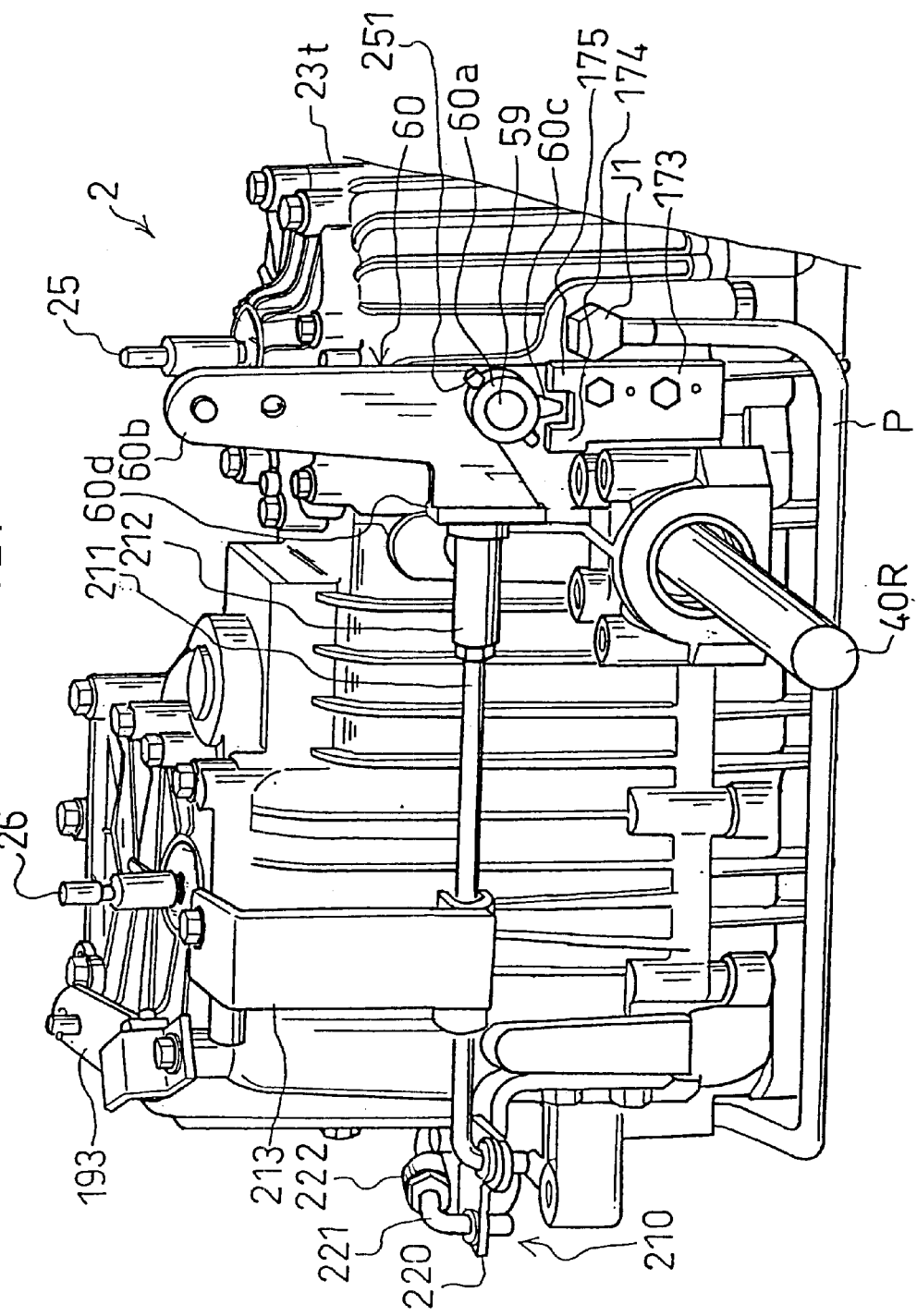
FIG. 24 is a perspective left side view of the same.
Figure 25:
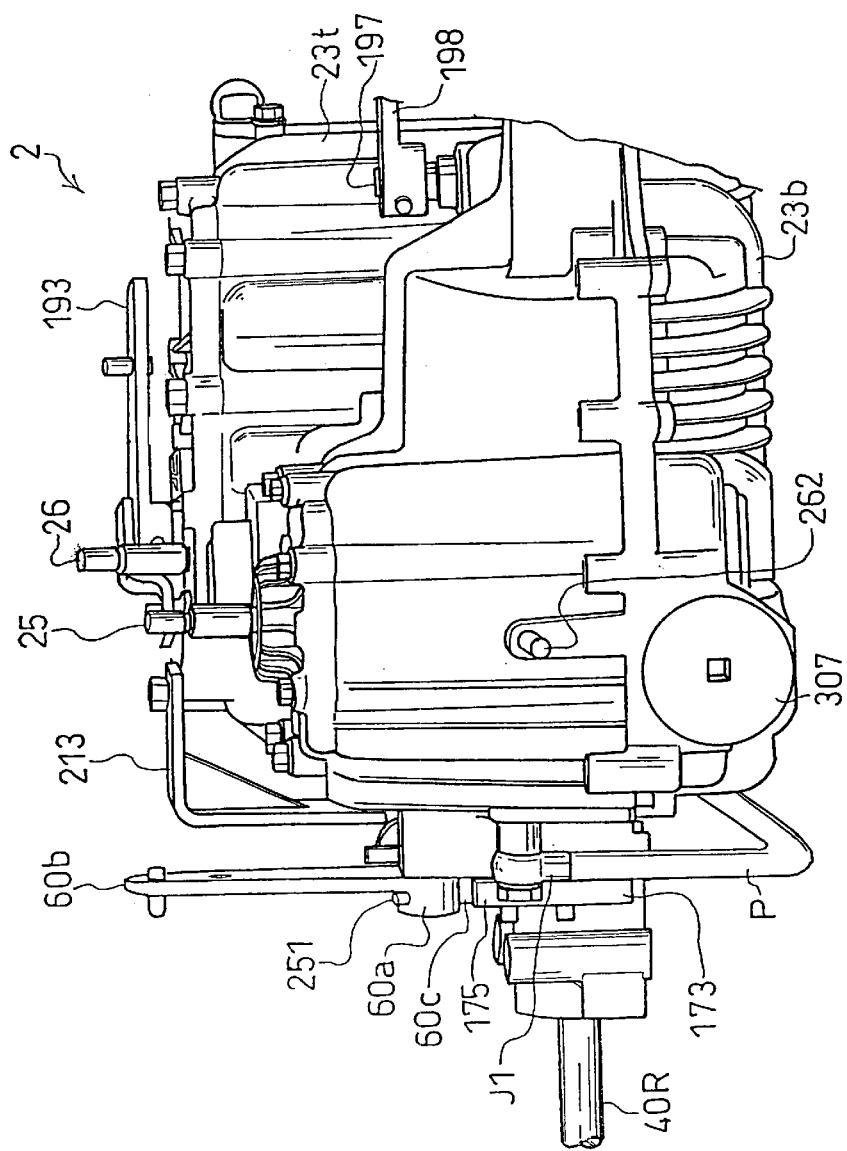
FIG. 25 is a perspective rear view of the same.

As shown in FIGS. 4, 13–15, 21, 24 and 25, a control arm 60 is fixed onto control shaft 59 outside housing 23. As best shown in FIG. 24, control arm 60 is integrally provided with a boss 60a, an arm 60b, a projection 60c and a push edge 60d. Boss 60a is fixed onto control shaft 59 with a pin 25t. Arm 60b projects upwardly from boss 60a, so as to interlock with a speed change operating tool (in this embodiment, speed change pedal 15) through a linkage or the like. Projection 60c projects downwardly from boss 60a. Push edge 60d projects backwardly from boss 60a.

As shown in FIG. 14, a limiter 173 is fixed onto the external side surface of housing 23 below control shaft 59, so as to limit the rotational range of control arm 60. Projection 60c of control arm 60 is disposed between two projections 174 and 175 as integral parts of limiter 173. Either of projections 174 and 175 abuts against projection 60c rotated to a certain degree.

Due to the above construction, when speed change pedal 15 is trod down, control arm 60 interlocking with pedal 15 is rotated together with control shaft 59, so that swash plate 57 connected to control shaft 59 through arm 272 is rotated slantwise, thereby controlling the amount and direction of oil discharged from hydraulic pump 52.

As shown in FIGS. 5, 13–15 and 20, pressure oil discharged from hydraulic pump 52 is circulated between pump 52 and motor 53 through two oil passages 51a.

Hydraulic motor 53 in this embodiment is of a fixed displacement type, however, that shown in FIG. 35 in another embodiment as discussed below is of a variable displacement type.

Referring to fixed displacement hydraulic motor 53 of this embodiment, center section 51 forms a motor mounting surface on the top thereof so as to be disposed behind axle 40R opposite to the pump mounting surface thereof, as shown in FIGS. 4 and 6. Cylinder block 63 is rotatably and slidably mounted onto the motor mounting surface, as shown in FIGS. 6 and. 12. Similarly to hydraulic pump 52, a plurality of pistons 64 with respective biasing springs are reciprocally slidably inserted into cylinder block 63 and abut at the heads thereof against a fixed swash plate 65. Vertical motor shaft 54 is axially and not relatively rotatably disposed in cylinder block 53.

As shown in FIGS. 6 and 12, motor shaft 54 penetrates center section 51 and projects downwardly so as to be fixedly provided thereon with a bevel gear 61. Bevel gear 61 engages with a bevel gear 62 fixed on driving transmission shaft 93 rotatably disposed in parallel to axles 40 in housing 23, as shown in FIG. 12. Shaft 93 forms a driving gear 69 which engages with a center gear 94 of differential gear unit 5.

Figure 16:
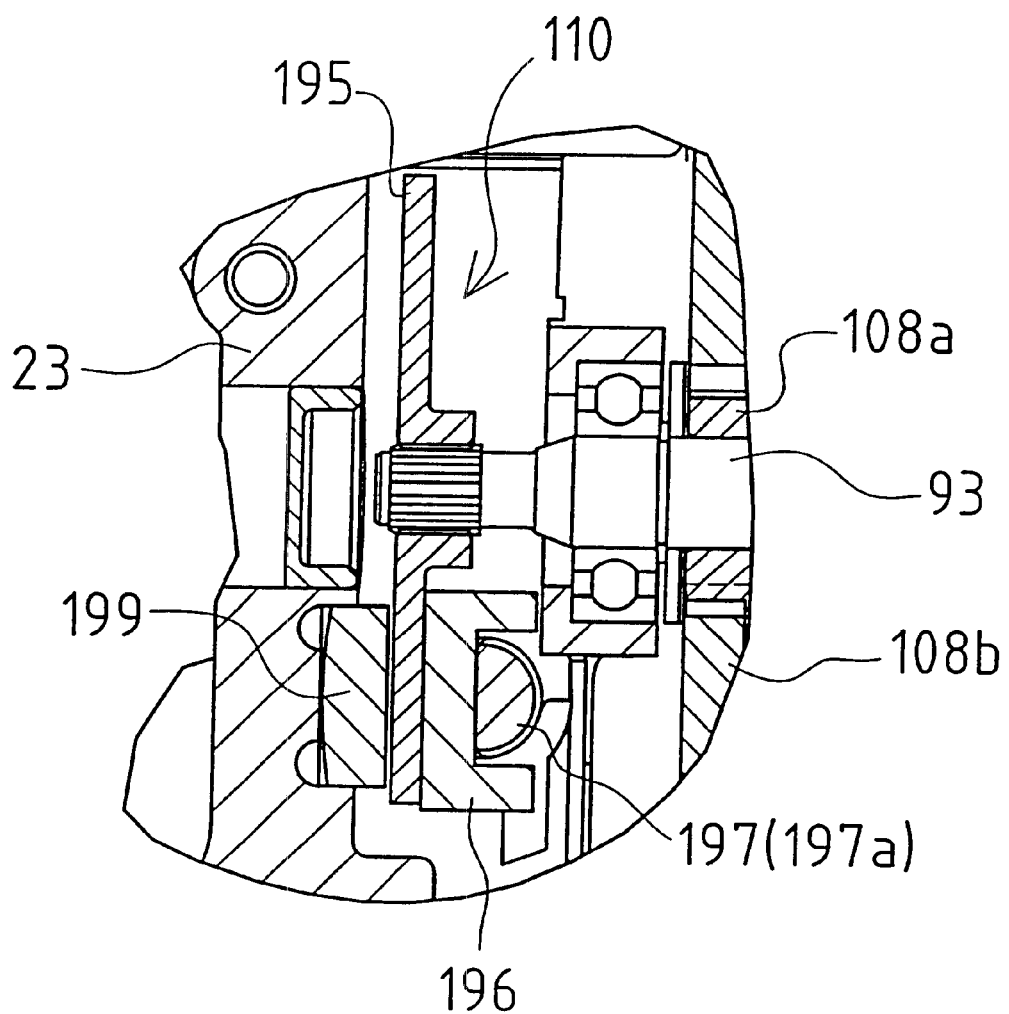
FIG. 16 is a sectional fragmentary plan view, on an enlarged scale, of a brake 110 and its surroundings.
Figure 22:
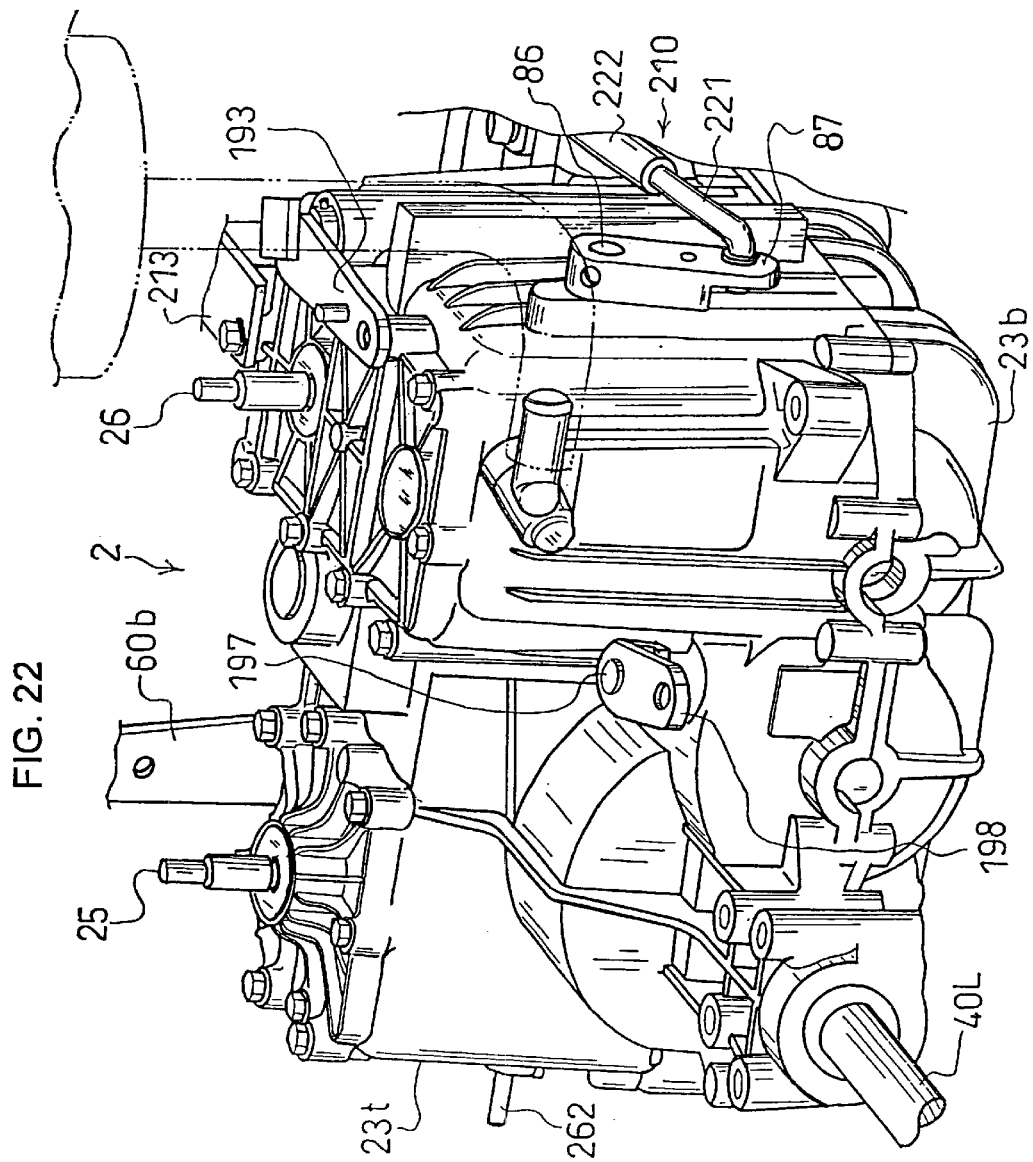
FIG. 22 is a perspective right side view of the same.
Figure 23:
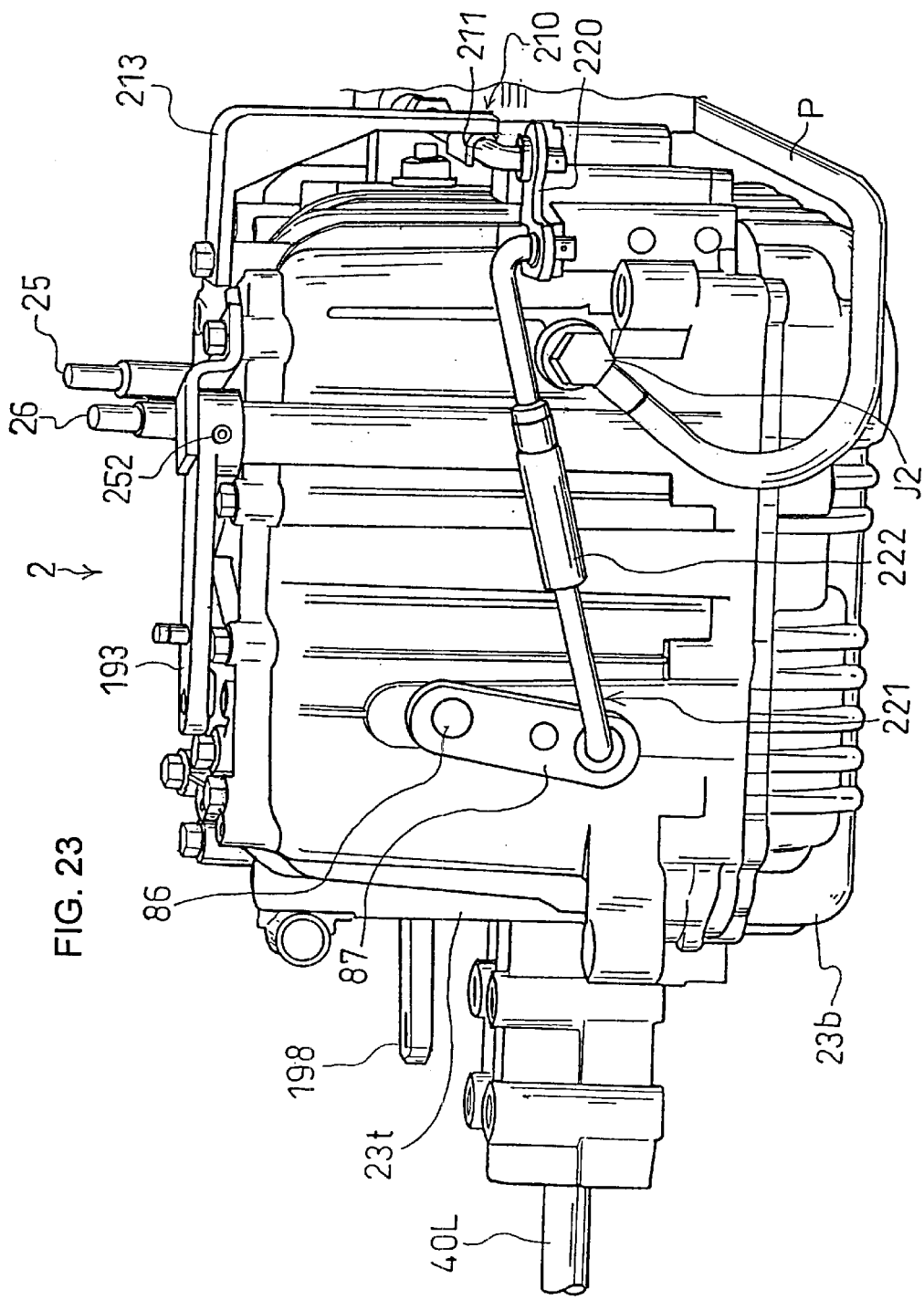
FIG. 23 is a perspective front view of the same.

Detailed description will now be given on a brake 110 disposed on shaft 93. As shown in FIGS. 12 and 16, a brake disk 195 is not relatively rotatably but slidably provided on an end of shaft 93. A brake pad 196 is disposed adjacently to brake disk 195, and a brake pad 199 is caught in the inner wall of housing 23 so as to be disposed adjacently to brake disk 195 in opposite to brake pad 196. A brake control shaft 197 integrally forming a cam 197a is vertically disposed in contact with brake pad 196. Brake control shaft 197 projects upwardly from housing 23 so as to be fixedly provided thereon with a brake control lever 198, as shown in FIGS. 12, 22 and 23. Lever 198 interlocks with the above-mentioned brake pedal through a linkage or the like. When the brake pedal is trod down, shaft 197 is rotated so that cam 197a of shaft 197 presses brake pad 196 against brake disk 195.

Brake disk 195 is pushed outwardly by cam 197a through pad 196 and is pressed against brake pad 199. Thus, brake disk 195, sandwiched between pads 196 and 199, and shaft 93 are braked.

Next, detailed description will be given on steering HST 22 comprising hydraulic pump 71 and hydraulic motor 72 mounted on center section 75. In this embodiment described hereinafter, center section 75 of steering HST 22 is separate from center section 51 of driving HST 21. Alternatively, a single center section may be disposed so as to be shared between both HSTs 21 and 22.

Referring to variable displacement hydraulic pump 71, vertical pump shaft 26 rotatably penetrates center section 75 and projects downwardly so as to be fixedly provided thereon with an input gear 161, as shown in FIGS. 4 and 20. Input gear 161 engages with steering driving gear 160 fixed on motor shaft 54 of driving HST 21, so that the rotational force of motor shaft 54 is transmitted to pump shaft 26.

Pump shaft 26 projects upwardly axially from the pump mounting surface formed at the top of center section 75, so as to be axially and not relatively rotatably disposed in a cylinder block 46 which is rotatably slidably mounted on the pump mounting surface, as shown in FIG. 6.

A plurality of pistons 47 with respective biasing springs are reciprocally slidably inserted into cylinder block 46 so as to abut at the heads thereof against a movable swash plate 76. Swash plate 76 is operated slantwise so as to control the amount and direction of oil discharged from hydraulic pump 71.

A control shaft 73 is vertically supported by the ceiling of housing 23 so as to operate swash plate 76, as shown in FIGS. 4 and 6. An arm 191 projects from control shaft 73 in housing 23, so as to engage at the utmost end thereof with swash plate 76, as shown in FIG. 6. A control lever 193 is fixed onto control shaft 73 through a pin 252 above housing 23, as best shown in FIGS. 6 and 23. Control lever 193 is connected with a steering operating means (steering wheel 14 in this embodiment) through a linkage (not shown).

Swash plate 76 is biased toward the neutral position. The biasing force and the neutral position may be adjustable. In housing 23, a limiter 192, shaped like a sector in plan view as shown in FIG. 4 and 6, is fixed onto shaft 73. When lever 193 is rotated to some degree, one of the two radial edges of limiter 192 comes to abut against the internal wall of housing 23, so as to limit the rotational range of lever 193.

Due to the above construction, steering wheel 14 is rotated so as to rotate control lever 193 and control shaft 73, thereby moving swash plate 76 slantwise through arm 191 for changing the direction and volume of operating oil discharged from hydraulic pump 71.

As shown in FIGS. 11 and 20, the oil is circulated between hydraulic pump 71 and motor 72 through both of second oil passages 75a.

According to the preferred embodiment, hydraulic motor 72 is of a variable displacement type. In this regard, a cylinder block 80 is rotatably and slidably mounted onto the motor mounting surface which is formed on the top of center section 75 leftward of the pump mounting surface on the same. Cylinder block 80 is provided therein with a plurality of reciprocally movable pistons 82 and springs for biasing them. A movable swash plate 85 abuts against the heads of pistons 82. A vertical motor shaft 77 is axially disposed in cylinder block 80 so as to fixedly engage therewith. Swash plate 85 is so operated as to change the rotary speed of shaft 77.

As shown in FIG. 13, a control shaft 86 is horizontally journalled by the side wall of housing 23 for operating swash plate 85 slantwise. A swing arm 281 is fixed at the basic end thereof onto the inward end of shaft 86 in housing 23. The utmost end of arm 281 engages with swash plate 85.

As shown in FIGS. 4, 13, 27–29 and 32, a control lever 87 fixed onto shaft 86 outside housing 23 interlocks through a linkage 210 with control arm 60 which operates swash plate 57 of hydraulic pump 52 in driving HST 21.

Hydraulic motor 72 may be replaced with that of a fixed displacement type. In this case, linkage 210 is unnecessary.

Description will now be given on linkage 210 in accordance with FIGS. 4, 13, 15, 17, and 21–26. A first link rod 211 is disposed along the outside of housing 23 and is slidably supported by a supporter 213 fixed onto housing 23. A head 212 of rod 211 is disposed adjacently to push edge 60d of control arm 60.

An L-like shaped arm 220 is pivoted at the intermediate position thereof onto a rearward outside corner of housing 23. First link rod 211 is pivotally connected to one end of arm 220. A second link rod 220 is pivotally interposed along the rear outside end of housing 23 between the other end of arm 220 and control lever 87. Rods 211 and 220 are substantially perpendicular to each other.

Figure 17:
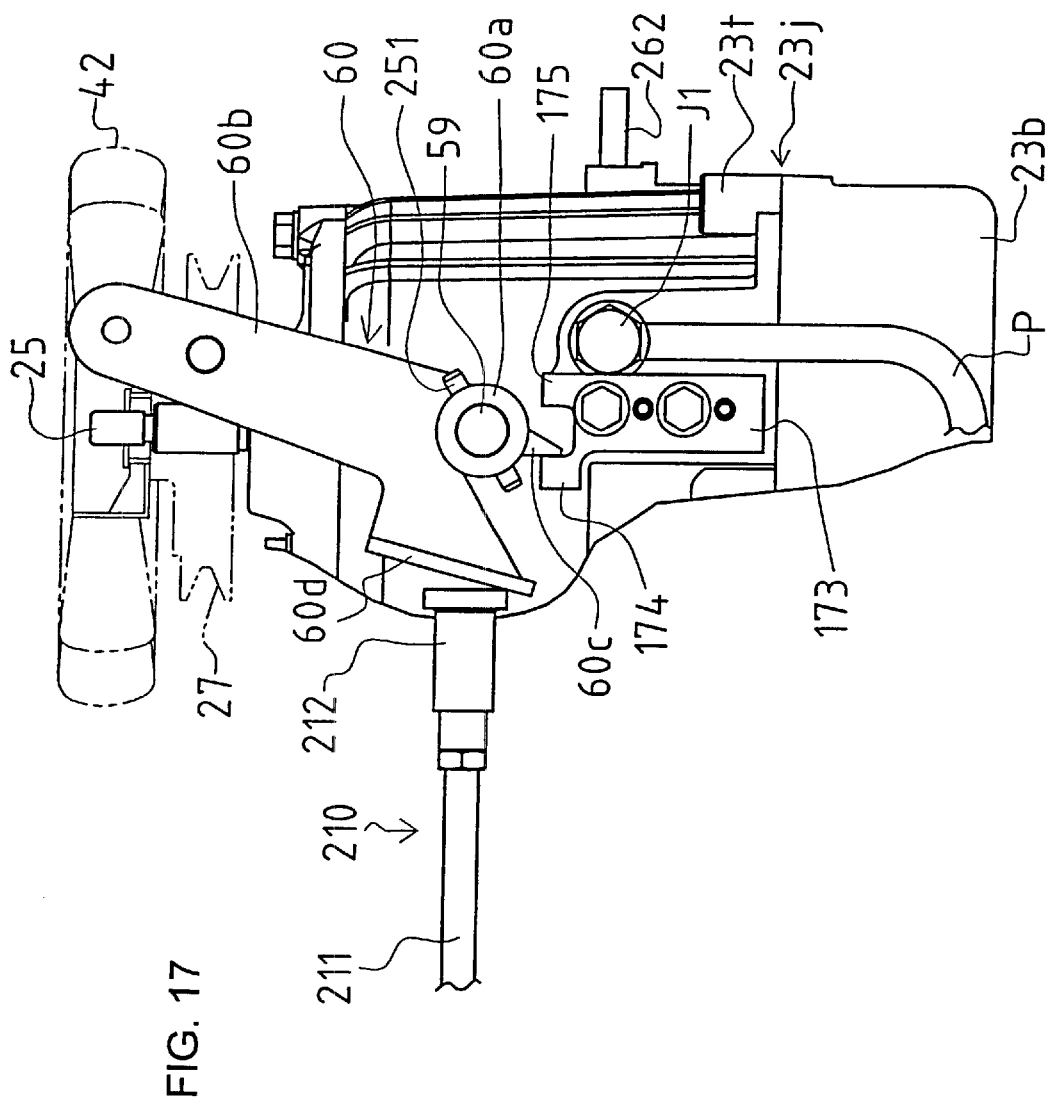
FIG. 17 is a fragmentary side view of apparatus 2 illustrating a control arm 60 rotated so as to push a first link rod 211 of a linkage 210 which interlocks a movable swash plate 85 of a hydraulic motor 72 of a steering HST 22 with movable swash plate 76.
Figure 18:
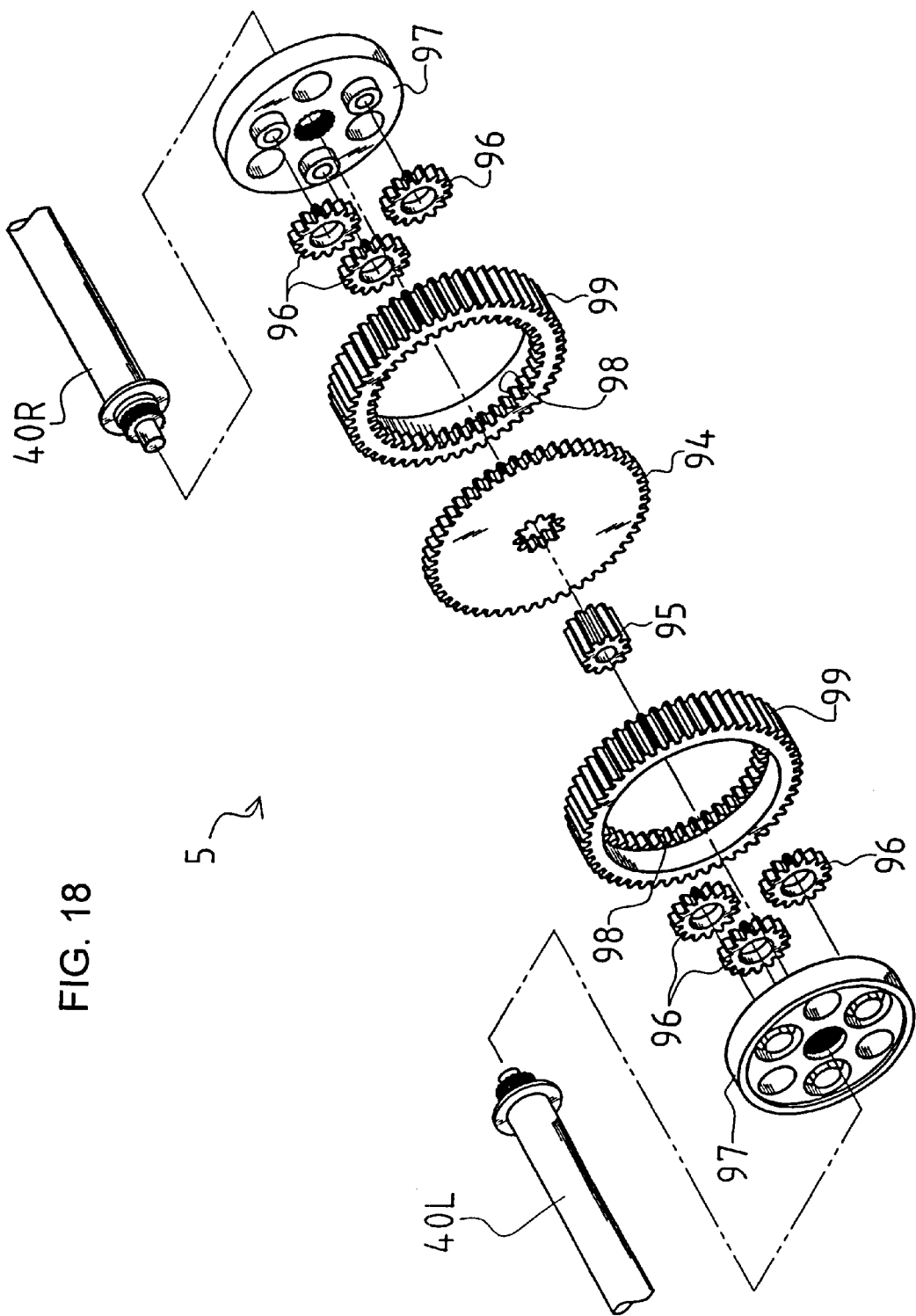
FIG. 18 is a perspective view of axles 40L and 40R and parts of differential gear unit 5 as they appear during assembly thereof.

When an operator treads down speed change pedal 15, control arm 60 is rotated so as to change the position of swash plate 57 of hydraulic pump 52 in driving HST 21. Simultaneously, whether arm 60 is rotated regularly or reversely, edge 60d of rotated arm 60 is pressed against head 212 of first link rod 211, as shown in FIG. 17, so as to thrust rod 211 toward arm 220, so that arm 220 is rotated to pull control level 87 through second link rod 221, thereby tilting swash plate 85 of hydraulic motor 72 in steering HST 22. As a result, the rotary speed of motor shaft 77 is reduced as the rotary speed of motor shaft 54 is increased whether the rotational direction of shaft 54 is regular or reverse. Thus, the faster the vehicle employing apparatus 2 travels, the more the steering response to operation of steering wheel 14 becomes dull, thereby preventing the vehicle from the fear of hard cornering during its fast travelling.

A turnbuckle 222 is interposed at the intermediate portion of second link rod 221 for adjusting the length thereof, thereby enabling the relationship between the driving speed and the steering response to be changed within a certain range.

As shown in FIG. 13, motor shaft 77 passes through center section 75 and projects downwardly So as to be fixedly provided on the bottom end thereof with a bevel gear 104. Shaft 105 is disposed below bevel gear 104 in parallel to axles 40. As shown in FIG. 4, both ends of shaft 105 are fixedly inserted into sleeves 190 fixed in two opposed bosses formed by lower half 23b. A pair of adjacent sleeves 111 are rotatably provided on shaft 105. Bevel gears 106 are fixed onto respective sleeves 111, so that both bevel gears 106 are laterally symmetrically disposed with respect to motor shaft 77, so as to engage with bevel gear 104.

The output power of hydraulic motor 72 is shared between left and right bevel gears 106 which are rotated in opposite directions.

As shown in FIG. 4, two sleeves 111 are also fixedly provided thereon with respective gears 107. Shaft 93 is provided thereon with two laterally juxtaposed speed-reduction gears 108, each of which consists of a diametrically large gear 108a and a diametrically small gear 108b. Both gears 108b are rotatably provided on shaft 93 so as to be disposed laterally oppositely to each other with respect to driving gear 69. Each gear 108a engages at the inner periphery thereof with the outer periphery of each gear 108b, so that gears 108a and 108b engaging with each other are not relatively rotatable. Both gears 108a engage with respective gears 107. Differential gear unit 5, as discussed below, includes a pair of ring like shaped internal gears 98 which form gears 99 at their outer peripheral surfaces. Gears 108b engage with gears 99.

Description will now be given on differential gear unit 5 which differentially connects left and right axles 40L and 40R in accordance with FIGS. 4, 13, 18–20. As shown in FIG. 4, a sun gear 95 is rotatably provided on the abutting proximal ends of axles 40L and 40R so as to integrally engage with the inner peripheral teeth of a center gear 94. Driving gear 69 fixed on shaft 93 engages with center gear 94.

Left and right carriers 97 are fixed onto respective axles 40L and 40R, and fixedly provided at the outer peripheries thereof with respective internal gears 98. A plurality of planet gears 96 are rotatably supported by each carrier 97 so as to lie interposed between sun gear 94 and each internal gear 98.

If internal gears 98 were directly supported onto axles 40L and 40R apart from carriers 99, differential gear unit 5 would be laterally wide along the axes of axles 40L and 40R. Internal gears 98 according to the preferred embodiment are provided on the outer peripheries of carriers 99, thereby compacting differential gear unit 5 which is actually made laterally narrow along axles 40L and 40R.

Figure 19:
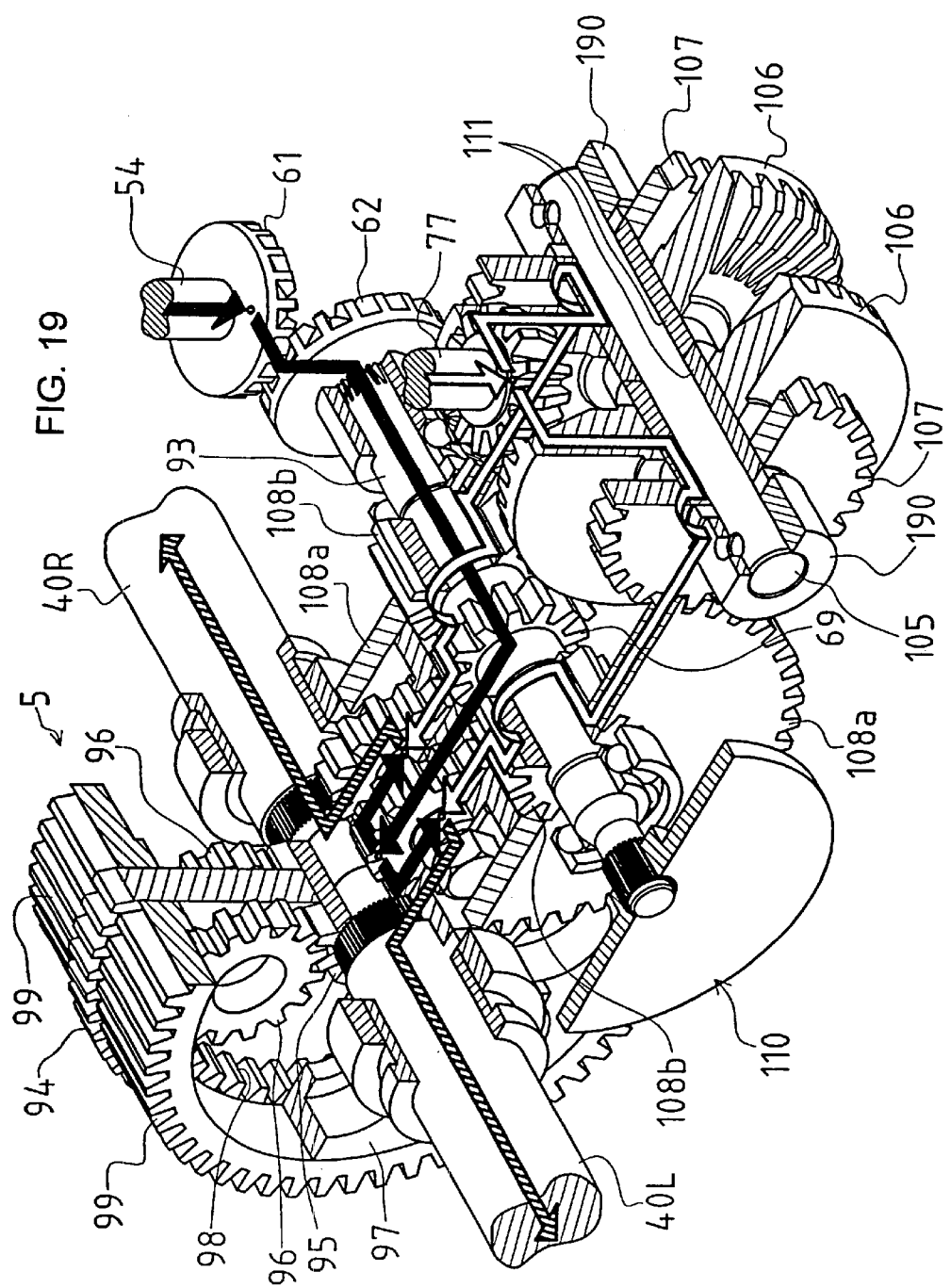
FIG. 19 is a perspective view partly in section of a transmission mechanism illustrating arrows as the directions of power transmitted from motor shafts 54 and 77 of HSTs 21 and 22 to axles 40L and 40R through differential gear unit 5.

In FIG. 19, a bold arrow describes the power transmission from motor shaft 54 of hydraulic motor 53 in driving HST 21 to sun gear 94 of differential gear unit 5 through bevel gears 61 and 62, shaft 93, gear 69 and center gear 94.

Also in FIG. 19, a hollow arrow describes the power transmission from motor shaft 77 of hydraulic motor 72 in steering HST 22 to left and right internal gears 98 of differential gear unit 5, wherein two bevel gears 106 sharing the rotary power of bevel gear 104 are rotated in opposite directions so as to rotate internal gears 98 in opposite directions through speed-reduction gears 108.

Accordingly, one of the two sets of planet gears 96 opposed with respect to center gear 94 receive the rotational force of corresponding internal gear 98 in addition to that of sun gear 95, and the other set of gears 96 receive the rotational force of sun gear 95 reduced by that of corresponding gear 98.

As a result, left and right carriers 97 become different from each other in rotary speed, so that axles 40L and 40R are differentially rotated so as to steer the vehicle.

Hitherto discussed apparatus 2 of the independent steering type has the problem that, if the rotational direction of steering wheel 14 is set to coincide with the cornering direction of a vehicle during its forward travelling, the vehicle, when backward travelling, turns in the opposite direction to the rotation of steering wheel 14. For example, the rightward rotation of steering wheel 14 during the backward travelling of vehicle causes the vehicle to turn leftward. Therefore, steering the vehicle is difficult for an operator who is accustomed to steering a regular type car.

If the vehicle is to turn leftward when steering wheel 14 is rotated leftward, left axle 40L (close to the corner) must be decelerated and right axle 40R (away from the corner) must be accelerated whether the vehicle travels forward or backward.

The force of decelerating and accelerating axles 40L and 40R for cornering is caused by rotation of motor shaft 77 of steering HST 22. Each axle 40 is rotated oppositely between the case of forward travelling and of backward travelling, therefore, the slanting direction of motor shaft 77 must be opposite between the cases of forward travelling and of backward travelling.

For solving the problem, the present invention provides some alternative linkages replacing the above-mentioned linkage 210, each of which makes three movable swash plates 57, 76 and 85 interlock with one another as discussed below, wherein swash plate 85 is slanted oppositely between the cases of forward travelling and backward travelling.

Figure 27:
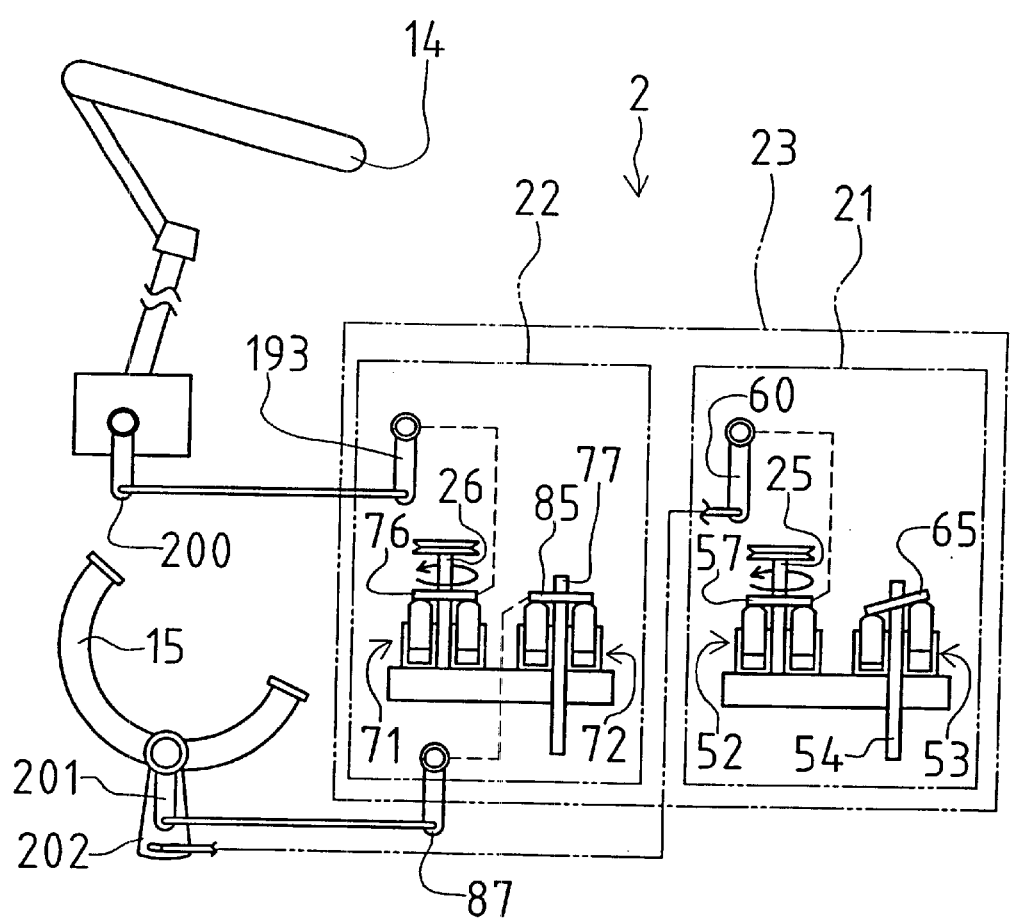
FIG. 27 is a schematic side view of linkages for steering wheel 14 and speed change pedal 15 to be connected to movable swash plates 57, 76 and 85 of hydraulic pumps 52 and 71 and motor 72 in HSTs 21 and 22 of the independent steering type, wherein both steering wheel 14 and speed change pedal 15 are located in their neutral positions.

Firstly, referring to FIG. 27, an arm 200 interlocking with a stem of steering wheel 14 through gears and the like (not shown) further interlocks with control arm 193 for operating swash plate 76 of hydraulic pump 71 of steering HST 22. Also, an arm 201 projecting from the pivotal shaft of speed change pedal 15 interlocks with control arm 87 of hydraulic motor 72 of steering HST 22, and an arm 202 projecting from the same interlocks with control arm 60 of hydraulic pump 52 of driving HST 21.

Figure 28:
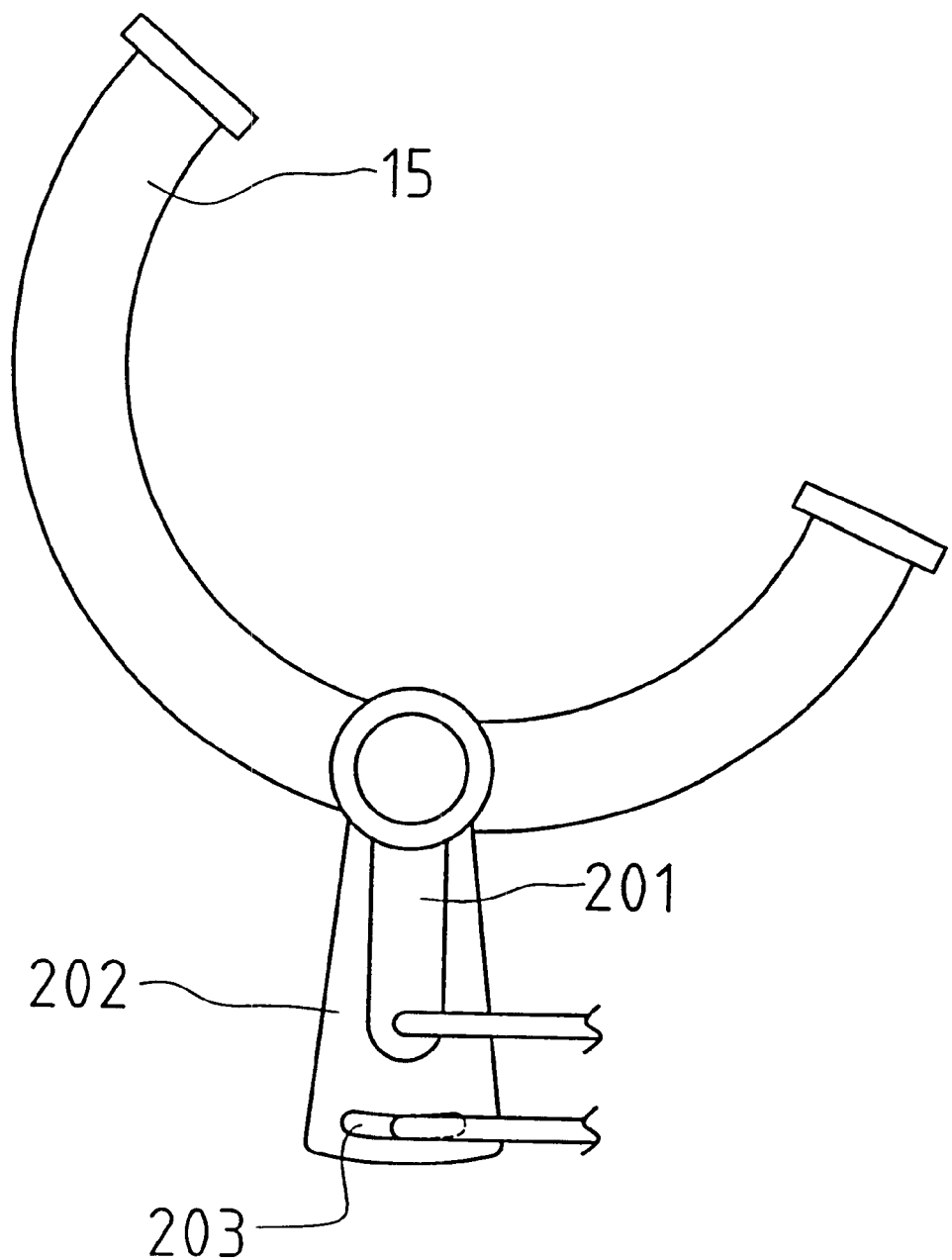
FIG. 28 is a side view of speed change pedal 15 for the linkage shown in FIG. 27.

Arm 201 shaped like a sector is bored by an elongated hole 203 along the peripheral edge thereof, as shown in FIG. 28. An end of a link for connecting to control arm 60 is slidably inserted into hole 203, so that the end is located substantially in the middle of hole 203 when swash plate 57 is in the neutral position. Due to such a construction, even if the above-mentioned spring for biasing pedal 15 to the neutral has a slight error causing the vehicle to drive unexpectedly, swash plate 57 can be located in neutral when pedal 15 is not trod down, whereby the vehicle is safe from the unexpected travelling.

FIG. 27 shows that both steering wheel 14 and speed change pedal 15 are in neutral, thereby positioning both swash plates 57 and 76 in neutral. In this condition, both hydraulic pumps 52 and 71 in HSTs 21 and 22 are not driven, so as to make the vehicle free from travelling and cornering.

Figure 29:
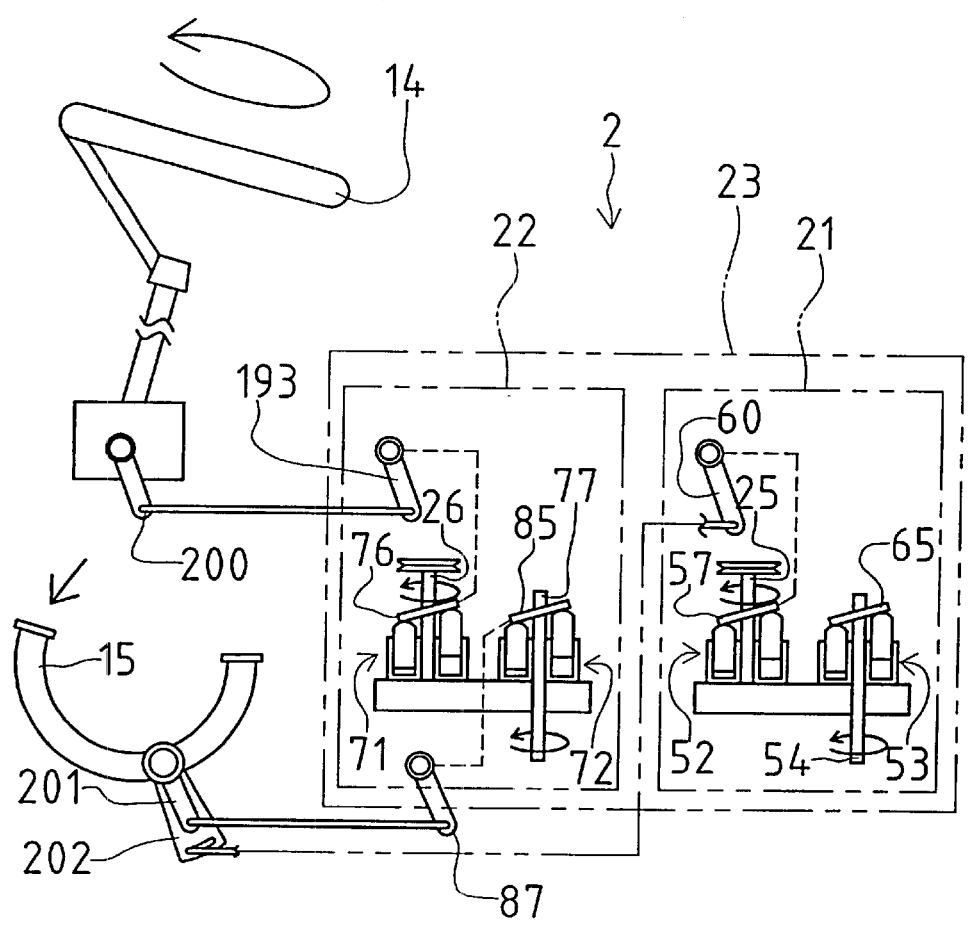
FIG. 29 is a schematic side view of the same shown in FIG. 27, wherein speed change pedal 15 is trod down to some degree for forward travelling and steering wheel 14 is rotated leftward to some degree.

FIG. 29 shows that pedal 15 is trod down for forward travelling and steering wheel 14 is leftward rotated for left-cornering. The link interposed between arm 202 and control arm 60 is pushed toward control arm 60 because arm 202 rotated integrally with pedal 15 pushes the end of the link in contact with the end of hole 203 thereof, so that swash plate 57 is slanted so as to make hydraulic pump 52 perform its pumping action for driving hydraulic motor 53 in one direction, thereby making the vehicle travel forwardly.

Also, arm 200 is tilted by leftward rotation of steering wheel 14 so as to slant swash plate 76 through control arm 193 and a link, thereby making hydraulic pump 71 perform its pumping action in one direction. Simultaneously, arm 201 of pedal 15 is tilted so as to slant swash plate 85 in one direction from its neutral position through control arm 87 and a link. The association between the direction of pumping action of pump 71 and the direction of slanted swash plate 85 results in motor shaft 77 rotating in one direction so as to make the forward travelling vehicle turn leftward.

Figure 30:
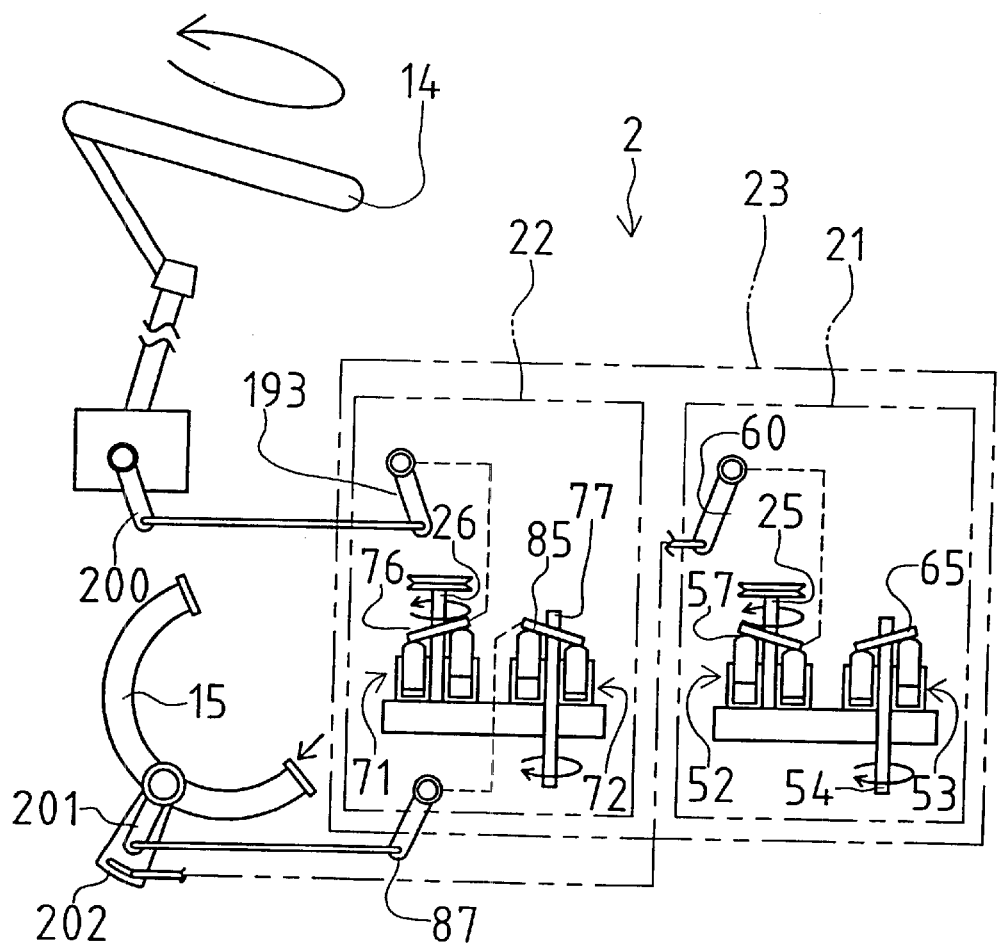
FIG. 30 is a schematic side view of the same, wherein speed change pedal 15 is trod down to some degree for backward travelling and steering wheel 14 is rotated leftward to some degree.

In turn, FIG. 30 shows that pedal 15 is trod down for backward travelling and steering wheel 14 is rotated leftward. Arm 202 is tilted oppositely to that shown in FIG. 29 while the end of the link is in contact with the other end of hole 203, whereby the link is pulled away from control arm 60. Swash plate 57 is slanted oppositely to that in the case of FIG. 29, thereby causing hydraulic motor 53 to drive in the other direction for making the vehicle travel backwardly.

Also, arm 200 is tilted by leftward rotation of steering wheel 14 so as to slant swash plate 76 through control arm 193 and the link, thereby making hydraulic pump 71 perform its pumping action in the same direction. Simultaneously, arm 201 of pedal 15 trod down for backward travelling is tilted so as to slant swash plate 85 slantwise in the other direction. The association between the direction of pumping action of pump 71 and the direction of slanted swash plate 85 results in motor shaft 77 rotating in the other direction so as to make the backward-travelling vehicle turn leftward.

Figure 31:
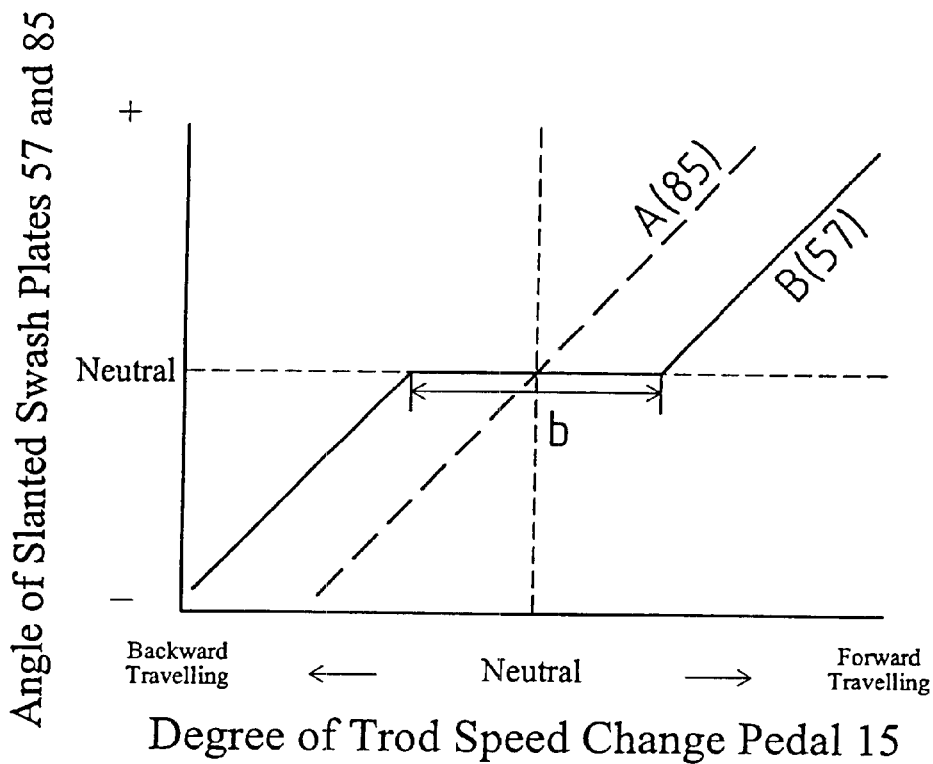
FIG. 31 is a graph of angles of slanted swash plates 57 and 85 in relation to the position of speed change pedal 15 by use of the linkages shown in FIG. 27.

In addition to the solution of the problem as its essential purpose, the linkage shown in FIGS. 27–30 has such an advantage as follows:

The angle of slanted swash plate 85 is increased in proportion to the degree of tread of pedal 15, thereby causing motor shaft 77 to be decelerated in spite of the constant pumping action of hydraulic pump 71. FIG. 31 shows graphs A and B of slanting angles of both swash plates 57 and 85 in relation to the position of pedal 15. Graph A is drawn in a solid line, and graph B in a dotted line. The angle in the slant direction of swash plate 85 when speed change pedal 15 is trod down for forward travelling is marked "+", and the angle thereof for backward travelling is marked "−". The same is true in FIGS. 33, 34 and 43. If steering wheel 14 is rotated to a certain degree, the rotary speed of motor shaft 77 during fast travelling is smaller than that during slow travelling, thereby avoiding hard-cornering during fast travelling.

In FIG. 31, graph B has a constant level range "b" which means that swash plate 57 is hold in the neutral position when pedal 15 is in vicinity of the neutral position because of the play of hole 203 in arm 202. Even if steering wheel 14 is rotated leftward or rightward while pedal 15 is in neutral, motor shaft 77 is not rotated by the pumping action of hydraulic pump 71 because swash plate 85 is placed horizontally (in neutral). In this condition, the operating oil discharged from pump 71 is drained into charge pump casing 301 through charge relief valve 330.

If motor shaft 77 can be rotated while speed change pedal 15 is in the neutral position so as to keep hydraulic motor 53 in neutral, the vehicle is enabled to spin-turn (to swivel in place). This can be achieved by the further modified construction as shown in FIGS. 32 and 33.

Figure 32:
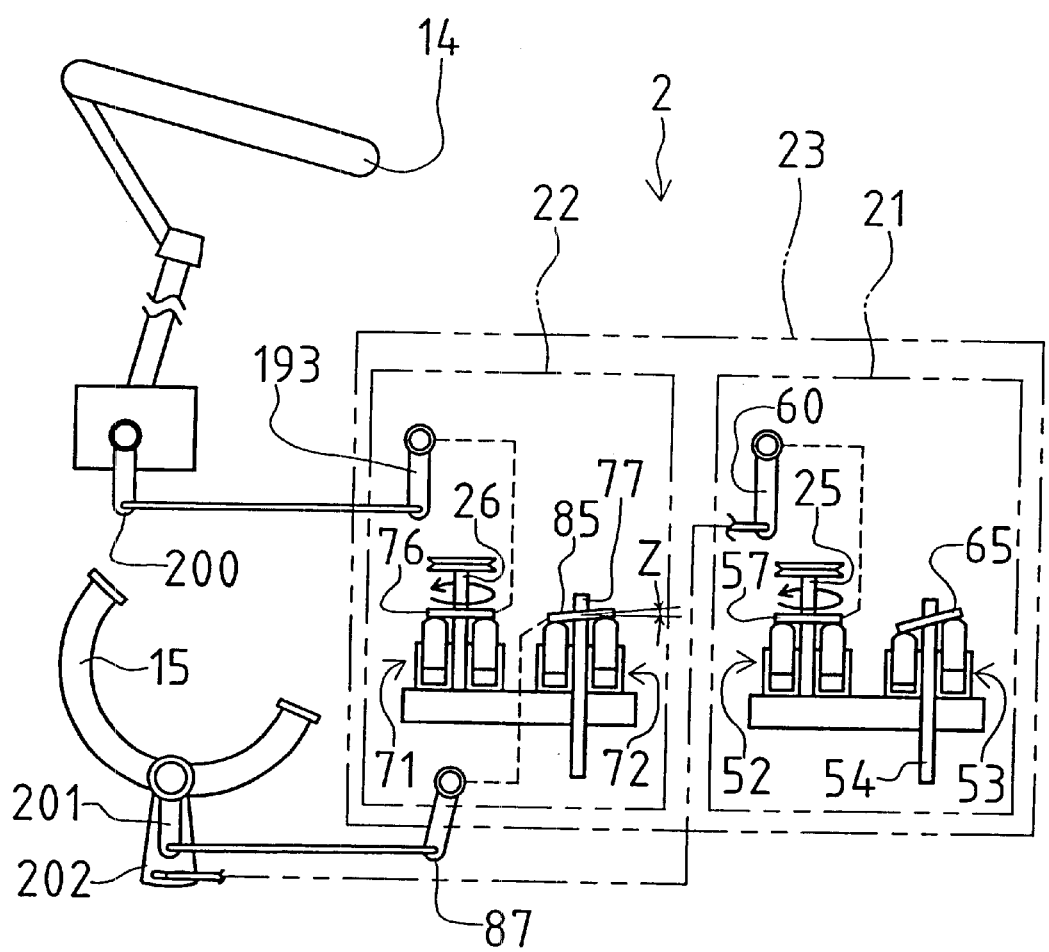
FIG. 32 is a schematic side view of the modified linkages shown in FIG. 27, wherein swash plate 85 is slanted to a certain degree for forward travelling while speed change pedal 15 is in neutral.

Referring to FIG. 32, swash plate 85 is slanted to an angle Z in the forward travelling direction while pedal 15 is located in neutral. The forward travelling direction means the slant direction of swash plate 85 when pedal 15 is trod down for forward traveling, which is marked by "T" in FIG. 33 as discussed below. Additionally, the slant direction of swash plate 85 when pedal 15 is trod down for backward traveling is named a backward travelling direction (marked by "−" in FIG. 33). Angle Z of swash plate 85 can be adjusted by adjustment of the spring for biasing it to the neutral position, and by that of the length of link interposed between arm 201 and control arm 87. The other construction is identical with that of FIG. 27.

Figure 33:
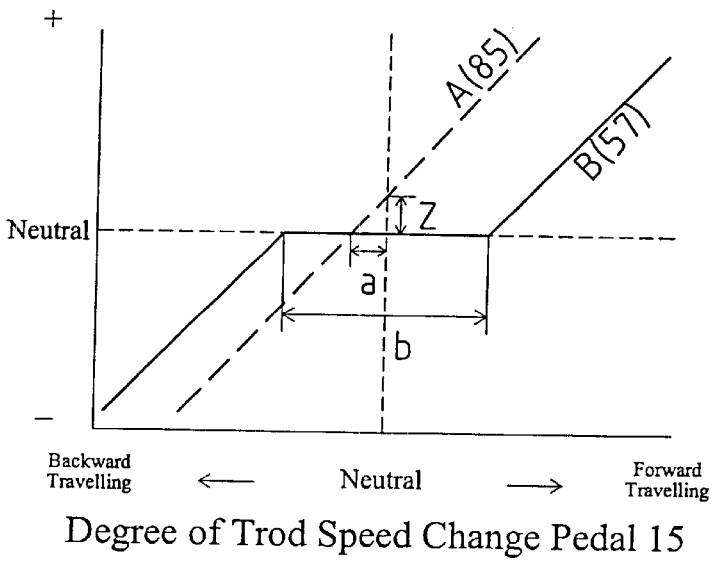
FIG. 33 is a graph of the same shown in FIG. 31 by use of the linkages shown in FIG. 32.

The construction shown in FIG. 32 causes graphs A and B of slanting angles of both swash plates 57 and 85 in relation to the position of pedal 15 as shown in FIG. 33, wherein graph B displays that the angle of swash plate 85, when pedal 15 is located in the neutral position, is Z in the forward travelling direction (marked by "+"). Therefore, if steering wheel 14 is rotated leftward or rightward when pedal 15 is in the neutral position, the pumping action of hydraulic pump 71 is applied to hydraulic motor 72 so as to rotate motor shaft 77, so that left and right axles 40L and 40R are rotated in opposite directions, thereby making the vehicle spin-turn.

There appears that swash plate 85 is not slanted in the backward travelling direction (marked by "−") while pedal 15 is trod down in a shown range "a". However, range "a" is within that "b" wherein swash plate 57 is held in the neutral position by the play of hole 203, whereby, while steering wheel 14 is rotated, there is no problem such that motor shaft 77 is unexpectedly rotated so as to make the vehicle turn oppositely to the rotational direction of steering wheel 14 and that motor shaft 77 is not rotated so as to make the vehicle travel unexpectedly in straight.

Arm 201 of speed change pedal 15 is provided therein with an elongated hole similarly to arm 202 of the same, thereby providing a play for the operation of swash plate 85 of steering HST 22. As a result, swash plate 85 remains in the slanting condition at angle Z while pedal 15 is trod down to some degree for forward travelling. This construction causes graphs A and B of slanting angles of both swash plates 57 and 85 in relation to the position of pedal 15 as shown in FIG. 34, wherein a flat level range "c" of graph B preferably substantially coincides with a part "bf" of the flat level range "b", so that the range where swash plate 85 is slanted at angle Z substantially coincides with that where swash plate 57 is kept in neutral while pedal 15 is trod down for forward travelling.

Figure 34:
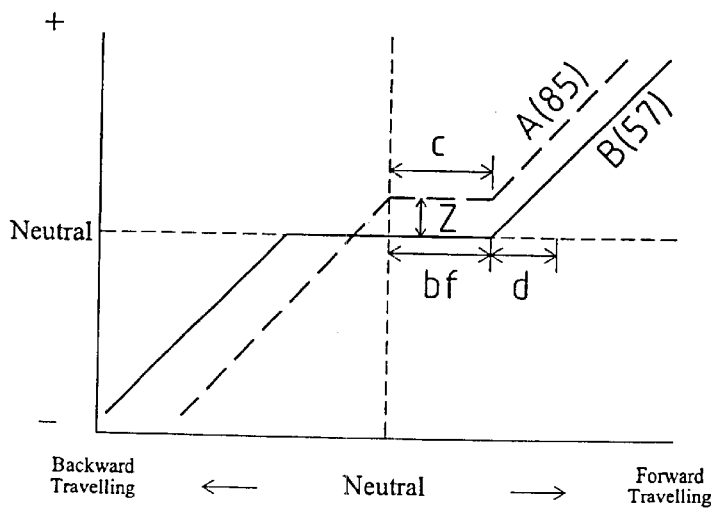
FIG. 34 is a graph of the same by use of the further modified linkage shown in FIG. 32.

Swash plate 85 of FIG. 34, in comparison with that of FIG. 33, is slanted at a smaller angle while speed change pedal 15 is trod down within a range "d" for slow forward travelling. Thus, motor shaft 77 of FIG. 34 can be rotated faster than that of FIG. 33 while steering wheel 14 is rotated to the same degree in the case of forward travelling. The resulting vehicle can turn in almost spin-turning condition during slow forward travelling.

Figure 35:
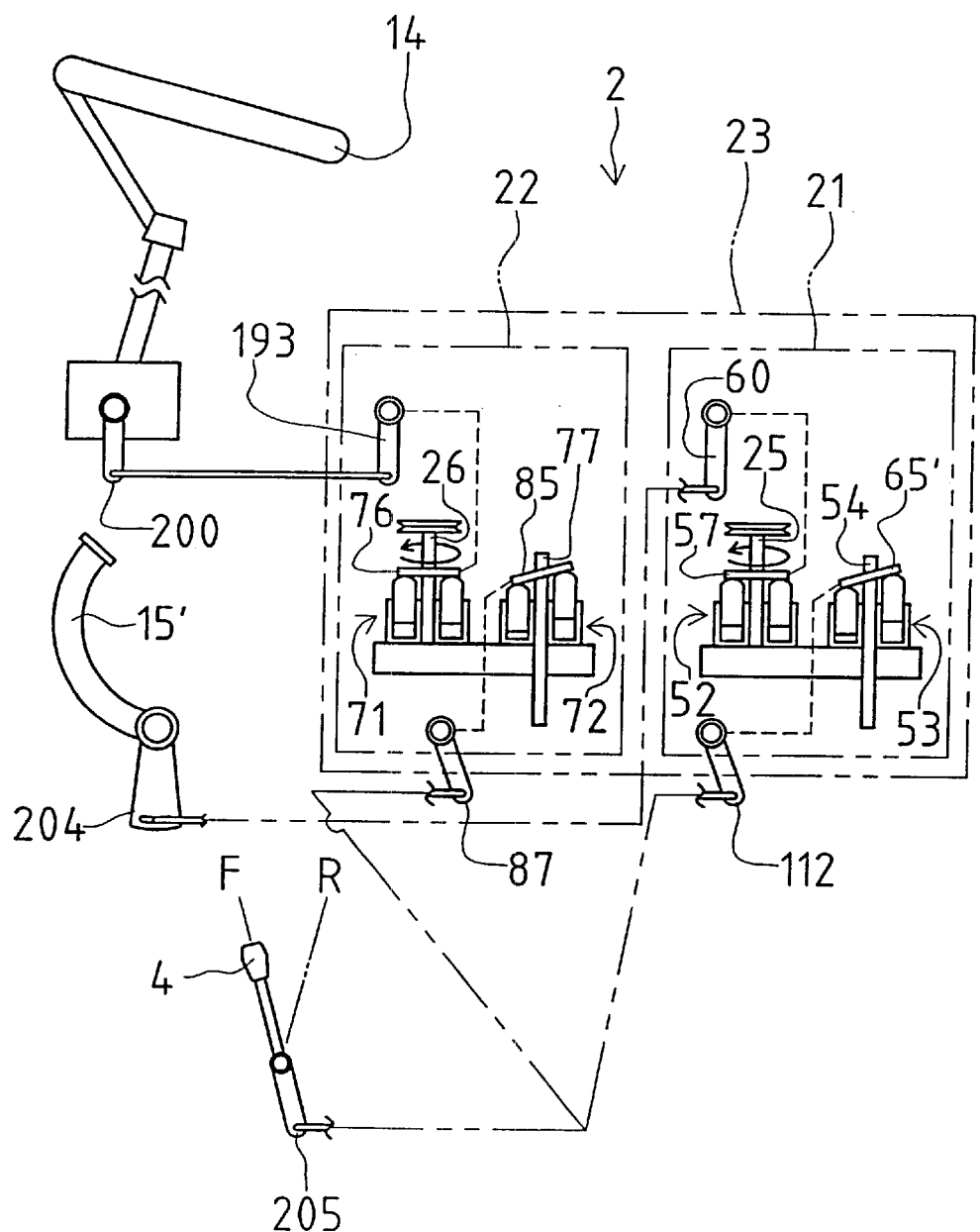
FIG. 35 is a schematic side view of linkages for steering wheel 14, speed change pedal 15' and forward/backward travelling direction switching lever 205 to be connected to swash plates 57, 65', 76 and 85 of hydraulic pumps 52 and 71 and motors 53 and 72 in HSTs 21 and 22 of the independent steering type, wherein steering wheel 14 and speed change pedal 15' are located in their neutral positions and lever 205 is located at its forward travelling position.

Alternatively, referring to FIG. 35, hydraulic motor 53 of driving HST 21 is provided with a movable swash plate 65', thereby being defined as a variable displacement pump. Apparatus 2 is provided with a control arm 112 for operating swash plate 65'. Also, vehicle 1 is provided with a forward/backward travelling switching lever 4 and a speed change pedal 15' both which replace speed change pedal 15. For example, lever 4 is disposed beside front column 13 or seat 17. Pedal 15' has only one pedal surface for treading.

An arm 204, which is identical with arm 202 of pedal 15, projects from a pivotal shaft of pedal 15', so as to interlock with swash plate 57 of hydraulic pump 52 in driving HST 21 through control arm 60.

An arm 205 projects from a pivotal shaft of lever 4, so as to interlock with swash plates 65' and 85 of both hydraulic motors 53 and 72 through control arms 112 and 87, respectively.

Due to the association between lever 4 and swash plate 65', the pumping action of hydraulic pump 52 caused by treading of pedal 15' is applied to hydraulic motor 53, so that motor shaft 54 is rotated regularly when lever 4 is located in a forward travelling position F, and is rotated reversely when lever 4 is in a backward travelling position R.

Also, due to the association between lever 4 and swash plate 85, the pumping action of hydraulic pump 71 caused by rotation of steering wheel 14 is applied to hydraulic motor 72, so that motor shaft 77, when lever 4 is located in position F, is rotated oppositely to that when lever 4 is in position R while steering wheel 14 is rotated in the same direction. Thus, the rotation of motor shaft 77 is reversed between the cases of forward travelling and of backward travelling.

In this construction, even if pedal 15' is located in the neutral position, swash plate 85 of hydraulic motor 72 is not neutral but slanted to some degree. Therefore, if steering wheel 14 is rotated while pedal 15' is neutral, motor shaft 77 is rotated, thereby enabling the vehicle to spin-turn. This is different from the construction shown in FIG. 27, but is similar with that shown in FIG. 32.

Figure 36:
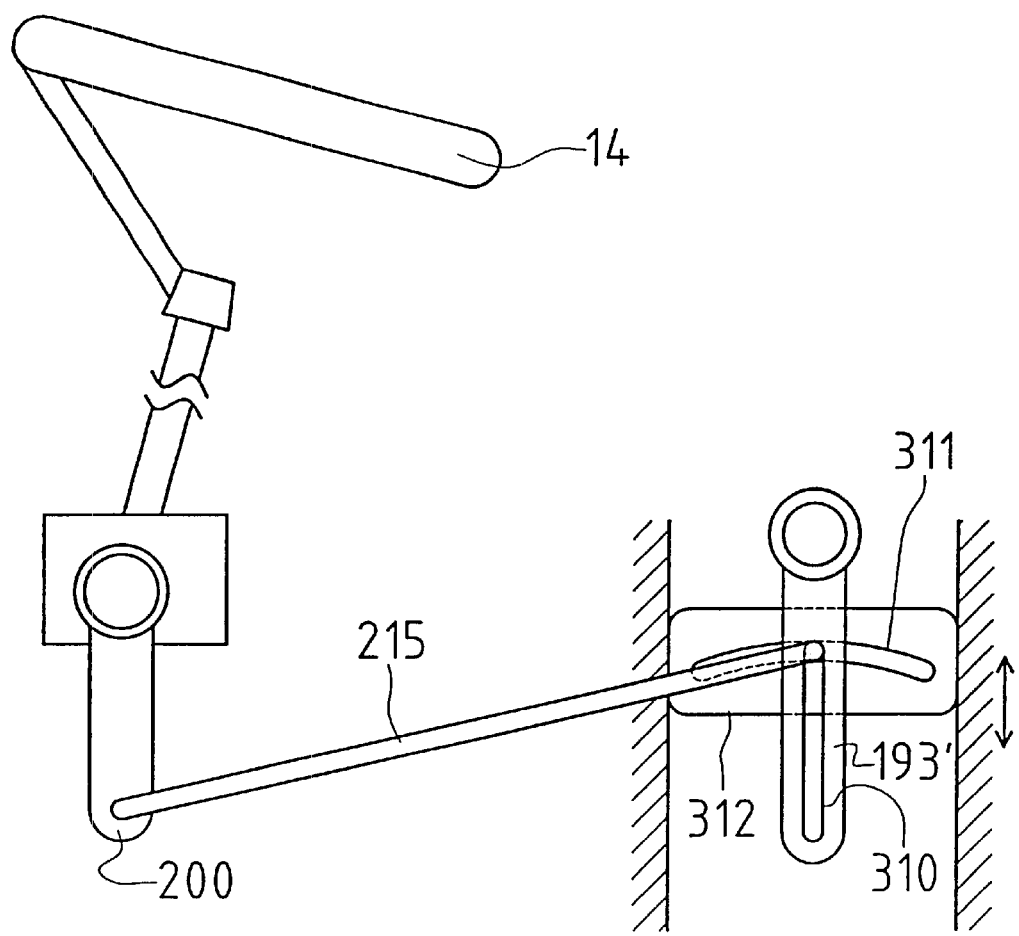
FIG. 36 is a schematic side view of a linkage for connecting steering wheel 14 to a control arm 193' of swash plate 76 through a slide guide 312 so as to change the response of swash plate 76 to operation of steering wheel 14 according to the change of angle of operated steering wheel 14, when steering wheel 14 is in neutral and slide guide 312 is disposed at the top position of its slidable range.

Referring to FIG. 36, a modified linkage is constructed between steering wheel 14 and swash plate 76 of hydraulic pump 71 in steering HST 22. A control arm 193' having a straight elongated hole 310 along its longitudinal direction replacing control arm 193 is provided for operating swash plate 76. Additionally, a slide guide 312 having an elongated hole 311 substantially in parallel to hole 310 is provided. Slide guide 312 can slide substantially in parallel to hole 310 when control arm 193' is in the neutral position.

A link 215 is interposed between arm 200 interlocking with steering wheel 14 and arm 193'. A first end of link 215 is pivotally connected to arm 200. A second end of link 215 is slidably inserted into both hole 310 of control arm 193' and hole 311 of slide guide 312. If guide 312 slides vertically in FIG. 36, the second end of link 215 slides along hole 310 according to the movement of guide 312.

Figure 37:
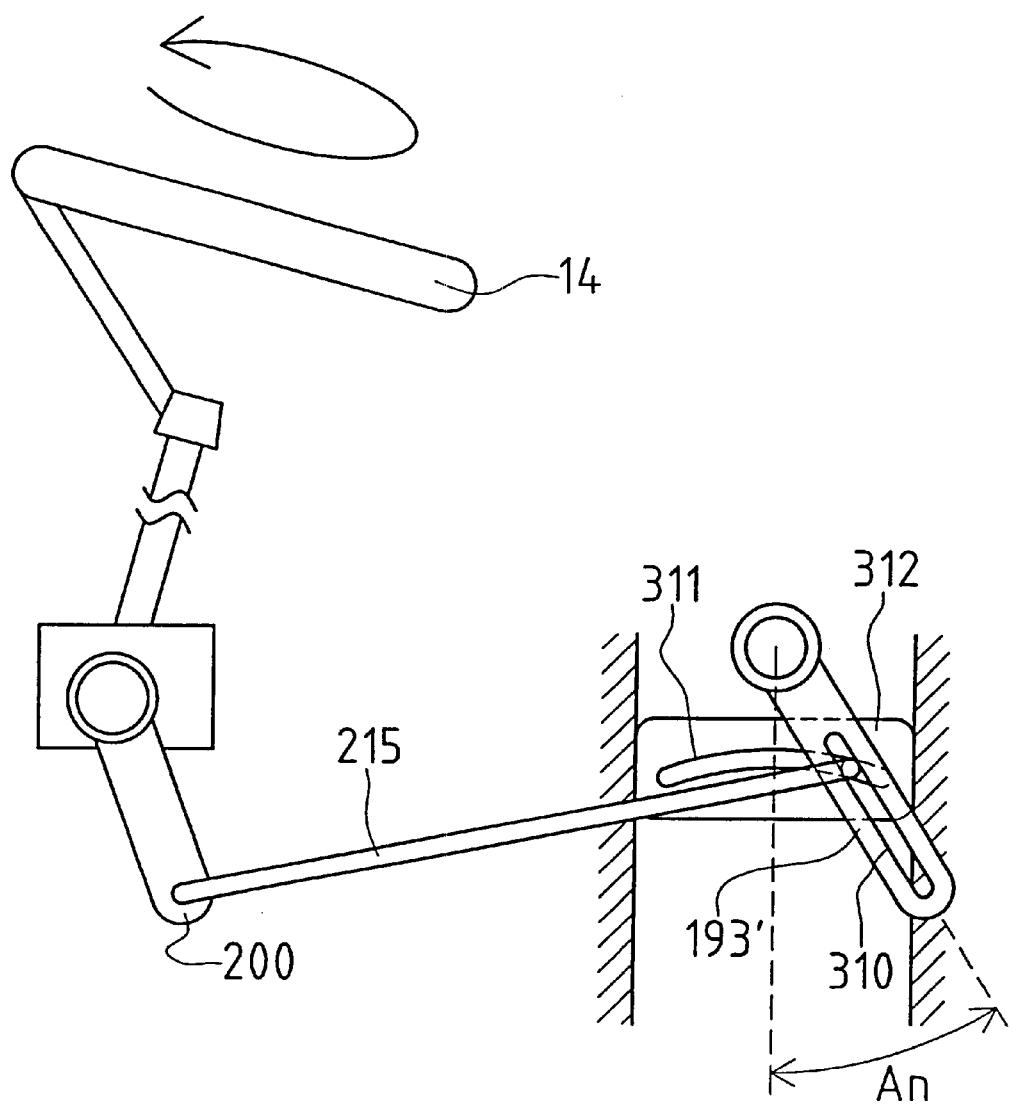
FIG. 37 is a schematic side view of the same linkage when steering wheel 14 is rotated from its neutral position and slide guide 312 is disposed at the top position of its slidable range.

When guide 312 is located in an upper position within its slide range, the second end of link 215 is close to the upper end of hole 310, thereby being near the basic end of control arm 193'. In this condition, if steering wheel 14 is rotated to a certain degree, arm 193' is rotated to an angle "An" as shown in FIG. 37.

Figure 38:
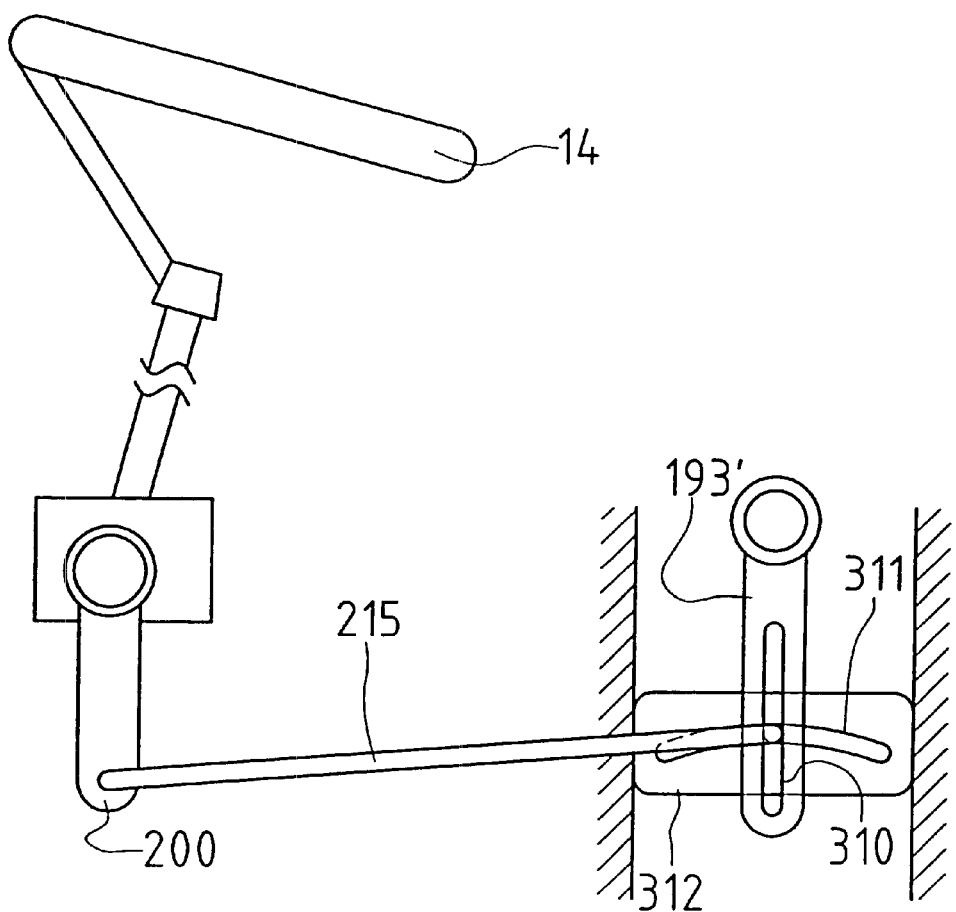
FIG. 38 is a schematic side view of the same linkage when slide guide 312 is positioned at the intermediate position of its slidable range, when steering wheel 14 is in neutral and slide guide 312 is disposed at the intermediate position of its slidable range.
Figure 39:
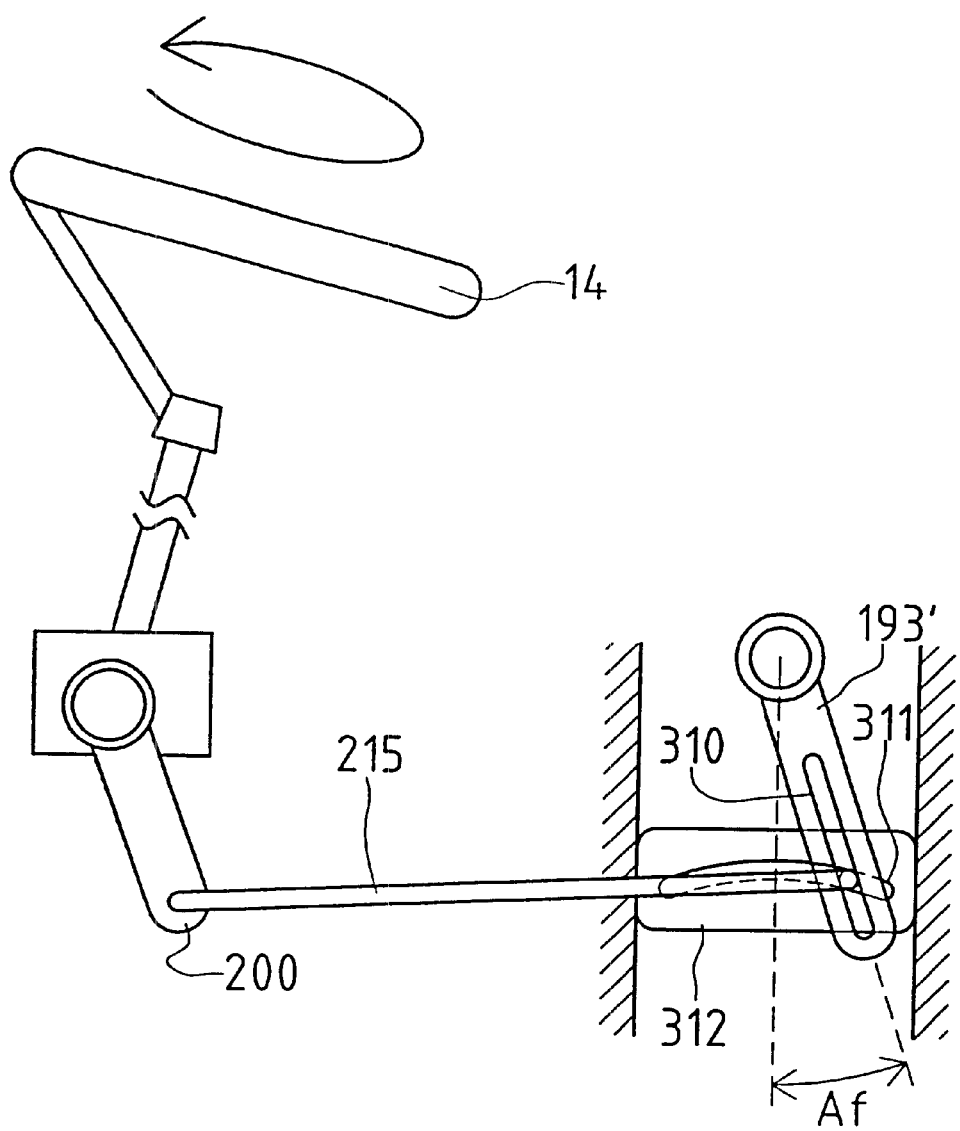
FIG. 39 is a schematic side view of the same linkage when steering wheel 14 is rotated from its neutral position and slide guide 312 is disposed at the intermediate position of its slidable range.

Meanwhile, when guide 312 is located in a lower position, the second end of link 215 is close to the lower end of hole 310, thereby being away from the basic end of arm 193'. In this condition, if steering wheel 14 is rotated to the same degree with that of FIG. 37, arm 193' is rotated to an angle "Af" as shown in FIG. 38, which is smaller than angle "An" shown in FIG. 37.

In brief, the vertical sliding motion of guide 312 enables swash plate 76 to differ in its slanting angle while the rotational angle of steering wheel 14 is the same. Hole 311 of guide 312, which is gently arcuate in FIG. 36, is not limited in its shape. Various kinds of relationships between both angles of rotated steering wheel 14 and slanted swash plate 76 can be provided by modification of hole 311. For example, it may be directly proportional, quadratic, or higher dimensional. Also, the width of hole 310 may be changed so that swash plate 76 is kept in neutral when steering wheel 14, is in vicinity of the neutral position, that is, steering wheel 14 is provided with an enlarged play.

Figure 40:
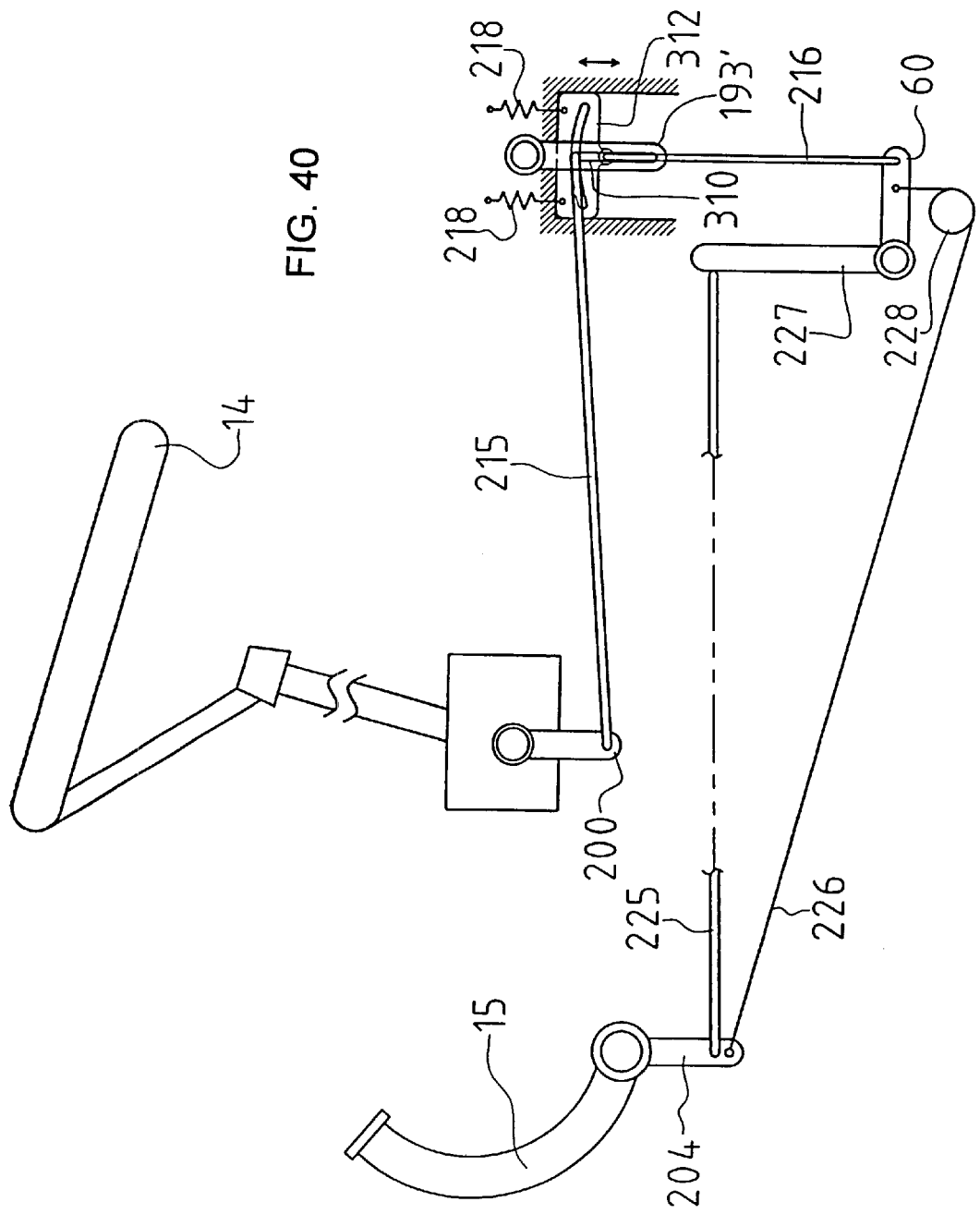
FIG. 40 is a schematic side view of linkages including that shown in FIG. 36 wherein speed change pedal 15' is connected to slide guide 312 through another linkage.

FIG. 40 shows a mechanism for making guide 312 slide. Control arm 60 for operating swash plate 57 of hydraulic pump 52 is, when being in neutral, oriented perpendicularly to the sliding direction of guide 312. Guide 312 is connected with control arm 60 through a link 216. A link 225 and a wire 226 are extended from arm 204 of pedal 15'. Link 225 is connected to an arm 227 which is integral with control arm 60. Wire 226 is connected to control arm 60 through a pulley 228. A pair of springs 218 bias guide 312 so as to return guide 312 to its neutral position when the treading force applied onto pedal 15' is released. Due to such a construction, when pedal 15' is trod down, arm 204 is rotated so as to rotate control arm 60, thereby making guide 312 slide through link 216 so as to change the rate of angle of slanted swash plate 76 to the angle of rotated steering wheel 14.

As a result, guide 312 interlocks with pedal 15' so that the cornering response to operation of steering wheel 14 is gentle during fast travelling, and is sharp during slow travelling, thereby enabling the vehicle to change the rate of cornering angle to the operational angle of steering wheel 14 according to the travelling speed.

Control arm 60 may be removed from the linkage between pedal 15' and guide M. It is enough for guide 312 to interlock with pedal 15' or another part of driving system for driving HST 21.

Figure 41:
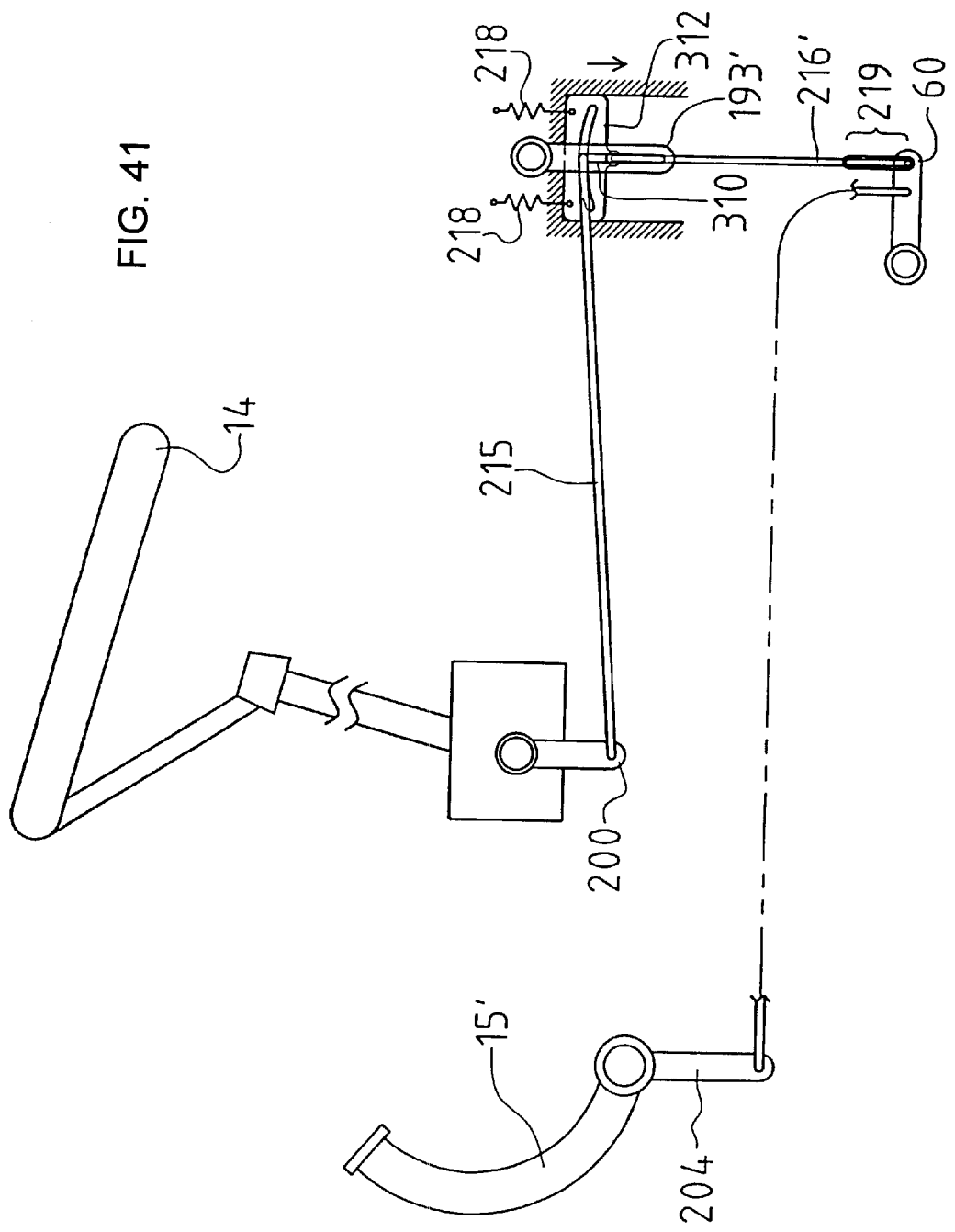
FIG. 41 is a schematic side view of alternative linkages including that shown in FIG. 36 wherein speed change pedal 15' is connected to slide guide 312 through an alternative linkage replacing that shown in FIG. 40.

Referring to FIG. 41, for modification of the construction shown in FIG. 40, link 216 is replaced with a link 216' having an elongated hole 219 into which a joint pin of control arm 60 is slidably inserted, thereby applying a play for the motion of guide 312 in relation to treading of pedal 15'.

Figure 42:
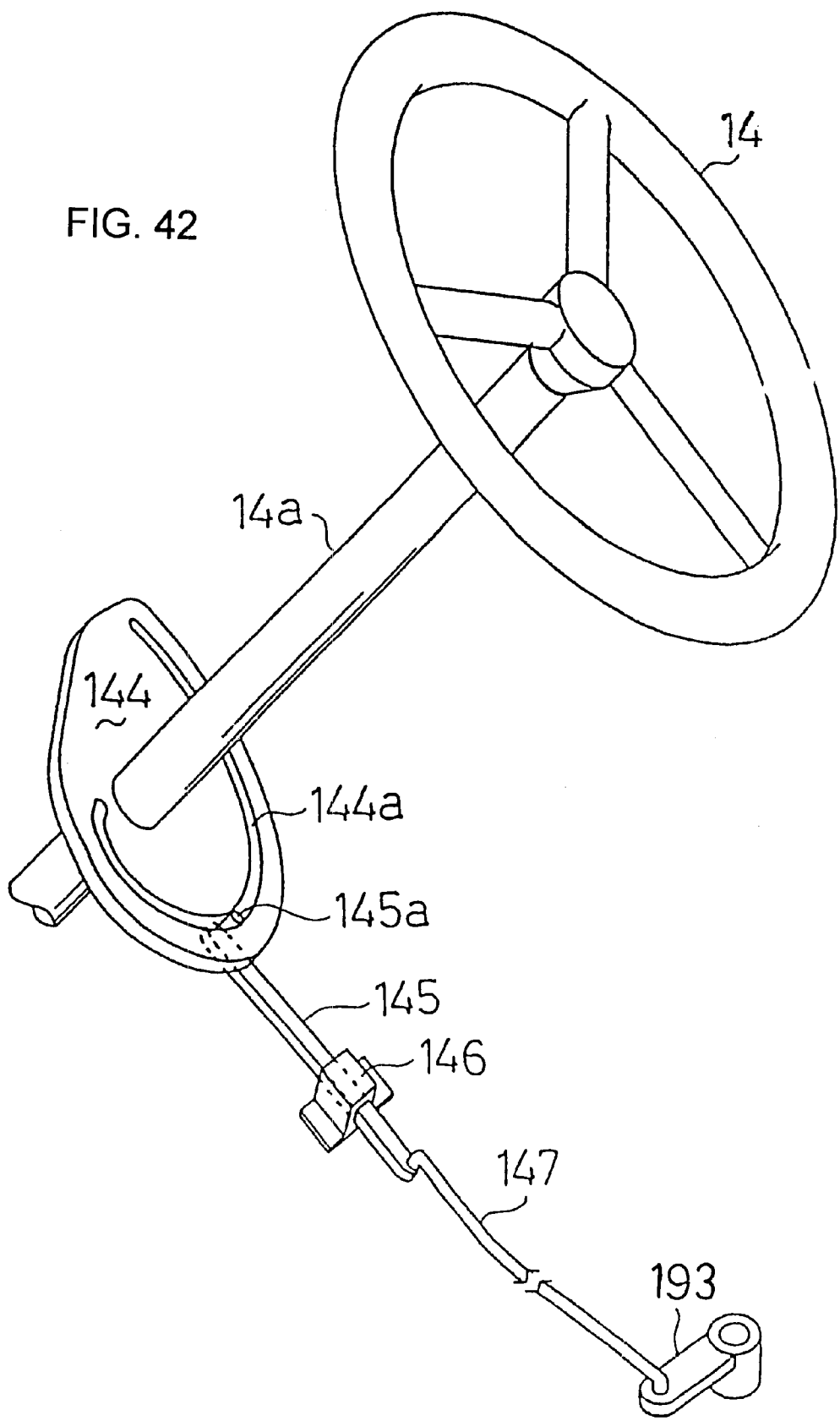
FIG. 42 is a schematic perspective view of an alternative linkage for connecting steering wheel 14 to swash plate 76 so as to change the response of swash plate 76 to operation of steering wheel 14 according to the change of angle of operated steering wheel 14 by use of a cam plate 144 and a slide link 145.

With regard to the construction shown in FIG. 27, the linkage between steering wheel 14 and control arm 193 may be replaced with that shown in FIG. 42. Referring to FIG. 42, a cam plate 144 having a cam groove 144a is fixed onto stem 14a of steering wheel 14. A first end of groove 144a is nearest to stem 14a, and a second end thereof is farthest from stem 14a. Groove 144a is so curved that the distance between groove 144a and stem 14a is generally larger and larger while advancing from the first end to the second end. A slide link 145 is disposed so as to slidably pass through slide guide 146. A cam follower 145a is provided on an end of slide link 145 so as to be slidably inserted into groove 144a. The other end of slide link 145 is pivotally connected to control arm 193 for operating swash plate 76 of hydraulic pump 71.

Due to such construction, when steering wheel 14 is rotated, cam plate 144 is integrally rotated. The position of cam follower 145a in groove 144a of rotated cam plate 144 is changed so as to change the distance between cam follower 145a and stem 14a, thereby making guide 145 slide so as to rotate control arm 193 for slanting swash plate 76.

Figure 43:
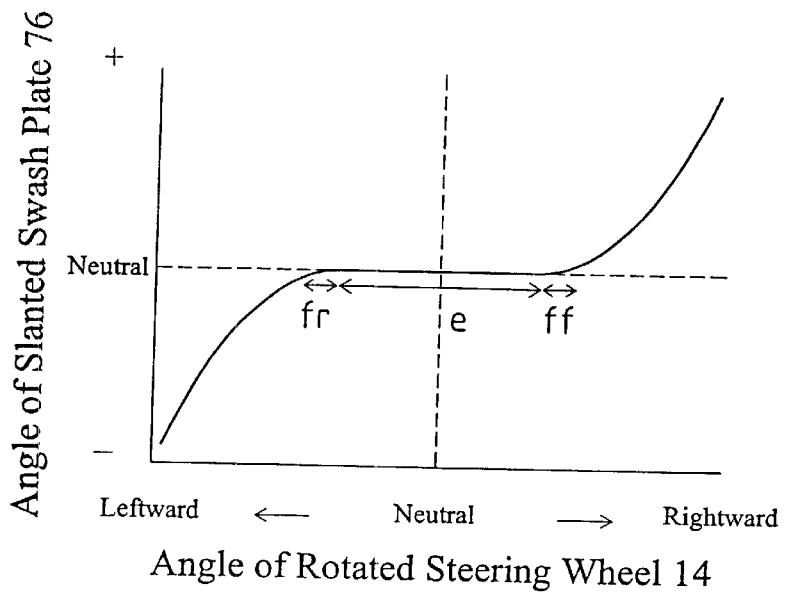
FIG. 43 is a graph of an angle of slanted swash plate 76 in relation to the angle of rotated steering wheel 14 by use of the linkage shown in FIG. 42.

The displacement of slanting response of swash plate 76 to the rotational angle of steering wheel 14 can be varied by changing the shape of groove 144a. Referring to FIG. 43, for example, the graph of slant angle of swash plate 76 in relation to the rotational position of steering wheel 14 has a flat level range "e" which means that swash plate 76 is held in neutral when steering wheel 14 is in vicinity of its neutral position. As a result, vehicle 1 can travel in straight steadily even if steering wheel 14 is rotated from its neutral position (for straight travelling) to a slight angle to be considered as an error.

When being apart from range "e", the graph is curved at an increasing tempo. If the rotational position of steering wheel 14 is in either of shown ranges "ff" and "fr", the displacement of slanting angle of swash plate 76 is small. Therefore, the cornering response to operation of steering wheel 14 is gentle when steering wheel 14 is rotated to a small degree leftward or rightward, so that vehicle 1 can travel steadily along a gentle winding course. At a large rotational angle of steering wheel 14, the angle of slanted swash plate 76 is increased dramatically. As a result, within the whole of normally limited rotational range of steering wheel 14, vehicle 1 is provided with a variety of steering responses which enables vehicle 1 to select various cornering types from meandering to hard cornering.

For restriction of slanting of swash plate 76 when steering wheel 14 is in vicinity of its neutral position, a steering transmission system in apparatus 2 may be provided at a suitable portion thereof with something to check the motion of swash plate 76 instead of such a limited slip mechanism as shown in FIG. 42. For one of such checking means, a normal brake is applied when steering wheel 14 is in vicinity of the neutral position.

Figure 44:
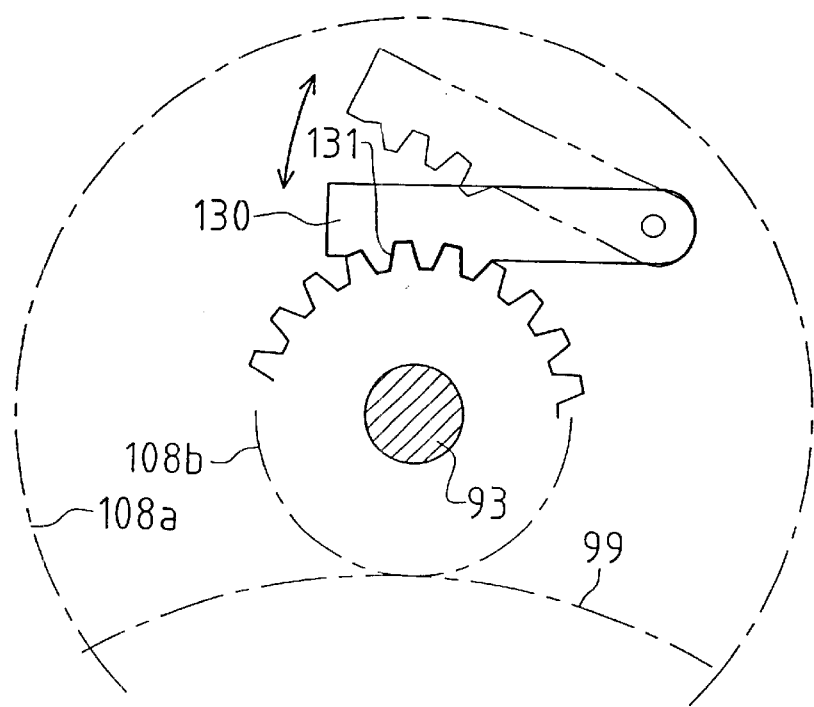
FIG. 44 is a schematic side view of small speed-reduction gear 108b provided with an engaging member 130 for restriction of the motion of transmission shaft 93.

Referring to another of the check means as shown in FIG. 44, there is provided an engaging member 130 adjacent to diametrically small gear 108b of each of left and right speed reduction gears 108. Engaging member 130 has teeth 131 for engaging with gear 108b. Both engaging members 130 interlock with steering wheel 14 through linkage, so that, when steering wheel 14 is in vicinity of the neutral position, both engaging members 130 engage with left and right gears 108b, thereby stopping both speed-reduction gears 108, whereby the vehicle can be kept in the condition of straight travelling even if steering wheel 14 is slightly rotated leftward or rightward as an operational error.

Moreover, if the volume of HST 21 or 22 is large, the movable swash plate or plates thereof, generally require a large force to be operated. Thus, each of the movable swash plates may be of a trunion type, which requires a smaller force, thereby enabling an operator to operate steering wheel 14 or speed change pedal 15 by small force regardless of the large volume of HST 21 or 22.

Next, description will be given on improvement of caster 16 in accordance with FIGS. 45 to 56.

Figure 45:
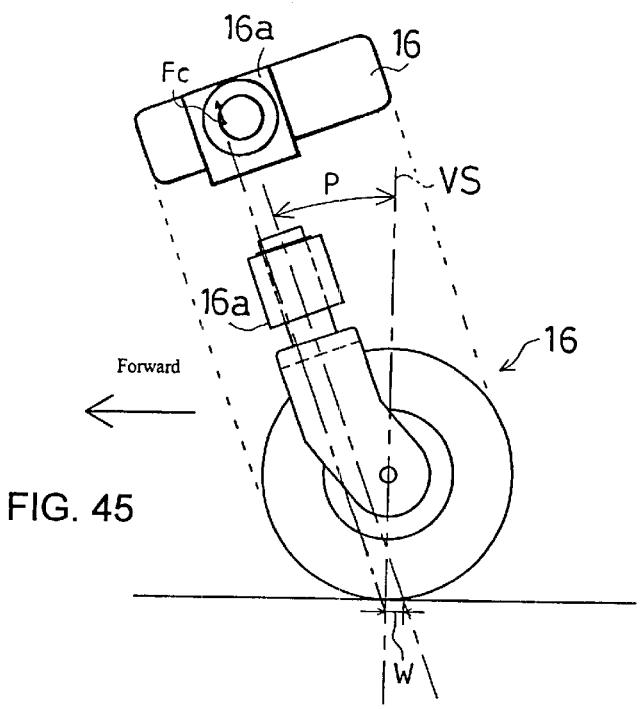
FIG. 45 is a side view of a caster 16 together with a schematic plan view of the same, caster 16 being provided with a caster angle P for improvement of its following driving wheels 43.
Figure 46:
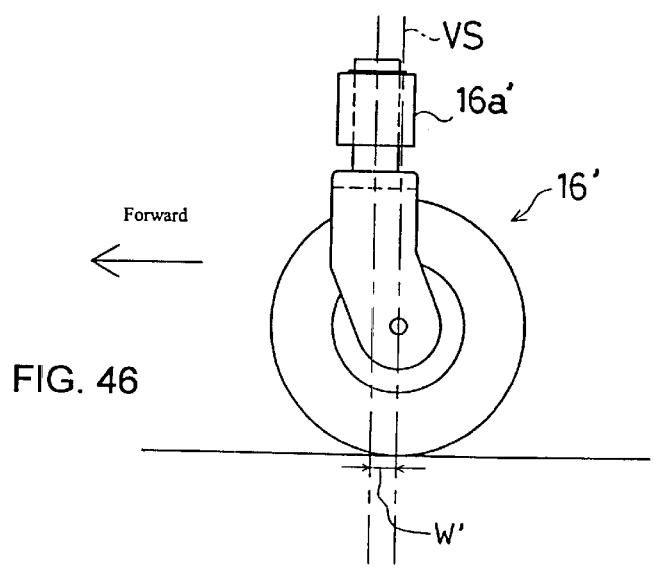
FIG. 46 is a side view of a conventional caster 16' having no caster angle.

A conventional caster 16' is, as shown in FIG. 46, supported by a vertically oriented supporter 16a' so that caster 16' abuts against the ground surface through a caster trail W', which is a distance between a phantom vertical shaft VS crossing a pivot of caster 16' and an extension of an axis of supporter 16a' on the ground. Referring to FIG. 45, a supporter 16a for caster 16 is tilted to a caster angle P from a phantom vertical shaft VS so that a caster trail W becomes smaller than that W'.

Figure 47:
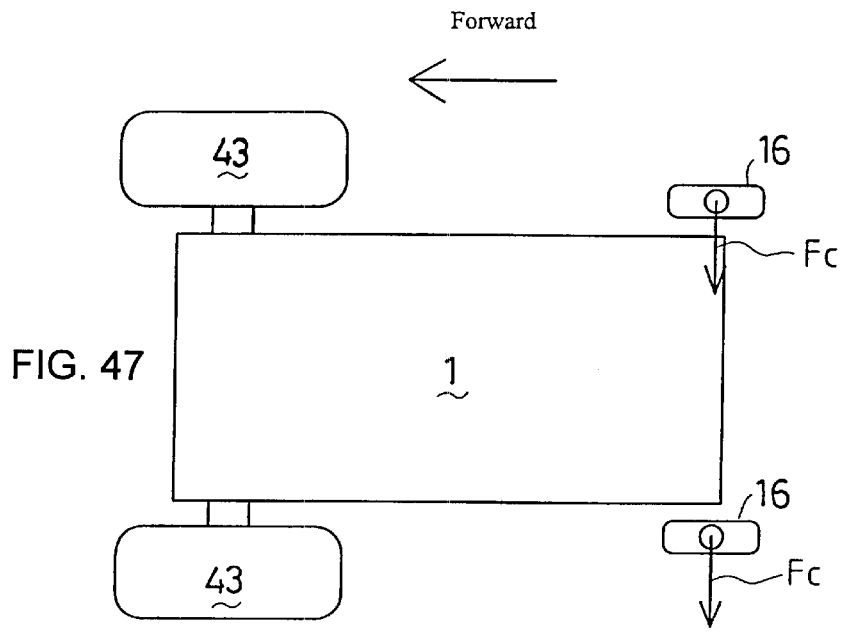
FIG. 47 is a schematic plan view of vehicle 1 having two front driving wheels 43 and two rear casters 16, wherein vehicle 1 is traversing a slope.

Such small caster trail W can reduce the torque for rotating caster 16, thereby enabling caster 16 to follow the driving of wheels 43 nicely. Preferably, such caster 16 or casters 16 are disposed on the rear portion of a vehicle (behind driving wheels 43). Such a vehicle has an advantage especially in traversing a slope. As illustrated in FIG. 47, when vehicle 1 having left and right driving wheels 43 as front wheels and left and right casters 16 as rear wheels traverses a slope, a component force Fc of gravity downwardly along the slope surface is applied onto each of wheels 43 and casters 16 in perpendicular to the travelling direction of the vehicle. Driving wheels 43 have rotational force for advancing as resistance against component force Fc of gravity. However, casters 16 have only follow rotational force in the travelling direction. Component force Fc is increased in proportion of the area of caster 16 abutting against the slope surface, that is, caster trail W. In this embodiment, caster trail W is so small as to restrict component force Fc so that casters 16 can follow wheels 43 without dragging downwardly on the slope.

Figure 48:
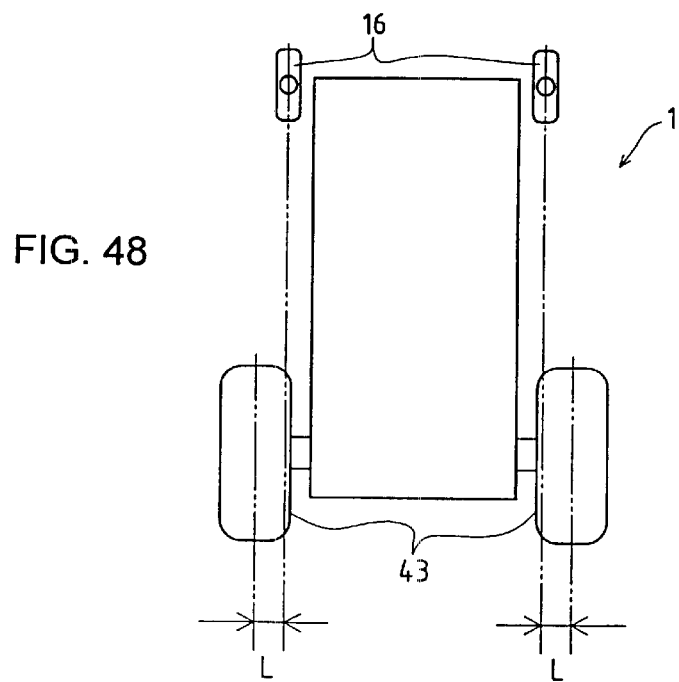
FIG. 48 is a schematic plan view of vehicle 1 having two front driving wheels 43 and two rear casters 16, wherein a king pin of each driving wheel 43 is laterally offset outwardly from the pivot point of caster 16 on the same side.

Also or alternatively, referring to FIG. 48, on each of left and right sides of vehicle 1, a king pin of driving wheel 43 is laterally outwardly offset from the pivotal point of caster 16 at a distance L, thereby reducing the torque required to rotate caster 16. This results in the vehicle having the same advantages with a vehicle using casters 16 as shown in FIG. 45.

Detailed description will now be given on disposal of casters 16 on a vehicle in accordance with FIGS. 49 to 56.

Figure 49:
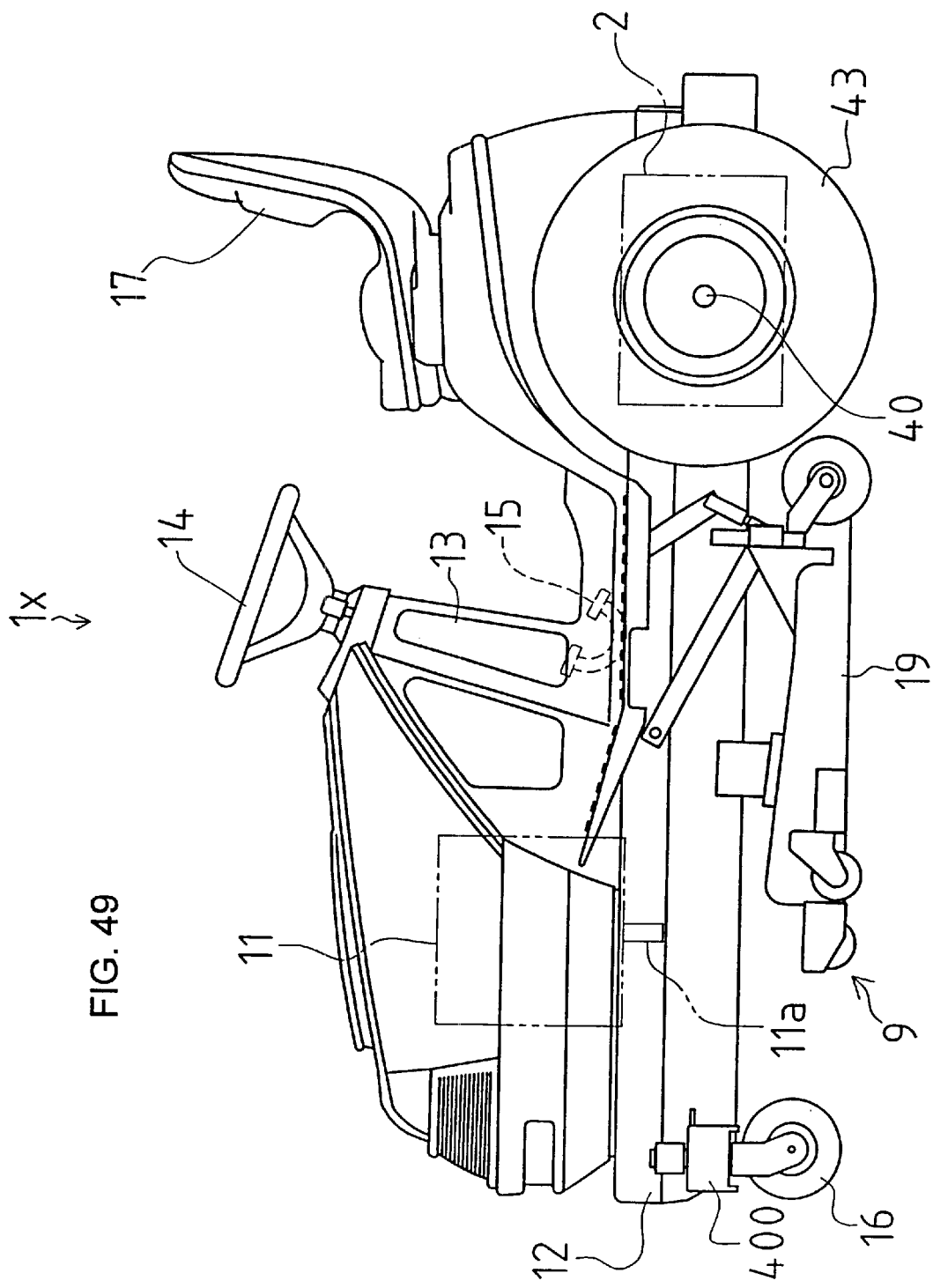
FIG. 49 is a side view of a vehicle 1x having two front casters 16 which can be steered by steering wheel 14.
Figure 50:
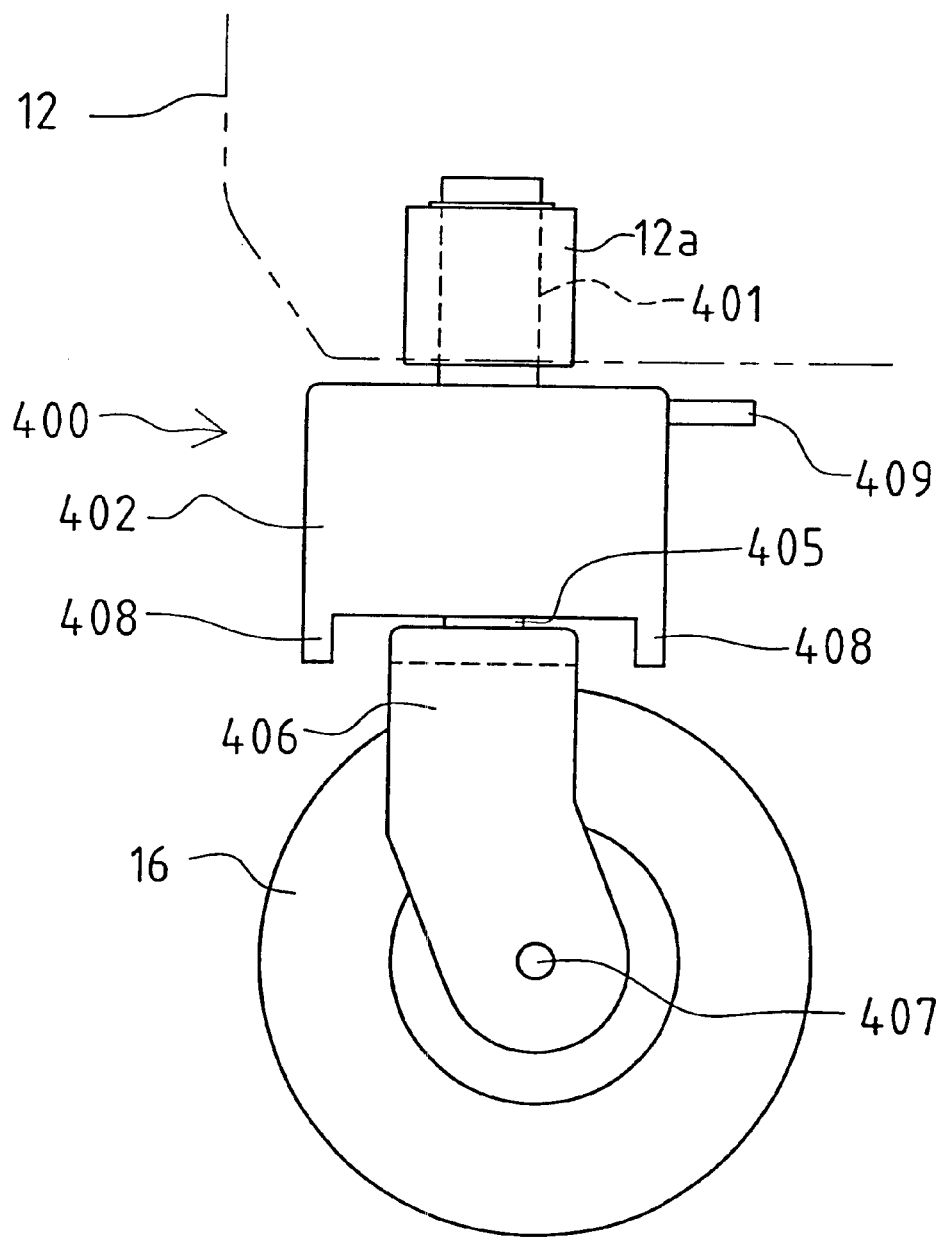
FIG. 50 is a side view of caster 16 provided with a caster guide 400 and a caster hanger 404 to be supported to chassis 12.
Figure 51:
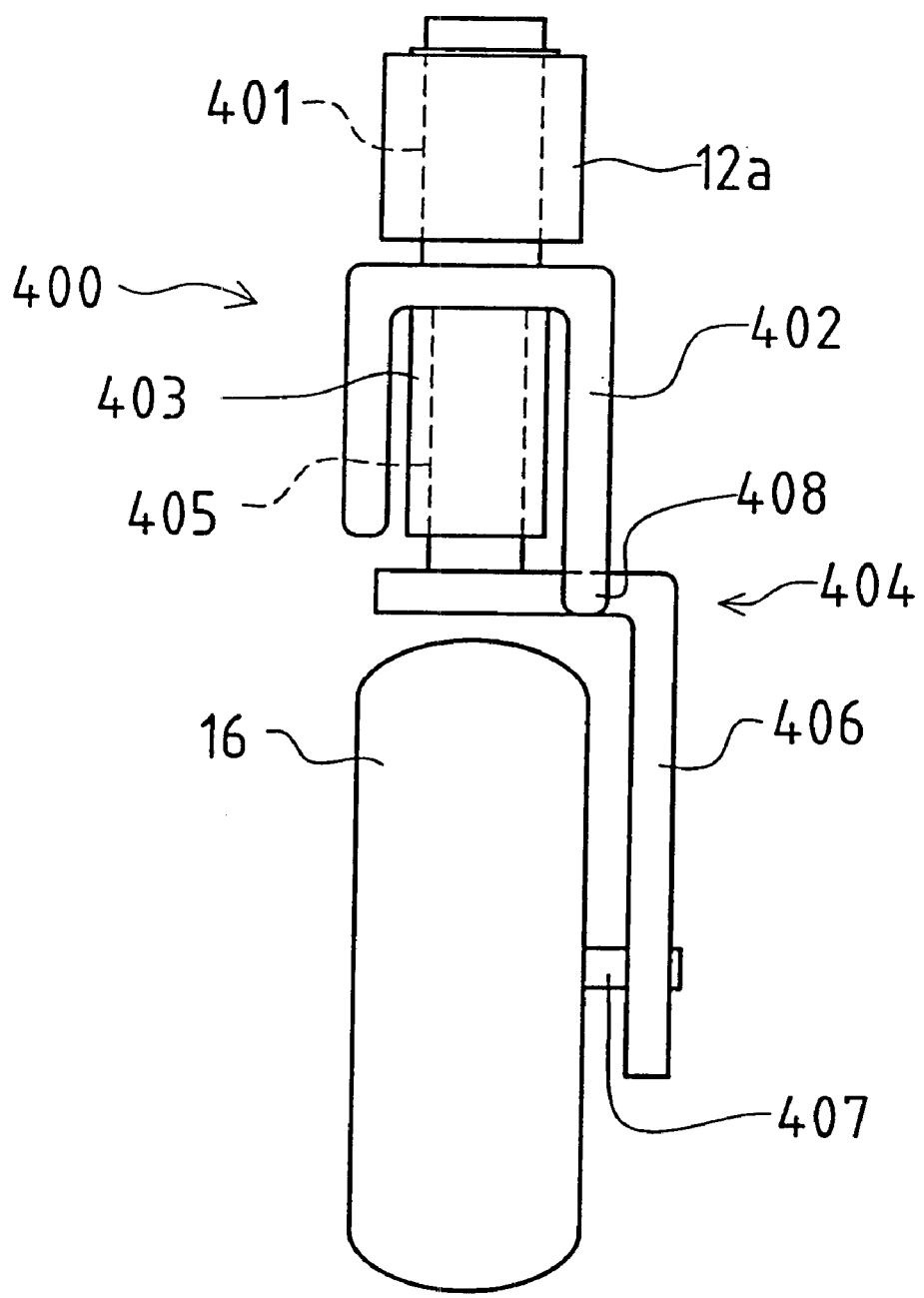
FIG. 51 is a front view of the same.
Figure 52:
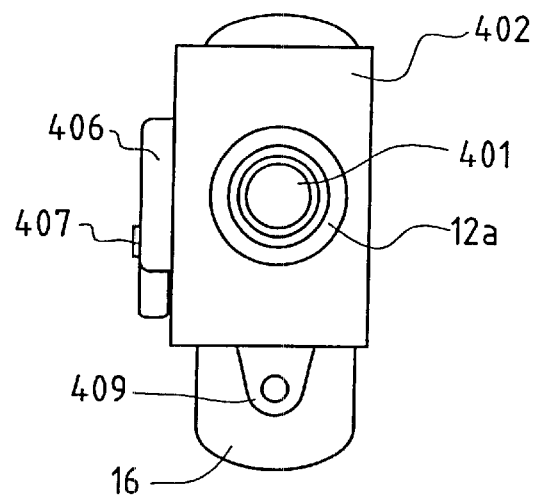
FIG. 52 is a plan view of the same.
Figure 53:
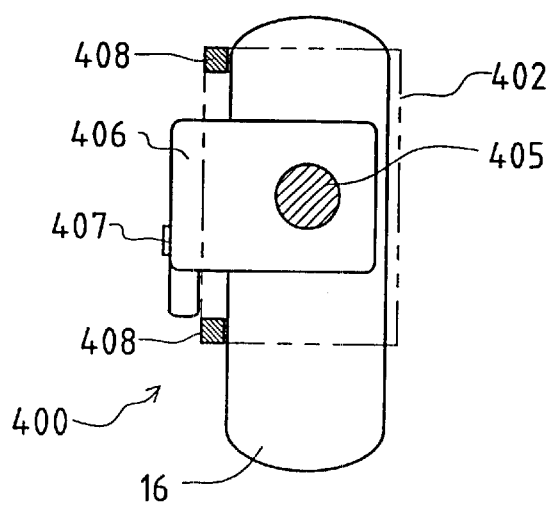
FIG. 53 is a sectional plan view of the same.
Figure 54:
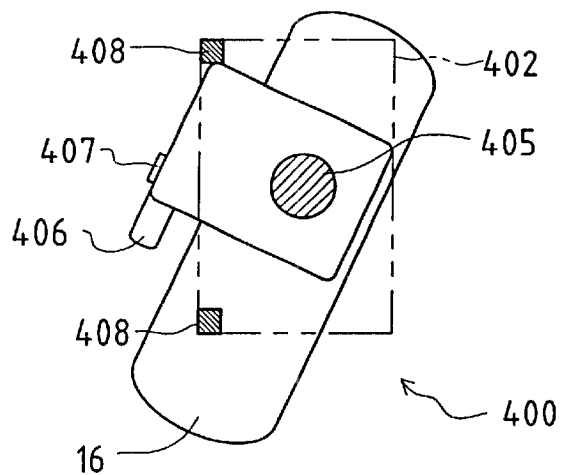
FIG. 54 is a sectional plan view of the same, wherein caster 16 is swivelled in relation to caster guide 400.

Referring to FIG. 49, a lawn tractor (vehicle) 1x is provided with a pair of left and right caster wheels 16 as front wheels. Both caster wheels 16 are supported onto vehicle 1x with the same supporting construction. As shown in FIGS. 50 to 52, left and right bosses 12a are formed on the front portion of chassis 12. A first swivel shaft 401 of a caster guide 400 is vertically disposed so as to rotatably pass through each boss 12a.

Caster guide 400 integrally comprises first swivel shaft 401, limiter 402 and a swivel shaft casing 403. Limiter 402 is fixed onto the bottom end of shaft 401. Casing 403 is integrally extended downwardly from limiter 402 while being downwardly open.

A wheel hanger 404 integrally comprises a second swivel shaft 405, a supporting plate 406 and a wheel shaft 407. Second swivel shaft 405 is disposed vertically so as to be laterally rotatably inserted into casing 403. Supporting plate 406, which is fixed onto the bottom end of second swivel shaft 405, is extended horizontally above caster wheel 16 and bent at a right angle so as to further extend downwardly along one side surface of caster 16. Shaft 407 integrally projects horizontally from the lower end portion of plate 406. Caster wheel 16 is rotatably provided on shaft 407, thereby being defined as an overhung wheel. A pair of projections 408 integrally project downwardly from limiter 402 so as to be opposed to each other with respect to plate 406. In front view as shown in FIG. 51, projections 408 overlap with plate 406.

On the assumption that caster 16 is normally oriented, that is, projections 408 are disposed before and behind plate 406, if caster wheel 16 is swivelled leftward in relation to caster guide 400, that is, if caster wheel 16 is rotated leftward with respect to second swivel shaft 405, the right side of front end of plate 406, which is swivelled integrally with caster wheel 16, comes to abut against front projection 408, thereby limiting the leftward swivelling of caster wheel 16.

On the same assumption, if caster wheel 16 is swivelled rightward in relation to caster guide 400, the left side of rear end of plate 406 comes to abut against rear projection 408, thereby limiting the rightward swivelling of caster wheel 16.

Figure 55:
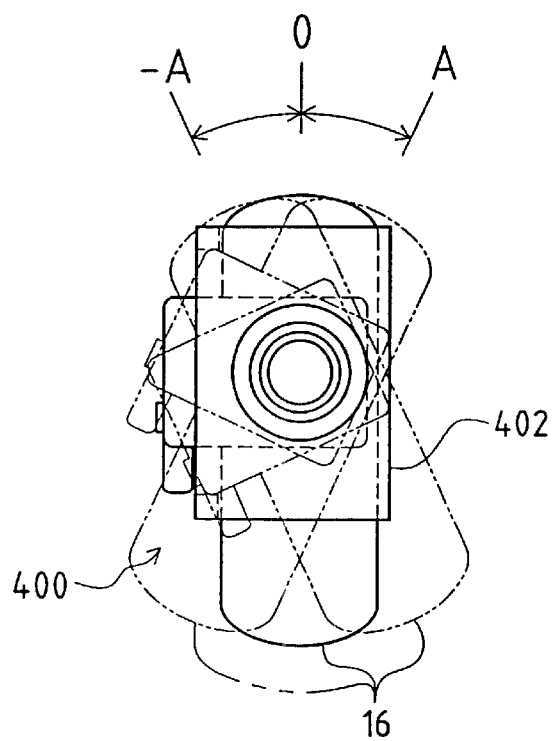
FIG. 55 is a plan view of the same, showing a range of swivelling of caster 16.

As a result, as shown in FIG. 55, the swivellable range of caster wheel 16 in relation to caster guide 400 is limited to that between "−A" and "A". For example, caster wheel 16 may be so constructed as to be able to swivel both leftward and rightward to an angle 25° from its regular position.

Figure 56:
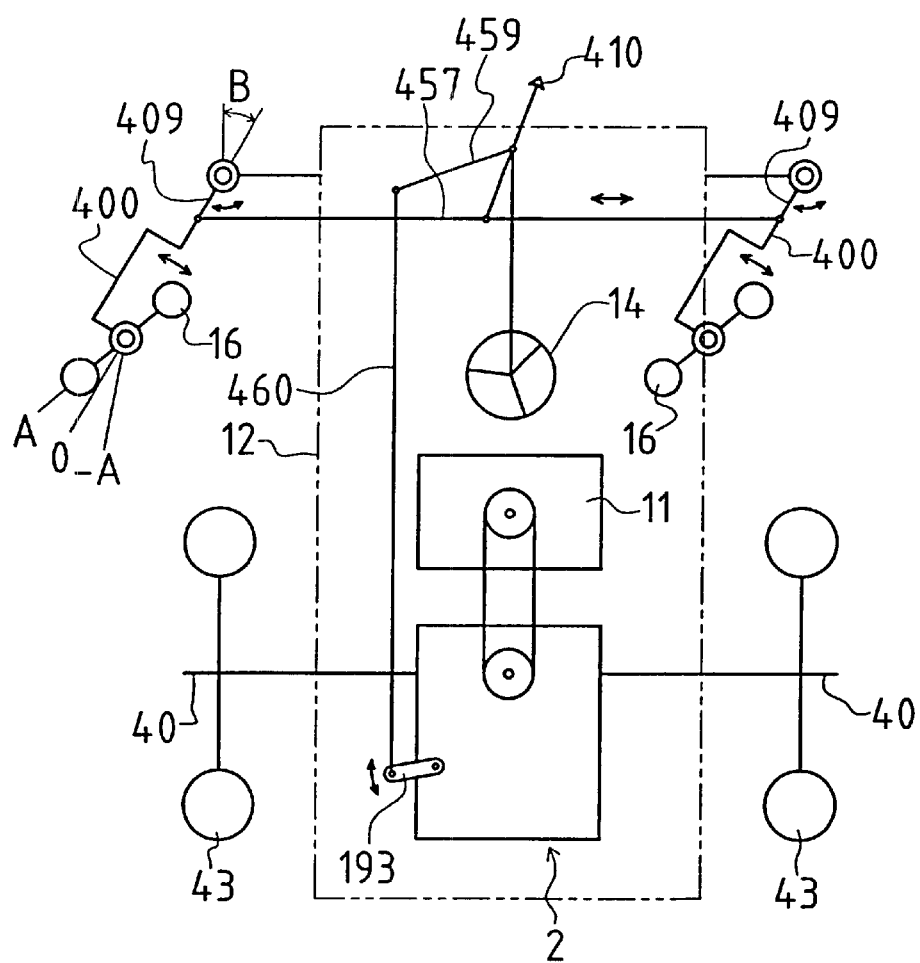
FIG. 56 is a diagram of linkages for steering wheel 14 to be connected to both caster guides 400 and to be connected to hydraulic pump 71 in apparatus 2.

As shown in FIGS. 50 and 52, caster guide 400 is integrally provided with a projecting joint tab 409 (which is backwardly extended in this embodiment). As shown in FIG. 56, tabs 409 of left and right caster guides 400 are connected with each other through a tie rod 457. Tie rod 457 is connected to a pitman arm 459 which interlocks with stem 14*a* of steering wheel 14 through gears or the like.

Steering wheel 14 is connected to control arm 193 for operating swash plate 76 of hydraulic pump 71 of steering HST 22 through pitman arm 459 and a link 460.

Due to such a construction, the rotational operation of steering wheel 14 causes swash plate 76 to be slanted for differential driving of axles 40L and 40R, and simultaneously, causes first swivel shafts 401 to be swivelled in bosses 12*a* to an angle "B" for steering casters 16. Each of leftward and rightward angles "B" of shaft 401 (which is an integral part of caster guide 400) swivelled in relation to boss 12*a* is limited, for example, to 65°. Each caster 16 can be swivelled between both angles "−A" and "A" in relation to caster guide 400 which is swivelled to angle "B". As mentioned above, if angle A is predetermined 25°, each caster 16 can be leftward and rightward swivelled to 90° as the maximum in relation to vehicle 1*x*. However, within all the swivelling range thereof in relation to vehicle 1*x*, the range for casters 16 to swivel perfectly freely is rather small. In most of the all, casters 16 are restrictedly swivelled by rotation of steering wheel 14 through caster guides 400.

Such restriction of casters 16 has some advantages as follows:

For example, in the precondition that vehicle 1*x* stays and left and right caster guides 400 and casters 16 are oriented leftward, in order to start vehicle 1*x* while turning rightward, all that has to be done is rotate steering wheel 14 rightward before starting, thereby swivelling caster guides 400 and casters 16 so as to be expectedly oriented rightward. As a result, vehicle 1*x* can turn rightward a smoothly at the beginning of its driving without meandering of casters 16.

Also, caster guides 400 and casters 16 are oriented forward while vehicle 1*x* drives forward. If the travelling direction of vehicle 1*x* is to be changed from forward to backward, vehicle 1*x* must once be stopped. A conventional caster, which can freely swivel in all directions in relation to a vehicle body, comes to swivel to such a large angle as 180° during such a change of travelling direction, thereby causing the vehicle to meander. Shown casters 16 are restricted in their free swivelling by caster guide 400, which is swivelled in relation to vehicle 1*x* by rotation of steering wheel 14, so that they are not swivelled to such a large angle as 180° during the same situation, thereby enabling vehicle 1*x* to change its travelling direction between forward and backward smoothly.

Additionally, on vehicle 1*x* may be provided means to make an operator on seat 17 know the orientation of casters 16 easily. In this embodiment as shown in FIG. 56, an indicator 410 is extended forwardly from pitman arm 459 so as to project forwardly from the front end of vehicle 1*x* so that the operator sitting on seat 17 can see indicator 410 beyond front column (see FIG. 49). Indicator 410 may be alternatively provided on tie rod 457 or caster guide 400.

Although the invention has been described in its preferred form with a certain degree of particularity, it is understood that the present disclosure of the preferred can be changed in the details of construction and the combination and arrangement of parts may be changed without departing from the spirit and the scope of the invention as hereinafter claimed.

What is claimed is:

1. A vehicle improved in steering comprising:
    an integral transaxle apparatus for driving and steering a vehicle, including,
        a housing,
        a driving hydrostatic transmission having a variable displacement first hydraulic pump and a first hydraulic motor fluidly connected with each other, said driving hydrostatic transmission being disposed in said housing, wherein said first hydraulic pump receives power of a prime mover and has a first movable swash plate,
        a steering hydrostatic transmission having a variable displacement second hydraulic pump and a second hydraulic motor fluidly connected with each other, said steering hydrostatic transmission being disposed in said housing, wherein said second hydraulic pump receives power of said prime mover independently of said first hydraulic pump and has a second movable swash plate,
        a pair of axles disposed co-axially with each other and supported in said housing, and
        a differential unit differentially connecting said axles with each other, said differential unit being disposed in said housing, wherein said differential unit is driven regularly or reversely by the output of said driving hydrostatic transmission and differentially drives said axles while receiving the output of said steering hydrostatic transmission;
    manually operable driving operating means disposed on said vehicle apart from said transaxle apparatus for slanting operation of said first movable swash plate so as to switch the traveling direction between forward and backward and to change the traveling speed, wherein said first movable swash plate is kept in its own neutral position while said driving operating means is operated for forward traveling or for backward traveling to some degree from its own neutral position; and
    manually operable steering operating means disposed on said vehicle apart from said transaxle apparatus for slanting operation of said second movable swash plate so as to determine the leftward and rightward cornering angle, wherein said vehicle turns laterally in the same direction of leftward and rightward steering operation of said steering operating means whether said vehicle travels forward or backward,
    wherein said second hydraulic motor is of a variable displacement type and has a third movable swash plate, said third movable swash plate interlocking with said driving operating means so that the slanting direction of said third movable swash plate is changed oppositely with respect to its neutral position according to the traveling direction switching operation of said driving operating means, wherein said third movable swash plate is slanted to a certain degree in a direction corresponding to forward traveling when said driving operating means is located in its own neutral position.

2. The vehicle as set forth in claim 1, wherein said third movable swash plate is changed in its slanting direction from that for forward traveling to that for backward traveling according to the operation of said driving operating means from its own neutral position into its range for backward traveling while said first movable swash plate is kept in its own neutral position.

3. The vehicle as set forth in claim 1, wherein said third movable swash plate is kept at said certain degree while said driving operating means is operated for forward traveling within the range to keep said first movable swash plate in its own neutral position.

4. The vehicle as set forth in claim 1, wherein said first hydraulic motor is of a variable displacement type and has a fourth movable swash plate, and said driving operating means comprises manually operable forward/backward traveling direction switching means and manually operable speed changing means, said forward/backward traveling direction switching means interlocking with both of said third movable swash plate and said fourth movable swash plate so as to change the slanting directions of said third and fourth movable swash plates oppositely with respect to their neutral positions, according to the switching operation of said forward/backward travelling direction switching means, and said speed changing means interlocking with said first movable swash plate so as to vary the slanting angle of said first movable swash plate according to the operational degree of said speed changing means, and wherein said first movable swash plate is kept in its own neutral position while said speed changing means is operated to some degree from its own neutral position, and wherein said third movable swash plate is slanted to a certain degree in a direction corresponding to forward traveling when said speed changing means is located in its own neutral position.

5. The vehicle as set forth in claim 1, wherein said first hydraulic motor is of a variable displacement type and has a fourth movable swash plate, and said driving operating means comprises manually operable forward/backward traveling direction switching means and manually operable speed changing means, said forward/backward traveling direction switching means interlocking with both of said third movable swash plate and said fourth movable swash plate so as to change the slanting directions of said third and fourth movable swash plates oppositely with respect to their neutral positions, according to the switching operation of said forward/backward traveling direction switching means, and said speed changing means interlocking with said first movable swash plate so as to vary the slanting angle of said first movable swash plate according to the operational degree of said speed changing means, wherein said first movable swash plate is kept in its own neutral position while said speed changing means is operated to some degree from its own neutral position, and wherein said third movable swash plate is changed in its slanting direction from that for forward traveling to that for backward traveling according to the switching operation of said forward/backward traveling direction switching means for backward traveling and the operation of said speed changing means from its own neutral position to some degree, while said first movable swash plate is kept in its own neutral position.

* * * * *